(12) United States Patent
Walker et al.

(10) Patent No.: US 7,840,977 B2
(45) Date of Patent: Nov. 23, 2010

(54) INTERACTIVE MEDIA GUIDANCE SYSTEM HAVING MULTIPLE DEVICES

(75) Inventors: Todd A Walker, Bixby, OK (US); Samir B Armaly, La Canada, CA (US); Robert A Knee, Lansdale, PA (US)

(73) Assignee: United Video Properties, Inc., Los Angeles, CA (US)

( * ) Notice: Subject to any disclaimer, the term of this patent is extended or adjusted under 35 U.S.C. 154(b) by 755 days.

(21) Appl. No.: 11/324,187

(22) Filed: Dec. 29, 2005

(65) Prior Publication Data

US 2008/0141303 A1  Jun. 12, 2008

(51) Int. Cl.
*G06F 3/00* (2006.01)
*G06F 13/00* (2006.01)
*H04N 5/445* (2006.01)

(52) U.S. Cl. .................. 725/38; 725/89; 725/100; 725/139; 348/441; 386/131

(58) Field of Classification Search .............. 725/39
See application file for complete search history.

(56) References Cited

U.S. PATENT DOCUMENTS

| | | | |
|---|---|---|---|
| 6,014,184 A | 1/2000 | Knee et al. | |
| 6,098,082 A | 8/2000 | Gibbon et al. | |
| 6,388,714 B1 | 5/2002 | Schein et al. | |
| 6,505,348 B1 | 1/2003 | Knowles et al. | |
| 6,671,882 B1* | 12/2003 | Murphy et al. | 725/54 |
| 6,813,775 B1 | 11/2004 | Finseth et al. | |
| 6,820,278 B1 | 11/2004 | Ellis | |
| 6,837,789 B2 | 1/2005 | Garahi et al. | |
| 6,950,624 B2 | 9/2005 | Kim et al. | |
| 7,098,958 B2* | 8/2006 | Wredenhagen et al. | 348/452 |
| 7,159,235 B2 | 1/2007 | Son et al. | |
| 7,213,071 B2 | 5/2007 | DeLima et al. | |
| 7,237,253 B1* | 6/2007 | Blackketter et al. | 725/61 |
| 7,248,778 B1 | 7/2007 | Anderson et al. | |
| 2001/0007147 A1* | 7/2001 | Goldschmidt Iki et al. | 717/11 |
| 2002/0056087 A1 | 5/2002 | Berezowski et al. | |
| 2002/0120935 A1 | 8/2002 | Huber et al. | |
| 2002/0194011 A1 | 12/2002 | Boies et al. | |
| 2003/0066084 A1 | 4/2003 | Kaars | |

(Continued)

FOREIGN PATENT DOCUMENTS

WO  WO-2004/061699  7/2004

OTHER PUBLICATIONS

Non-Final Office Action dated Sep. 17, 2008 in U.S. Appl. No. 11/323,828.

(Continued)

*Primary Examiner*—Joseph P Hirl
*Assistant Examiner*—Joshua Taylor
(74) *Attorney, Agent, or Firm*—Ropes & Gray LLP

(57) ABSTRACT

When selecting a television program for recording, a user may configure the delivery of the selected television program and associated data and interactive applications to different user equipment devices in a home network, which may have different capabilities. Because the user equipment devices in the home network may have different capabilities, the user may wish to deliver different types and amount of content, different amounts of data, and different versions of interactive applications to the user equipment devices in the home network.

14 Claims, 27 Drawing Sheets

820

Select Formats to Record

Available Formats for Desperate Housewives

822 ☐ High-definition
824 ☐ Standard Definition
826 ☐ MPEG-4 (available the following day)
828 ☐ H. 264 (available the following day)
830 ☐ Record Formats Suitable for Display by the User Equipment Devices in the Home Network 832 [ Save and Return ]

U.S. PATENT DOCUMENTS

| | | | |
|---|---|---|---|
| 2003/0149980 | A1 | 8/2003 | Ellis |
| 2003/0149988 | A1 | 8/2003 | Ellis et al. |
| 2003/0152096 | A1 | 8/2003 | Chapman |
| 2003/0162096 | A1 | 8/2003 | Michot et al. |
| 2004/0156614 | A1 | 8/2004 | Bumgardner et al. |
| 2004/0226034 | A1 | 11/2004 | Kaczowka et al. |
| 2004/0237104 | A1* | 11/2004 | Cooper et al. ............... 725/38 |
| 2004/0267965 | A1 | 12/2004 | Vasudevan et al. |
| 2005/0071876 | A1 | 3/2005 | van Beek |
| 2005/0120373 | A1 | 6/2005 | Thomas et al. |
| 2005/0132264 | A1 | 6/2005 | Joshi et al. |
| 2005/0138658 | A1 | 6/2005 | Bryan |
| 2005/0204388 | A1 | 9/2005 | Knudson et al. |
| 2005/0251827 | A1 | 11/2005 | Ellis et al. |
| 2006/0015888 | A1 | 1/2006 | Shih |
| 2006/0031883 | A1 | 2/2006 | Ellis et al. |
| 2006/0037054 | A1 | 2/2006 | McDowell et al. |
| 2006/0064728 | A1 | 3/2006 | Son et al. |
| 2006/0085835 | A1* | 4/2006 | Istvan et al. ............... 725/119 |
| 2006/0095942 | A1 | 5/2006 | van Beek |
| 2006/0173838 | A1 | 8/2006 | Garg et al. |
| 2006/0215650 | A1 | 9/2006 | Wollmershauser et al. |
| 2006/0238648 | A1* | 10/2006 | Wogsberg ............... 348/441 |
| 2006/0248570 | A1 | 11/2006 | Witwer |
| 2006/0253874 | A1 | 11/2006 | Stark et al. |
| 2006/0271953 | A1 | 11/2006 | Jacoby et al. |
| 2007/0022442 | A1 | 1/2007 | Gil et al. |
| 2007/0028267 | A1 | 2/2007 | Ostojic et al. |
| 2007/0055980 | A1 | 3/2007 | Megeid et al. |
| 2007/0089160 | A1 | 4/2007 | Ando |
| 2007/0157242 | A1 | 7/2007 | Cordray et al. |
| 2007/0157281 | A1 | 7/2007 | Ellis et al. |
| 2007/0174774 | A1 | 7/2007 | Lerman et al. |
| 2008/0060001 | A1 | 3/2008 | Logan et al. |

OTHER PUBLICATIONS

Reply dated Mar. 13, 2009 to Non-Final Office Action dated Sep. 17, 2008 in U.S. Appl. No. 11/323,828.
Non-Final Office Action dated Jun. 29, 2009 in U.S. Appl. No. 11/323,828.
Non-Final Office Action dated Oct. 16, 2008 in U.S. Appl. No. 11/324,158.
Reply dated Mar. 13, 2009 to Non-Final Office Action dated Oct. 16, 2008 in U.S. Appl. No. 11/324,158.
Final Office Action dated Jul. 6, 2009 in U.S. Appl. No. 11/324,158.
Notice of Appeal dated Dec. 7, 2009 in U.S. Appl. No. 11/324,158.
RCE and Reply dated Mar. 8, 2010 to Final Office Action dated Jul. 6, 2009 in U.S. Appl. No. 11/324,158.
Non-Final Office Action dated Apr. 7, 2010 in U.S. Appl. No. 11/324,158.
Non-Final Office Action dated Oct. 15, 2008 in U.S. Appl. No. 11/323,485.
Reply dated Apr. 14, 2009 to Non-Final Office Action dated Oct. 15, 2008 in U.S. Appl. No. 11/323,485.
Final Office Action dated Jul. 6, 2009 in U.S. Appl. No. 11/323,485.
Notice of Appeal dated Jan. 6, 2010 in U.S. Appl. No. 11/323,485.
RCE and Reply dated Apr. 6, 2010 to Final Office Action dated Jul. 6, 2009 in U.S. Appl. No. 11/323,485.
Non-Final Office Action dated May 5, 2010 in U.S. Appl. No. 11/323,485.
Non-Final Office Action dated Nov. 12, 2008 in U.S. Appl. No. 11/324,206.
Reply dated May 12, 2009 to Non-Final Office Action dated Nov. 12, 2008 in U.S. Appl. No. 11/324,206.
Non-Final Office Action dated Aug. 31, 2009 in U.S. Appl. No. 11/324,206.
Reply dated Mar. 1, 2010 to Non-Final Office Action dated Aug. 31, 2009 in U.S. Appl. No. 11/324,206.
Examiner Interveiw Summary dated Sep. 14, 2009 in U.S. Appl. No. 11/324,206.
Final Office Action dated Apr. 29, 2010 in U.S. Appl. No. 11/324,206.
Realplayer 8 Plus User Manual, Rev. 1, Real Networks, Inc. p. 32 (2000).
International Search Report PCT/US2006/046090, Jul. 17, 2008.
Jaidev, "XSLT—A Wired and Wireless Case Study," http://csharpcomputing.com/XMLTutorial/Lesson15.htm.
Randerson, J., "Let Software Catch the Game for You," New Scientist, Jul. 3, 2004.
Papers Delivered (Part 1), 61st National Conference, Information Processing Society of Japan, Oct. 3-5, 2000.
Pogue, D., "State of the Art: For TiVo and Replay, New Reach," N.Y. Times, May 29, 2003.

* cited by examiner

Select Formats to Record

820

Available Formats for Desperate Housewives

- 822 ☐ High-definition
- 824 ☐ Standard Definition
- 826 ☐ MPEG-4 (available the following day)
- 828 ☐ H.264 (available the following day)
- 830 ☐ Record Formats Suitable for Display by the User Equipment Devices in the Home Network 832 [ Save and Return ]

FIG. 8b

Select Delivery Options

840

Delivery Options for Desperate Housewives

Mom's Cellular Phone [ Select Delivery Options ] — 842

Living Room Home Theatre [ Select Delivery Options ] — 844

Bedroom Television System [ Select Delivery Options ] — 846

[ Return ] — 848

FIG. 8c

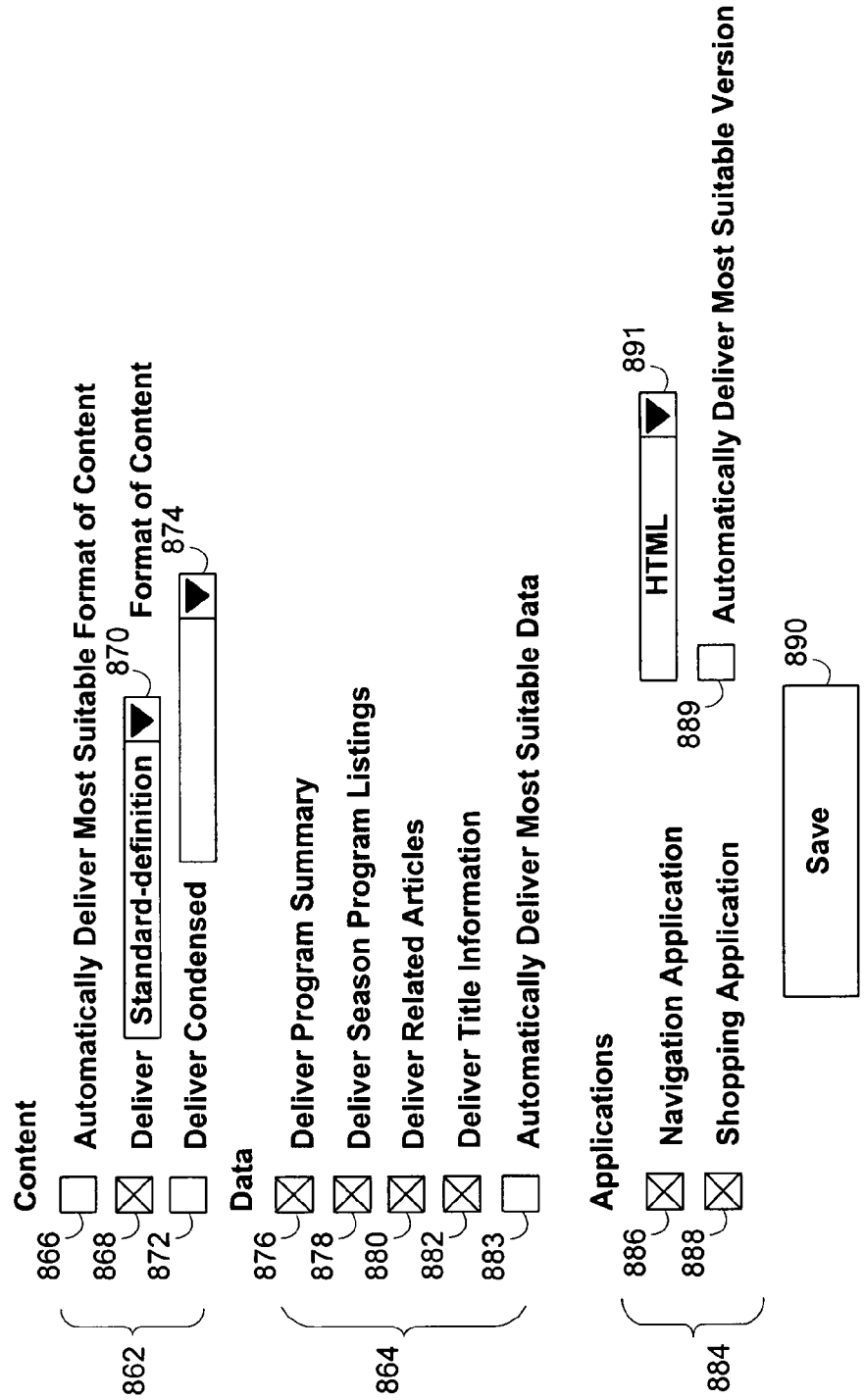

| Vertical, Horizontal Resolution (pixels) | 480,852 |
| --- | --- |
| Media Types | MPEG |
| Bandwidth (Mbps) | 40 |
| Application Types | Java, HTML, XML |

INTERACTIVE MEDIA GUIDANCE SYSTEM HAVING MULTIPLE DEVICES

BACKGROUND OF THE INVENTION

This invention relates to interactive media guidance systems and more particularly to interactive media guidance systems having multiple devices.

User equipment devices located in a home network may be able to share content and program guide settings with other user equipment devices in the home network. For example, a user equipment device located in a home network may be allowed to play a recorded television program stored on another user equipment device in the home network. The ability of user equipment devices in home networks to share content and data is discussed in greater detail in U.S. patent application Ser. No. 09/356,161, filed Jul. 16, 1999, which is hereby incorporated by reference herein in its entirety.

Within a home network, user equipment devices may have different capabilities. User equipment devices may be configured to display different types of content and run different types of software. In addition, user equipment devices may have different bandwidth capabilities for receiving data.

For example, user equipment devices in a home network may or may not be configured to display high-definition content. In this example, a user equipment device in the home network that is not configured to display high-definition content may not be able to view a high-definition recording stored on another user equipment device in the home network.

In another example, user equipment devices in a home network may be compatible with different types of software. In this example, a user equipment device may not be able to run an interactive application developed for another user equipment device.

In yet another example, user equipment devices in a home network may have different bandwidth capabilities. In this example, a user equipment device with a small bandwidth may not be able to download data that requires a large amount of storage space.

SUMMARY OF THE INVENTION

A user may select video programming (e.g., a television program) for recording using a user equipment device located in a home network. Any of the user equipment devices may be configured to retrieve the recording of the selected content. The user may configure the delivery of the recorded content and associated data and interactive applications to each of the user equipment devices in the home network. In addition, an interactive media guidance application may configure the delivery of the recorded content and associated data and interactive applications to suitable user equipment devices that may be added to the home network in the future (e.g., based on planned equipment upgrades by a service provider or by predicting user behavior for upgrading and expanding equipment).

Associated data may include any suitable data, such as, for example, schedule information, program descriptions, program information (e.g., actors, directors, release date, ratings, genre, etc.), related articles, interviews, reviews, metadata having links to related content, descriptive metadata, and other similar content or data relating to the recorded content. Associated interactive applications may include any suitable interactive application, such as, for example, a navigation application, a commerce application, a voting application, a, trivia application, a wagering application, a user behavior monitoring application, a preference setting application, an interactive advertising application, and any other suitable application.

For example, an episode of "Desperate Housewives" may be recorded on a home network that includes a high-definition user equipment device, a standard-definition user equipment device, and a cellular phone. In some embodiments, the user may select the formats of the content to record. The user may select to record the high definition, standard definition and H.264 formats of "Desperate Housewives" on a home network server (e.g., server 902 (FIG. 9)). The user may select the formats of "Desperate Housewives" to deliver to the user equipment devices in the home network.

In some embodiments, a server or user equipment device associated with the home network may determine the available formats of "Desperate Housewives" and compare the requirements of the available formats of "Desperate Housewives" and the capabilities of the user equipment devices in the home network to determine the most suitable formats of "Desperate Housewives" to record. A user equipment device in the home network that requests the recording of "Desperate Housewives" may be provided with the format of "Desperate Housewives" that has been identified as the most suitable format to be displayed by the user equipment device. For example, a high-definition user equipment device may be provided with the recording of "Desperate Housewives" in high definition and a cellular phone may be provided with the recording of "Desperate Housewives" in H.264 format.

In some embodiments, the highest-quality format of "Desperate Housewives" may be recorded and later translated into the formats that have been identified as suitable for display by the user equipment devices in the home network. The recording of "Desperate Housewives" may be translated into formats that have been identified as suitable to be displayed by the user equipment devices in the home network. For example, standard-definition user equipment devices may be provided with the recording of "Desperate Housewives" translated into standard definition.

In some embodiments, an alternate version of "Desperate Housewives" may be provided to any of the user equipment devices in the home network. The alternate version may be a condensed version of "Desperate Housewives" or an extended version of "Desperate Housewives". For example, the alternate version of "Desperate Housewives" may be stored on a server and provided to one of the user equipment devices in the home network. In another example, the alternate version of "Desperate Housewives" may be locally generated.

Also, the user may configure the delivery of data associated with "Desperate Housewives" to the user equipment devices in the home network. For example, title information and a program summary may be data that is associated with "Desperate Housewives". The user may select to deliver both the title information and the program summary to the standard-definition and high-definition user equipment devices in the home network. However, the user may only select to deliver the title information to the cellular phone because of the limited display capabilities of the cellular phone.

Furthermore, the user may configure the delivery of applications associated with "Desperate Housewives" to the user equipment devices in the home network. For example, a shopping application may be an application that is associated with "Desperate Housewives". The user may select to deliver the shopping application to the standard-definition and high-definition user equipment devices. However, the user may opt not to deliver the shopping application to the cellular phone because of the limited display capabilities of the cellular phone.

In some embodiments, the associated applications may be stored in multiple formats and the most suitable format of the associated applications may be provided to each of the user equipment devices. For example, if the user selects to deliver one of the associated applications to the cellular phone, the cellular phone may be provided with a WML version of the associated application. In some embodiments, the associated applications may be modified or adapted for display by each of the user equipment devices. For example, if the user selected to deliver one of the associated applications to the cellular phone, the associated application may be modified for display by the cellular phone. In another example, the associated application may be implemented in a platform-independent language and may be adapted to be displayed by the cellular phone.

Further features of the invention, its nature and various advantages will be more apparent from the accompanying drawings and the following detailed description of the preferred embodiments.

BRIEF DESCRIPTION OF THE DRAWINGS

FIG. 8b shows an illustrative display screen of an interactive media guidance application for allowing a user to select formats of a selected program to record in accordance with the present invention.

FIG. 8c shows an illustrative display screen of an interactive media guidance application for allowing a user to select delivery options for a selected program and associated data and applications to user equipment devices in a home network.

FIGS. 8d-f show an illustrative screen of an interactive media guidance application for allowing a user to select delivery options of a selected program and associated data and applications for various user equipment devices in a home network in accordance with the present invention.

DETAILED DESCRIPTION OF THE PREFERRED EMBODIMENTS

The amount of media available to users in any given media delivery system can be substantial. Consequently, many users desire a form of media guidance, an interface that allows users to efficiently navigate media selections and easily identify media that they may desire. An application that provides such guidance is referred to herein as an interactive media guidance application or, sometimes, a guidance application.

Interactive media guidance applications may take various forms depending on the media for which they provide guidance. One typical type of media guidance application is an interactive television program guide. Interactive television program guides are well-known guidance applications that, among other things, allow users to navigate among and locate television programming viewing choices and, in some systems, digital music choices. The television programming (and music programming) may be provided via traditional broadcast, cable, satellite, Internet, or any other means. The programming may be provided on a subscription basis (sometimes referred to as premium programming), as pay-per-view programs, or on-demand such as in video-on-demand (VOD) systems.

With the advent of the Internet, mobile computing, and high-speed wireless networks, users are able to access media on personal computers (PCs) and devices on which they traditionally could not. Non-television-centric platforms (i.e., platforms that distribute media with equipment not part of the user's broadcast, cable or satellite television-delivery network) allow users to navigate among and locate desirable video clips, full motion videos (which may include television programs), images, music files, and other suitable media. Consequently, media guidance is also necessary on modern non-television-centric platforms. For example, media guidance applications may be provided as on-line applications (i.e., provided on a web-site), or as stand-alone applications or clients on user equipment devices, such as, for example, hand-held computers, personal digital assistants (PDAs), cellular telephones, or traditionally-passive devices that have been enhanced with circuitry for operating interactive media guidance applications (e.g., wrist watches, telephone hand sets, appliances, etc.). In some systems, users may control equipment remotely via a media guidance application. For example, users may access an online media guide and set recordings or other settings on their in home equipment. This may be accomplished by the on-line guide controlling the user's equipment directly or via another media guide that runs on the user's equipment. Remote access of interactive media guidance applications is discussed in greater detail in U.S. patent application Ser. No. 11/246,392, filed Oct. 7, 2005, which is hereby incorporated by reference herein in its entirety.

Figure 1:
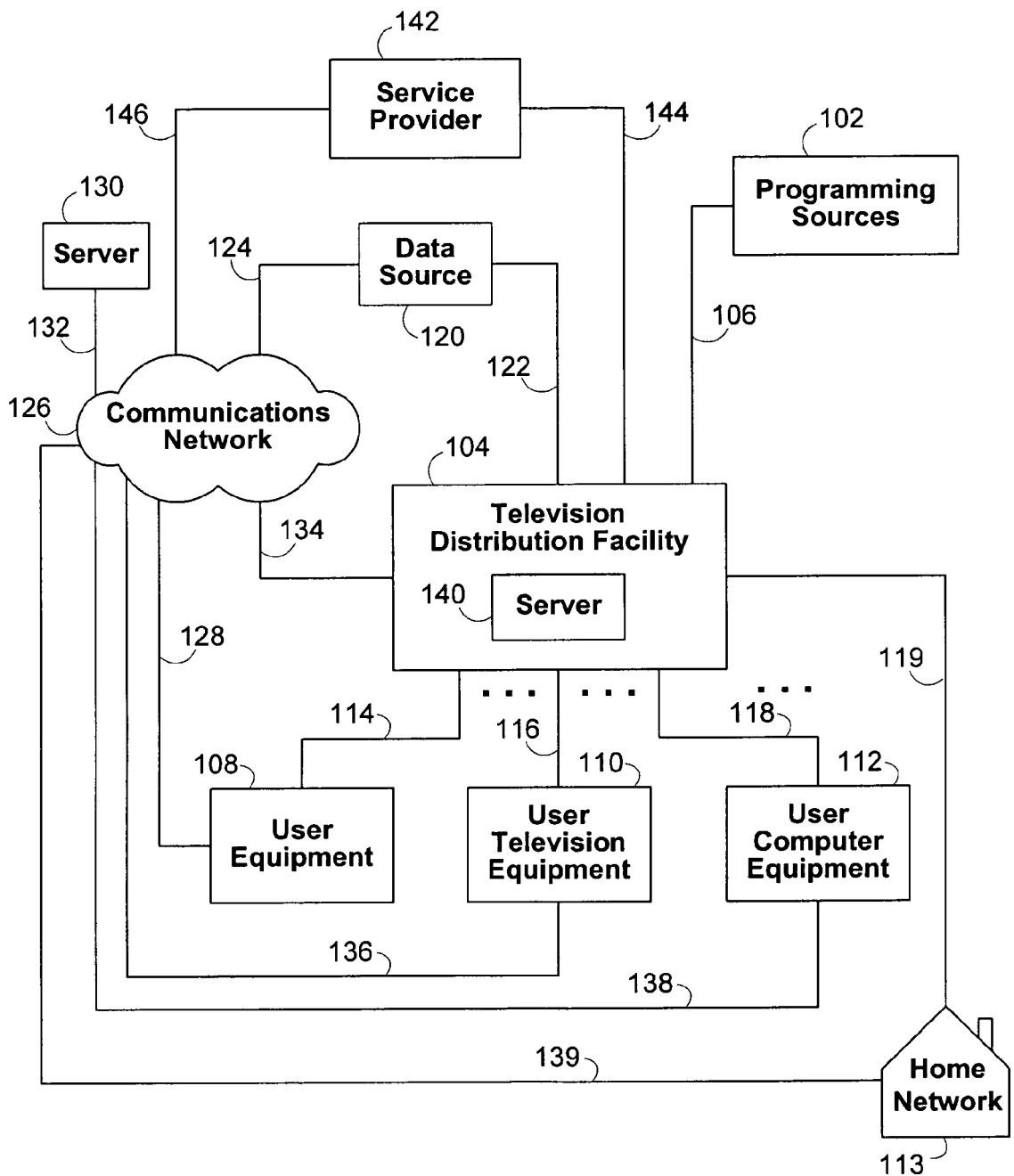
FIG. 1 is a diagram of an illustrative interactive television system in accordance with the present invention.

An illustrative interactive media guidance system 100 in accordance with the present invention is shown in FIG. 1. System 100 is intended to illustrate a number of approaches by which media of various types, and guidance for such media, may be provided to (and accessed by) end-users. The present invention, however, may be applied in systems employing any one or a subset of these approaches, or in systems employing other approaches for delivering media and providing media guidance.

The first approach represents a typical television-centric system in which users may access television (and in some systems music) programming. This includes programming sources 102 and distribution facility 104. Media such as television programming and digital music is provided from programming sources 102 to distribution facility 104, using communications path 106. Communications path 106 may be a satellite path, a fiber-optic path, a cable path, or any other suitable wired or wireless communications path or combination of such paths.

Programming sources 102 may be any suitable sources of television and music programming, such as television broadcasters (e.g., NBC, ABC, and HBO) or other television or music production studios. Programming sources 102 may provide television programming in a variety of formats in high definition and standard definition, such as, for example, 1080p, 1080i, 720p, 480p, 480i, and any other suitable format.

Distribution facility 104 may be a cable system headend, a satellite television distribution facility, a television broadcaster, or any other suitable facility for distributing video media (e.g., television programs, video-on-demand programs, pay-per-view programs) and audio media (e.g., music programming and music clips) to the equipment of subscribers of the corresponding cable, satellite, or IPTV system. In some approaches, distribution facility 104 may also distribute other media to users, such as video and audio clips, web pages, and interactive applications, that may be offered to subscribers of a given cable, satellite, or IPTV system. There are typically numerous television distribution facilities 104 in system 100, but only one is shown in FIG. 1 to avoid over-complicating the drawing.

Distribution facility 104 may be connected to various user equipment devices 108, 110, and 112. Such user equipment devices may be located, for example, in the homes of users. User equipment devices may include user television equipment 110, user computer equipment 112, or any other type of user equipment suitable for accessing media. User equipment 108 may be any type of user equipment (e.g., user television equipment, user computer equipment, cellular phones, hand-held video players, gaming platforms, mobile video devices, vehicle entertainment devices, etc.) and, for simplicity, user equipment devices may be referred to generally as user equipment 108. User equipment devices may be fixed in location or location free. For example, the user equipment device may be implemented on a vehicle (e.g., an automobile), which is location free. The user equipment device may connect to the home network when the vehicle is parked in the garage or at another location. When the user equipment device is connected to the home network, the user equipment device may retrieve content and associated data and applications from the home network.

User equipment devices 108, 110, and 112 may receive media (such as television, music, web pages, etc.) and other data from distribution facility 104 over communications paths, such as communications paths 114, 116, and 118, respectively. User equipment devices 108, 110, 112 may also transmit signals to distribution facility 104 over paths 114, 116, and 118, respectively. Paths 114, 116, and 118 may be cables or other wired connections, free-space connections (e.g., for broadcast or other wireless signals), satellite links, or any other suitable link or combination of links.

A second approach illustrated in FIG. 1 by which media and media guidance are provided to end users is a non-television-centric approach. In this approach media such as video (which may include television programming), audio, images, web pages, or a suitable combination thereof, are provided to equipment of a plurality of users (e.g., user equipment 108, user television equipment 110, and user computer equipment 112) by server 130 via communications network 126. This approach is non-television-centric because media (e.g., television programming) is provided by and delivered at least partially, and sometimes exclusively, via equipment that have not traditionally been primarily focused on the television viewing experience. Non-television-centric equipment is playing a larger role in the television viewing experience.

In some embodiments for this approach, communications network 126 is the Internet. Server 130 may provide for example, a web site that is accessible to the user's equipment and provides an on-line guidance application for the user. In such approaches, the user's equipment may be, for example, a PC or a hand-held device such as a PDA or web-enabled cellular telephone that incorporates a web browser. In other embodiments, server 130 uses the Internet as a transmission medium but does not use the Web. In such approaches, the user's equipment may run a client application that enables the user to access media. In still other approaches, communications network 126 is a private communications network, such as a cellular phone network, that does not include the Internet.

In yet other approaches, communications network 126 includes a private communications network and the Internet.

For example, a cellular telephone or other mobile-device service provider may provide Internet access to its subscribers via a private communications network, or may provide media such as video clips or television programs to its subscribers via the Internet and its own network.

The aforementioned approaches for providing media may, in some embodiments, be combined. For example, a distribution facility 104 may provide a television-centric media delivery system, while also providing users' equipment (e.g., 108, 110 and 112) with access to other non-television-centric delivery systems provided by server 130. For example, a user's equipment may include a web-enabled set-top box or a television enabled PC. Distribution facility 104 may, in addition to television and music programming, provide the user with Internet access whereby the user may access server 130 via communications network 126. Distribution facility 104 may communicate with communications network 126 over any suitable path 134, such as a wired path, a cable path, fiber-optic path, satellite path, or combination of such paths.

Media guidance applications may be provided using any approach suitable for the type of media and distribution system for which the applications are used. Media guidance applications may be, for example, stand-alone applications implemented on users' equipment. In other embodiments, media guidance applications may be client-server applications where only the client resides on the users' equipment. In still other embodiments, guidance applications may be provided as web sites accessed by a browser implemented on the users' equipment. Whatever the chosen implementation, the guidance application will require information about the media for which it is providing guidance. For example, titles or names of media, brief descriptions, or other information may be necessary to allow users to navigate among and find desired media selections.

In some television-centric embodiments, for example, the guidance application may be a stand-alone interactive television program guide that receives program guide data via a data feed (e.g., a continuous feed, trickle feed, or data in the vertical blanking interval of a channel). Data source 120 in system 100 may include a program listings database that is used to provide the user with associated program data such as schedule information, program descriptions, program information (e.g., actors, directors, release date, ratings, genre, etc.), related articles, interviews, reviews, metadata having links to related content, descriptive metadata, and other similar content or data relating to the television programs. In some embodiments, the data may also include content or video related to television programs. Data source 120 may also be used to provide advertisements (e.g., program guide advertisements and advertisements for other interactive television applications), real-time data such as sports scores, stock quotes, news data, and weather data, application data for one or more media guidance applications or other interactive applications, and any other suitable data for use by system 100. As another example, data source 120 may provide data indicating the types of information that may be included in interactive media guidance overlays (e.g., at the request of the user, absent user modification, etc.).

Program guide data may be provided to user equipment, including user equipment located on home network 113, using any suitable approach. For example, program schedule data and other data may be provided to the user equipment on a television channel sideband, in the vertical blanking interval of a television channel, using an in-band digital signal, using an out-of-band digital signal, or by any other suitable data transmission technique. Program schedule data and other data may be provided to user equipment on multiple analog or digital television channels. Program schedule data and other data may be provided to the user equipment with any suitable frequency (e.g., continuously, daily, in response to a request from user equipment, etc.).

In some television-centric embodiments, guidance data from data source 120 may be provided to users' equipment using a client-server approach. For example, a guidance application client residing on the user's equipment may initiate sessions with server 140 to obtain guidance data when needed. In some embodiments, the guidance application may initiate sessions with server 104 via a home network server (e.g., a server located in home network 113 that supports the user equipment devices located in home network 113).

There may be multiple data sources (such as data source 120) in system 100, although only one data source is shown in FIG. 1 to avoid overcomplicating the drawing. For example, a separate data source may be associated with each of a plurality of television broadcasters and may provide data that is specific to those broadcasters (e.g., advertisements for future programming of the broadcasters, logo data for displaying broadcasters' logos in program guide display screens, etc.). Data source 120 and any other system components of FIG. 1 may be provided using equipment at one or more locations. Systems components are drawn as single boxes in FIG. 1 to avoid overcomplicating the drawings.

Data source 120 may provide data to distribution facility 104 over communications path 122 for distribution to the associated user equipment and home network 113 (discussed below) over paths 114, 116, 118, and 119 (e.g., when data source 120 is located at a main facility). Communications path 122 may be any suitable communications path such as a satellite communications path or other wireless path, a fiber-optic or other wired communications path, a path that supports Internet communications, or other suitable path or combination of such paths.

In some television-centric and non-television centric approaches, data source 120 may provide guidance data directly to user equipment 108 over path 124, communications network 126, and path 128 (e.g., when data source 120 is located at a facility such as one of programming sources 102). In some embodiments of the present invention, data source 120 may provide guidance data directly to user equipment located on home network 113 (discussed below) over path 124, communications network 126, and path 139 (e.g., when data source 120 is located at a facility such as one of programming sources 102). Paths 124, 128, and 139 may be wired paths such as telephone lines, cable paths, fiber-optic paths, satellite paths, wireless paths, any other suitable paths or a combination of such paths. Communications network 126 may be any suitable communications network, such as the Internet, the public switched telephone network, or a packet-based network.

User equipment devices, including user equipment devices located on home network 113 (discussed below), such as user television equipment and personal computers, may use the program schedule data and other interactive media guidance application data to display program listings and other information (e.g., information on digital music) for the user. An interactive television program guide application or other suitable interactive media guidance application may be used to display the information on the user's display (e.g., in one or more overlays that are displayed on top of video for a given television channel). Interactive displays may be generated and displayed for the user using any suitable approach. In one suitable approach, distribution facility 104, server 130, or another facility, may generate application display screens and may transmit the display screens to user equipment for display. In another suitable approach, user equipment may store data for use in one or more interactive displays (e.g., program schedule data, advertisements, logos, etc.), and an interactive media guidance application implemented at least partially on the user equipment may generate the interactive displays based on instructions received from distribution facility 104, server 130 or another facility. In some embodiments of the present invention, user equipment may store only the data that is used to generate the interactive television displays (e.g., storing logo data for a particular television broadcaster only if the logo is to be included in one or more interactive television displays). In some embodiments of the present invention, user equipment may store data that is not necessarily used to generate the interactive television displays (e.g., storing advertisements associated with a particular television broadcaster that may or may not be displayed depending on, for example, the outcome of negotiations with the television broadcaster). Any other suitable approach or combination of approaches may be used to generate and display interactive overlays for the user.

In still other embodiments, interactive media guidance applications (television-centric and non-television centric) may be provided online as, for example, websites. For example, server 130 may provide an online interactive television program guide. As another example, user equipment 108 may be a mobile device, such as a cellular telephone or personal digital assistant (PDA). The mobile device may be web-enabled to allow the user to access an on-line guidance application (which may be modified from its original version to make it appropriate for a cellular phone). Alternatively, the mobile device may have an applet that communicates with server 130 to obtain guidance data via the Internet.

Server 130 may receive program schedule data and other data from data source 120 via communications path 124, communications network 126, and communications path 132 or via another suitable path or combination of paths. Path 132 may be a satellite path, fiber-optic path, wired path, or any other path or combination of paths. User equipment 108 may access the on-line interactive media guidance application and other sources from server 130 via communications path 128. User equipment 108 may also access the application and other services on server 130 via communications path 114, distribution facility 104, and communications path 134. For example, a cable modem or other suitable equipment may be used by user equipment 108 to communicate with distribution facility 104.

User equipment such as user television equipment 110, user computer equipment 112, and user equipment located on home network 113 may access the on-line interactive media guidance application and server 130 using similar arrangements. User television equipment 110 may access the on-line interactive media guidance application and server 130 using communications path 136 or using path 116, distribution facility 104, and path 134. User computer equipment 112 may access the on-line interactive media guidance application and server 130 using communications path 138 or using path 118, distribution facility 104, and path 134. User equipment located on home network 113 may access the on-line media guidance application and server 130 using communications path 139 or using path 119, distribution facility 104, and path 134. Paths 136, 138, and 139 may be any suitable paths such as wired paths, cable paths, fiber-optic paths, wireless paths, satellite paths, or a combination of such paths.

In some embodiments, system 100 may support other interactive applications in addition to the interactive media guidance applications. Such applications may be implemented using any suitable approach. For example, the interactive applications may be implemented locally on the user equipment or in a distributed fashion (e.g., using a client-server architecture in which the user equipment serves at least partly, and for at least some of the time, as the client and a server, such as server 140 at distribution facility 104, server 130, or other suitable equipment acts as the server). Other distributed architectures may also be used if desired. Moreover, some or all of the features of the interactive applications of system 100 (including the media guidance application) may be provided using operating system software or middleware software. Such operating system software and middleware may be used instead of or in combination with application-level software. In yet other approaches, interactive applications may also be supported by servers or other suitable equipment at one or more service providers such as service provider 142. Regardless of the particular arrangement used, the software that supports these features may be referred to as an application or applications.

For example, an interactive application such as a home shopping service may be supported by a service provider such as service provider 142 that has sales representatives, order fulfillment facilities, account maintenance facilities, and other equipment for supporting interactive home shopping features. A home shopping application that is implemented using the user equipment may be used to access the service provider to provide such features to the user. The user equipment may access service provider 142 via distribution facility 104 and communications path 144 or via communications network 126 and communications path 146. Communications paths such as paths 144 and 146 may be any suitable paths such as wired paths, cable paths, fiber-optic paths, satellite paths, or a combination of such paths.

Another example of an interactive application is a home banking application. A home banking service may be supported using personnel at facilities such as service provider 142. An interactive home banking application that is implemented using the user equipment may access the home banking service via distribution facility 104 and communications path 144 or via communications network 126 and communications path 146.

If desired, an interactive media guidance application such as a network-based video recorder or a video-on-demand application may be supported using server 140, server 130, a home network server, or equipment at service provider 142. Video-on-demand content and video recorded using a network-based video recorder arrangement may be stored on server 140, server 130, a home network server, or at service provider 142 and may be provided to the user equipment when requested by users. An interactive television program guide, for example, may be used to support the functions of a personal video recorder (sometimes called a digital video recorder) that is implemented using user equipment 108. Illustrative equipment that may be used to support personal video recorder functions include specialized personal video recorder devices, integrated receiver decoders (IRDs), set-top boxes with integrated or external hard drives, or personal computers with video recording capabilities.

Interactive applications such as media guidance applications (e.g., interactive television program guide applications and video-on-demand applications), home shopping applications, home banking applications, game applications, and other applications (e.g., applications related to e-mail and chat or other communications functions, etc.) may be provided as separate applications that are accessed through a navigation shell application (i.e., a menu application with menu options corresponding to the applications). The features of such applications may be combined. For example, games, video-on-demand services, home shopping services, network-based video recorder functions, personal video recorder functions, navigational functions, program guide functions, communications functions, and other suitable functions may be provided using one application or any other suitable number of applications. The one or more applications may display various overlays on user equipment including, for example, interactive television information on top of video for a given television channel.

Interactive television program guide applications, home banking applications, home shopping applications, network-based video recorder and personal video recorder applications, video-on-demand applications, gaming applications, communications applications, and navigational applications are only a few illustrative examples of the types of interactive media guidance and other applications that may be supported by system 100. Other suitable interactive applications that may be supported include news services, web browsing and other Internet services, and interactive wagering services (e.g., for wagering on horse races, sporting events, and the like). Interactive television overlays that are displayed by these applications may also be customized in accordance with the present invention.

Users may have multiple types of user equipment by which they access media and obtain media guidance. For example, some users may have home networks that are accessed by in-home and mobile devices. As shown in FIG. 1, home network 113 communicates with distribution facility 104 and server 130 over paths 119 and 139 (and, in the case of server 130, communications network 126). Such home networks 113 may be located, for example, in homes of users or distributed, for example, among homes of users. Home networks 113 may each include a plurality of interconnected user equipment devices, such as, for example user equipment devices 108, 110 and 112. In some embodiments, users may control in-home devices via a media guidance application implemented on a remote device. For example, users may access an online media guidance application on a website via a personal computer at their office, or a mobile device such as a PDA or web-enabled cellular telephone. The user may set settings (e.g., recordings, reminders, or other settings) on the on-line guidance application to control the user's in-home equipment. The on-line guide may control the user's equipment directly, or by communicating with a media guidance application on the user's in-home equipment. For the purposes of illustration and not limitation, remote devices (e.g., cellular phones and personal computers) that are configured to access the user equipment devices in a home network will be described as a part of the home network.

Figure 2:
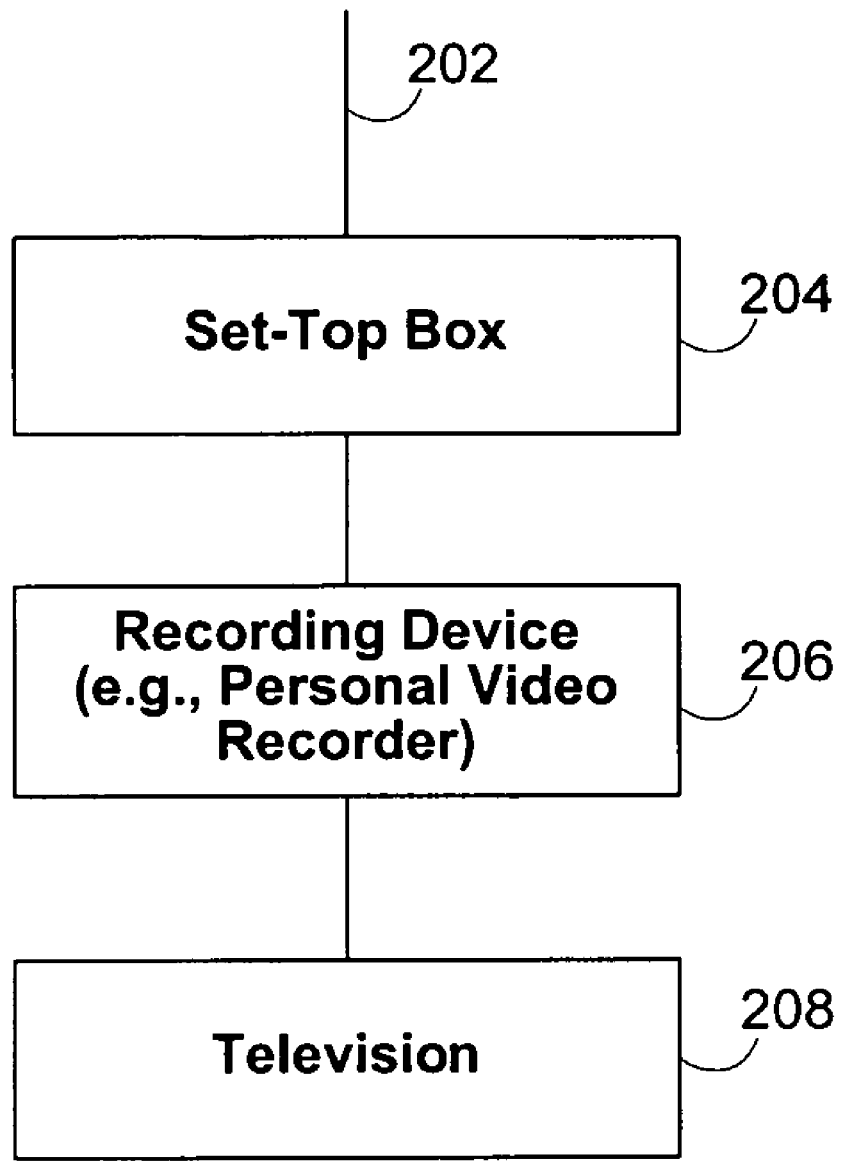
FIG. 2 is a diagram of illustrative user television equipment in accordance with the present invention.

FIGS. 2-6 show illustrative arrangements for user equipment. An illustrative set-top box-based arrangement for user equipment 110 is shown in FIG. 2. User television equipment 110 may be stand-alone or a part of home network 113 (FIG. 1). Input/output 202 may be connected to communications paths such as paths 116 and 136 (FIG. 1). Input/output functions may be provided by one or more wires or communications paths, but are shown as a single path in FIG. 2 to avoid overcomplicating the drawing. Television programming, program guide data, and any other suitable interactive media guidance application data or other data may be received using input/output 202. Commands and requests and other data generated as a result of user interactions with the interactive media guidance application may also be transmitted over input/output 202.

Set-top box 204 may be any suitable analog or digital set-top box (e.g., a cable set-top box). Set-top box 204 may contain an analog tuner for tuning to a desired analog television channel (e.g., a channel comprising television programming, interactive television data, or both). Set-top box 204 may also contain digital decoding circuitry for receiving digital television channels (e.g., channels comprising television or music programming, interactive television data, etc.). Set-top box 204 may also contain a high-definition television tuner for receiving and processing high-definition television channels. Analog, digital, and high-definition channels may be handled together if desired. Multiple tuners may be provided (e.g., to handle simultaneous watch and record functions or picture-in-picture (PIP) functions). Box 204 may be an integrated receiver decoder (IRD) that handles satellite television. If desired, box 204 may have circuitry for handling cable, over-the-air broadcast, and satellite content.

Set-top box 204 may be configured to output media, such as television programs, in a preferred format. Because television programs may be received in a variety of formats, set-top box 204 may contain scaler circuitry for upconverting and downconverting television programs into the preferred output format used by set-top box 204. For example, set-top box 204 may be configured to output television programs in 720p. In this example, the scaler circuitry may upconvert standard-definition television programs having 480 lines of vertical resolution to 720p format and downconvert certain high-definition television programs having 1080 lines of vertical resolution to 720p format.

Box 204 may include a storage device (e.g., a digital storage device such as a hard disk drive) for providing recording capabilities. Box 204 may also be connected to a recording device 206 such as a videocassette recorder, personal video recorder, optical disc recorder, or other device or devices with storage capabilities. In some embodiments, box 204 may be configured to record either standard-definition television programs or high-definition television programs. In some embodiments, box 204 may be configured to record both standard-definition television programs and high-definition television programs.

Set-top box 204 contains a processor (e.g., a microcontroller or microprocessor or the like) that is used to execute software applications. Set-top box 204 may contain memory such as random-access memory for use when executing applications. Nonvolatile memory may also be used (e.g., to launch a boot-up routine and other instructions). Hard disk storage in box 204 or in recording device 206 may be used to back up data and to otherwise support larger databases and storage requirements than may be supported using random-access memory approaches. Hard disk storage in box 204 or in recording device 206 may also be used to store and back up program guide settings or saved user preferences.

Set-top box 204 may have infrared (IR) or other communications circuitry for communicating with a remote control or wireless keyboard. Set-top box 204 may also have dedicated buttons and a front-panel display. The front-panel display may, for example, be used to display the current channel to which the set-top box is tuned.

Set-top box 204 may also have communications circuitry such as a cable modem, an integrated services digital network (ISDN) modem, a digital subscriber line (DSL) modem, a telephone modem, or a wireless modem for communications with other equipment. Such communications may involve the Internet or any other suitable communications networks or paths. If desired, the components of set-top box 204 may be integrated into other user equipment (e.g., a television or video recorder).

Recording device 206 may be used to record videos provided by set-top box 204. For example, if set-top box 204 is tuned to a given television channel, the video signal for that television channel may be passed to recording device 206 for recording on a videocassette, compact disc, digital video disk, or internal hard drive or other storage device. In some embodiments, recording device 206 may be configured to record either standard-definition television programs or high-definition television programs. In some embodiments, recording device 206 may be configured to record both standard-definition television programs and high-definition television programs. Recording device 206 may have communications circuitry such as a cable modem, an ISDN modem, a DSL modem, or a telephone modem for communications with other equipment. Such communications may involve the Internet or any other suitable communications networks or paths. The components of recording device 206 may be integrated into other user equipment (e.g., a television, stereo equipment, etc.).

Recording device 206 may be controlled using a remote control or other suitable user interface. If desired, video recorder functions such as start, stop, record and other functions for device 206 may be controlled by set-top box 204. For example, set-top box 204 may control recording device 206 using infrared commands directed toward the remote control inputs of recording device 206 or set-top box 204 may control recording device 206 using other wired or wireless communications paths between box 204 and device 206.

The output of recording device 206 may be provided to television 208 for display to the user. In some embodiments, television 208 may be capable of displaying high-definition programming (i.e., HDTV-capable). If desired, multiple recording devices 206 or no recording device 206 may be used. If recording device 206 is not present or is not being actively used, the video signals from set-top box 204 may be provided directly to television 208. Any suitable television or monitor may be used to display the video. For example, if the video is in a high-definition format, an HDTV-capable television or monitor is required to display the video. In the equipment of FIG. 2 and the other equipment of system 100 (FIG. 1), the audio associated with various video items is typically distributed with those video items and is generally played back to the user as the videos are played. In some embodiments, the audio may be distributed to a receiver (not shown), which processes and outputs the audio via external speakers (not shown).

Figure 3:
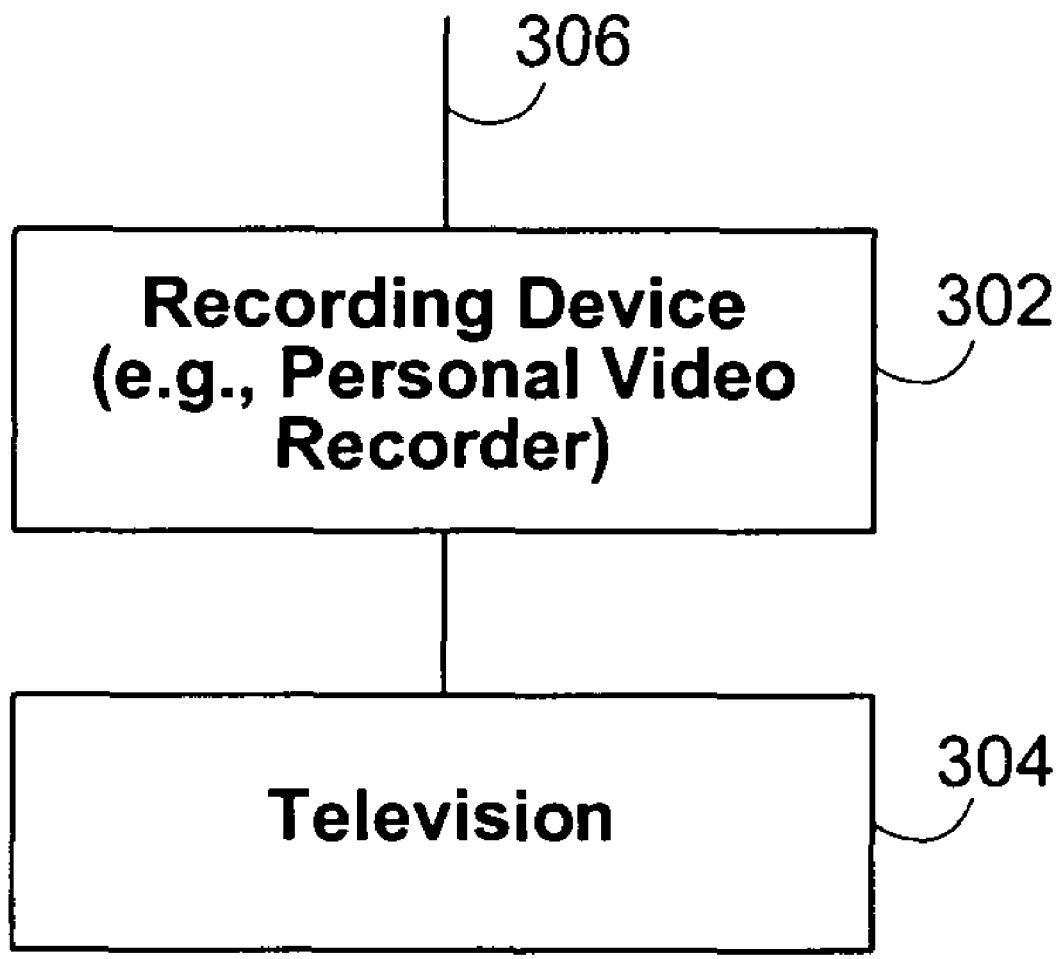
FIG. 3 is a diagram of additional illustrative user television equipment in accordance with the present invention.

Another illustrative arrangement for user television equipment 110 (FIG. 1) is shown in FIG. 3. User television equipment 110 may be stand-alone or a part of home network 113 (FIG. 1). In the example of FIG. 3, user television equipment 110 includes a recording device 302 such as a digital video recorder (e.g., a personal video recorder (PVR)) that uses a hard disk or other storage for recording video. Recording device 302 may alternatively be a digital videodisc recorder, compact disc recorder, videocassette recorder, or other suitable recording device. Equipment 110 of FIG. 3 may also include a television 304. In some embodiments, television 304 may be HDTV-capable. Input/output 306 may be connected to communications paths such as paths 116 and 136 (FIG. 1). Television programming, program schedule data, and other data (e.g., advertisement data, data indicating one or more television channels for which the display of an overlay is to be customized, etc.) may be received using input/output 306. Commands and requests and other data from the user may be transmitted over input/output 306.

Recording device 302 may contain at least one analog tuner for tuning to a desired analog television channel (e.g., to display video for a given television channel to a user, to receive program guide data and other data) and multiple other tuners may also be provided. Recording device 302 may also contain digital decoding circuitry for receiving digital television programming, music programming, program guide data, and other data on one or more digital channels. Recording device 302 may also contain circuitry for receiving high-definition television channels. If desired, recording device 302 may contain circuitry for handling analog, digital, and high-definition channels. Recording device 302 also contains a processor (e.g., a microcontroller or microprocessor or the like) that is used to execute software applications. Recording device 302 may contain memory such as random-access memory for use when executing applications. Nonvolatile memory may also be used to store a boot-up routine or other instructions. The hard disk and other storage in recording device 302 may be used to support databases (e.g., program guide databases or other interactive television application databases). The hard disk or other storage in recording device 302 may also be used to record video such as television programs or video-on-demand content or other content provided to recording device 302 over input/output 306.

Recording device 302 may have IR communications circuitry or other suitable communications circuitry for communicating with a remote control. Recording device 302 may also have dedicated buttons and a front-panel display. The front-panel display may, for example, be used to display the current channel to which the recording device is tuned.

Recording device 302 may also have communications circuitry such as a cable modem, an ISDN modem, a DSL modem, a telephone modem, or a wireless modem for communications with other equipment. Such communications may involve the Internet or other suitable communications networks or paths.

If desired, recording device 302 may include a satellite receiver or other equipment that has wireless communications circuitry for receiving satellite signals.

Recording device 302 of FIG. 3 or recording device 206 of FIG. 2 may record new video while previously recorded video is being played back on television 304 or 208. This allows users to press a pause button during normal television viewing. When the pause button is pressed, the current television program is stored on the hard disk of digital video recorder 302. When the user presses play, the recorded video may be played back. This arrangement allows the user to seamlessly pause and resume television viewing. Recording devices 302 and 206 may also be used to allow a user to watch a previously-recorded program while simultaneously recording a new program.

The set-top box arrangement of FIG. 2 and the personal video recorder with a built-in set-top box arrangement of FIG. 3 are merely illustrative. Other arrangements may be used if desired. For example, user television equipment may be based on a WebTV box, a personal computer television (PC/TV), or any other suitable television equipment arrangement. If desired, the functions of components such as set-top box 204, recording device 302, a WebTV box, or PC/TV or the like may be integrated into a television or personal computer or other suitable device.

Figure 4:
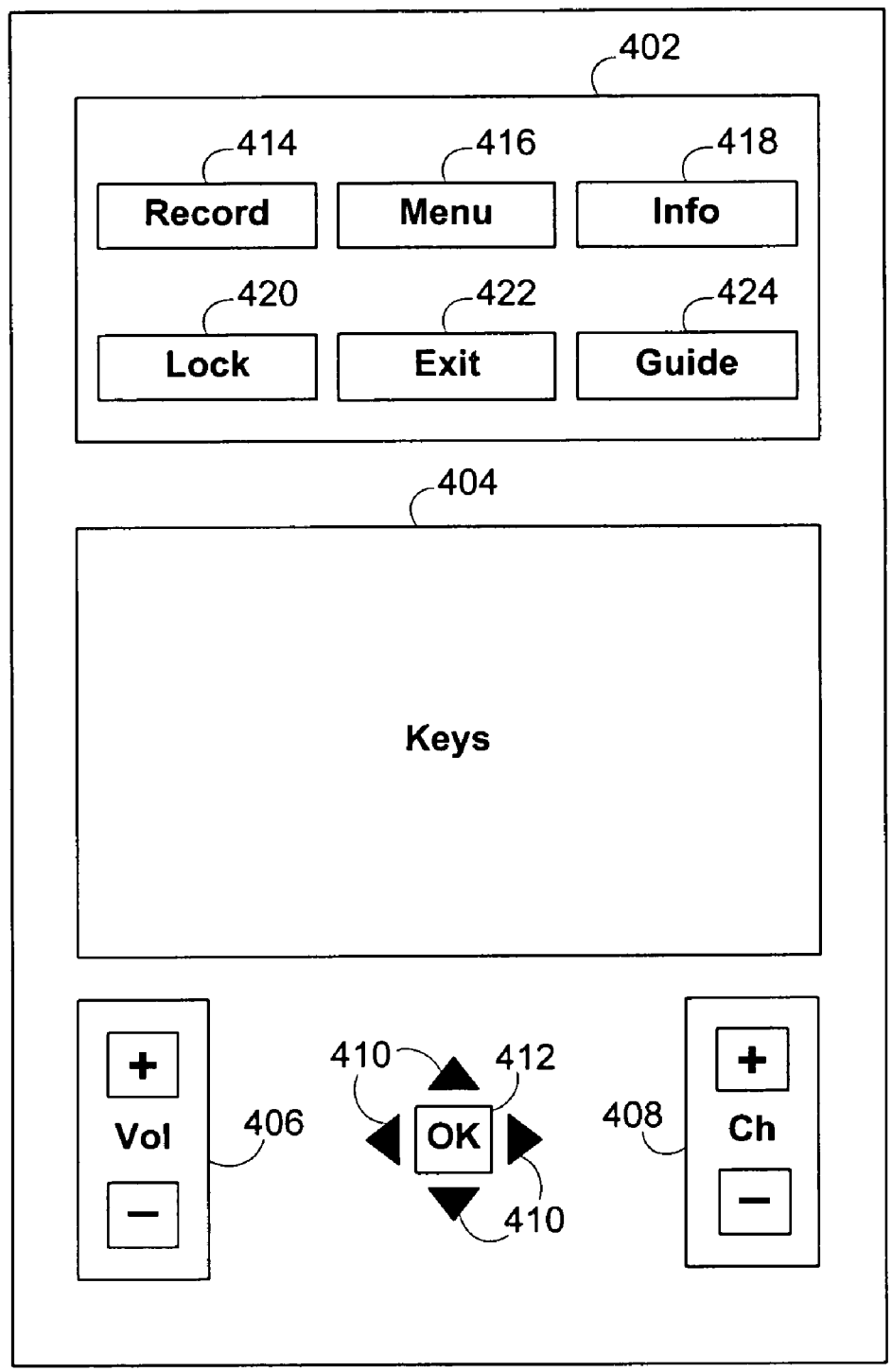
FIG. 4 is a diagram of an illustrative remote control in accordance with the present invention.

An illustrative remote control 400 for operating user television equipment 110 (FIG. 1) or suitable user computer equipment 112 is shown in FIG. 4. Remote control 400 is only illustrative and any other suitable user input interface may be used to operate user equipment (e.g., a mouse, trackball, keypad, keyboard, touch screen, voice recognition system, etc.). Remote control 400 may have function keys 402 and other keys 404 such as keypad keys, power on/off keys, pause, stop, fast-forward and reverse keys. Volume up and down keys 406 may be used for adjusting the volume of the audio portion of a video. Channel up and down keys 408 may be used to change television channels and to access content on virtual channels. Cursor keys 410 may be used to navigate on-screen menus. For example, cursor keys 410 may be used to position an on-screen cursor, indicator, or highlight (sometimes all generically referred to herein as a highlight or highlight region) to indicate interest in a particular option or other item on a display screen that is displayed by the interactive television application.

OK key 412 (sometimes called a select or enter key) may be used to select on-screen options that the user has highlighted.

Keys 402 may include RECORD key 414 for initiating recordings. MENU button 416 may be used to direct an interactive media guidance application to display a menu on the user's display screen (e.g., on television 208 or 304 or on a suitable monitor or computer display). INFO button 418 may be used to direct an interactive media guidance application to display an information display screen. For example, when a user presses INFO key 418 while video for a given television channel is displayed for the user, an interactive television program guide may display a FLIP/BROWSE overlay including program schedule information for the current program on the given television channel on top of the video. As another example, when a particular program listing in an interactive television program listings display screen is highlighted, the user pressing INFO button 418 may cause an interactive television program guide to provide additional program information associated with that program listing (e.g., a program description, actor information, schedule information, etc.).

LOCK button 420 may be used to modify access privileges. For example, a parent may use LOCK button 420 or on-screen options to establish parental control settings for the interactive media guidance application. The parental control settings may be time-based settings (e.g., to prevent a child from watching television during a particular time block, such as from 3:00 PM to 5:00 PM). The parental control settings may also be used to, for example, block programming based on rating, channel, and program title. A locked or blocked program (or other media) is typically not viewable until the interactive media guidance application is provided with a suitable personal identification number (PIN). Once this PIN has been entered, the interactive media guidance application will unlock the user's equipment and allow the locked content to be accessed.

EXIT button 422 may be used to exit the interactive media guidance application or to exit a portion of the interactive media guidance application (e.g., to cause an interactive television program guide to remove a FLIP, BROWSE, or other interactive television overlay from the display screen). GUIDE button 424 may be used to invoke an interactive television program guide (e.g., a program guide menu screen, program listings screen, or other program guide screen).

The keys shown in FIG. 4 are merely illustrative. Other keys or buttons may be provided if desired. For example, a music button may be used to access music with the interactive media guidance application. An edit button may be used to edit stored content (e.g., to remove commercials, remove portions of a video, etc.). Alphanumeric buttons may be used to enter alphanumeric characters. A last or back button may be used to browse backward in the interactive media guidance application (e.g., to return to a previous channel, web page, or other display screen). Video recorder function buttons such as a play button, pause button, stop button, rewind button, fast-forward button, and record button, may be used to control video recorder functions (local or network-based) in system 100 (FIG. 1). A help key may be used to invoke help functions such as context-sensitive on-screen help functions.

Figure 5:
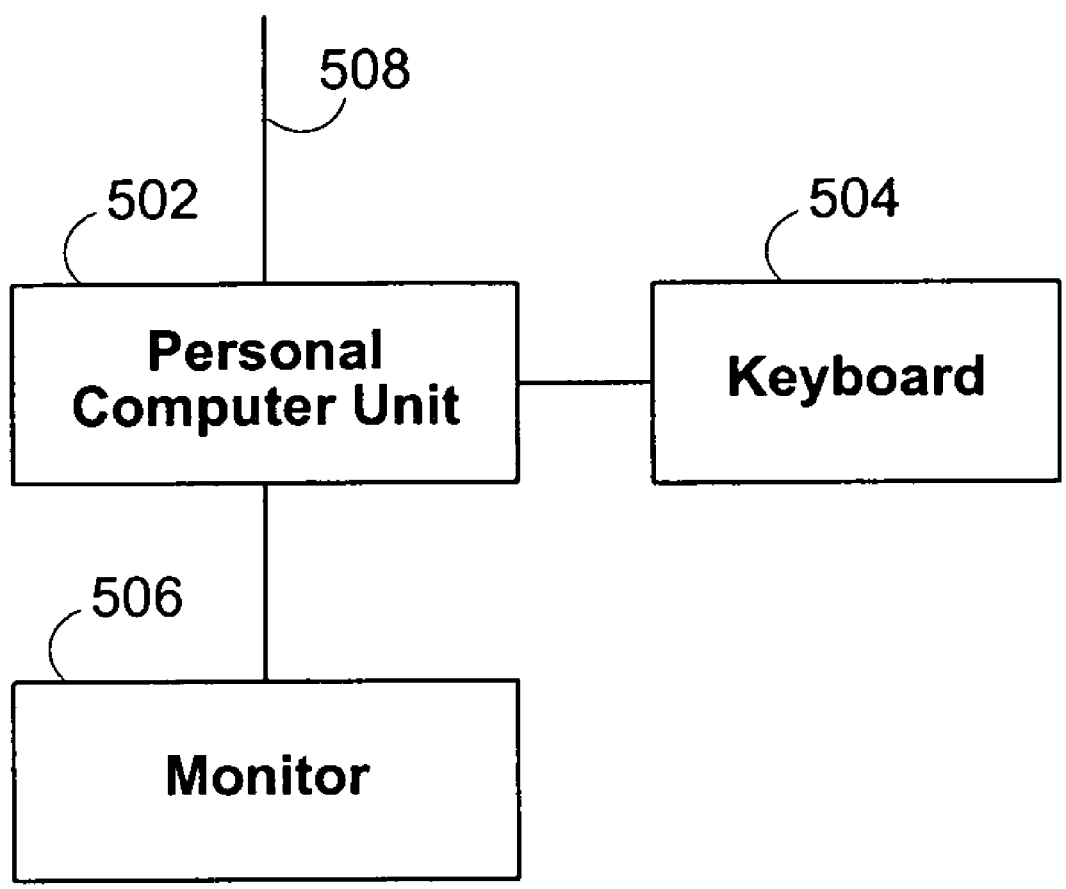
FIG. 5 is a diagram of illustrative user computer equipment in accordance with the present invention.

Illustrative user computer equipment 112 (FIG. 1) is shown in FIG. 5. User computer equipment 112 may be stand-alone or a part of home network 113 (FIG. 1). In the arrangement of FIG. 5, personal computer unit 502 may be controlled by the user using keyboard 504 and/or other suitable user input device such as a trackball, mouse, touch pad, touch screen, voice recognition system, or a remote control, such as remote control 400 of FIG. 4. Video content, such as television programming or web pages having video elements, and interactive media guidance application display screens may be displayed on monitor 506. Television and music programming, media guidance application data (e.g., television program guide data), video-on-demand content, video recordings played back from a network-based video recorder, and other data may be received from paths 118 and 138 (FIG. 1) using input/output 508. User commands and other information generated as a result of user interactions with the interactive media guidance application and system 100 (FIG. 1) may also be transmitted over input/output 508.

Personal computer unit 502 may contain a television or video card, such as a television tuner card, for decoding analog, digital, and high-definition television channels and for handling streaming video content. Multiple video cards (e.g., tuner cards) may be provided if desired. An illustrative television tuner card that may be used may contain an analog television tuner for tuning to a given analog channel, digital decoding circuitry for filtering out a desired digital television or music channel from a packetized digital data stream, and a high-definition television tuner for tuning to a high-definition channel. Any suitable card or components in computer unit 502 may be used to handle video and other content delivered via input/output line 508 if desired.

Personal computer unit 502 may contain one or more processors (e.g., microprocessors) that are used to run the interactive media guidance application or a portion of the interactive media guidance application.

Personal computer unit 502 may include a hard drive, a recordable DVD drive, a recordable CD drive, or other suitable storage device or devices that stores video, program guide data, and other content. The interactive media guidance application and personal computer unit 502 may use a storage device or devices to, for example, provide the functions of a personal video recorder.

User equipment, such as user equipment 108, user television equipment 110, user computer equipment 112, and user equipment located on home network 113 (FIG. 1), may be used with network equipment such as server 130, server 140, a home network server, and equipment at service providers such as service provider 142 of FIG. 1 to provide network-based video recording functions. Video recording functions may be provided by storing copies of television programs and other video content on a remote server (e.g., server 130, server 140, or a home network server) or other network-based equipment, such as equipment at a service provider such as service provider 142.

Video recordings may be made in response to user commands that are entered at user equipment 108 or user equipment located on home network 113 (FIG. 1). In a personal video recorder arrangement, the interactive media guidance application may be used to record video locally on the user equipment in response to the user commands. In a network-based video recorder arrangement, the interactive media guidance application may be used to record video or to make virtual recordings (described below) on network equipment such as server 130, server 140, a home network server, or equipment at service provider 142 in response to the user commands. The user commands may be provided to the network equipment over the communications paths shown in FIG. 1. The personal video recorder arrangement and the network-based video recorder arrangement can support functions such as fast-forward, rewind, pause, play, and record.

To avoid unnecessary duplication in a network-based video recorder environment, system 100 may provide network-based video recording capabilities by using virtual copies or recordings. With this approach, each user may be provided with a personal area on the network that contains a list of that user's recordings. The video content need only be stored once (or a relatively small number of times) on the network equipment, even though a large number of users may have that video content listed as one of their recordings in their network-based video recorder personal area. Personal settings or any other suitable data may be stored in a user's personal area on the network.

Figure 6:
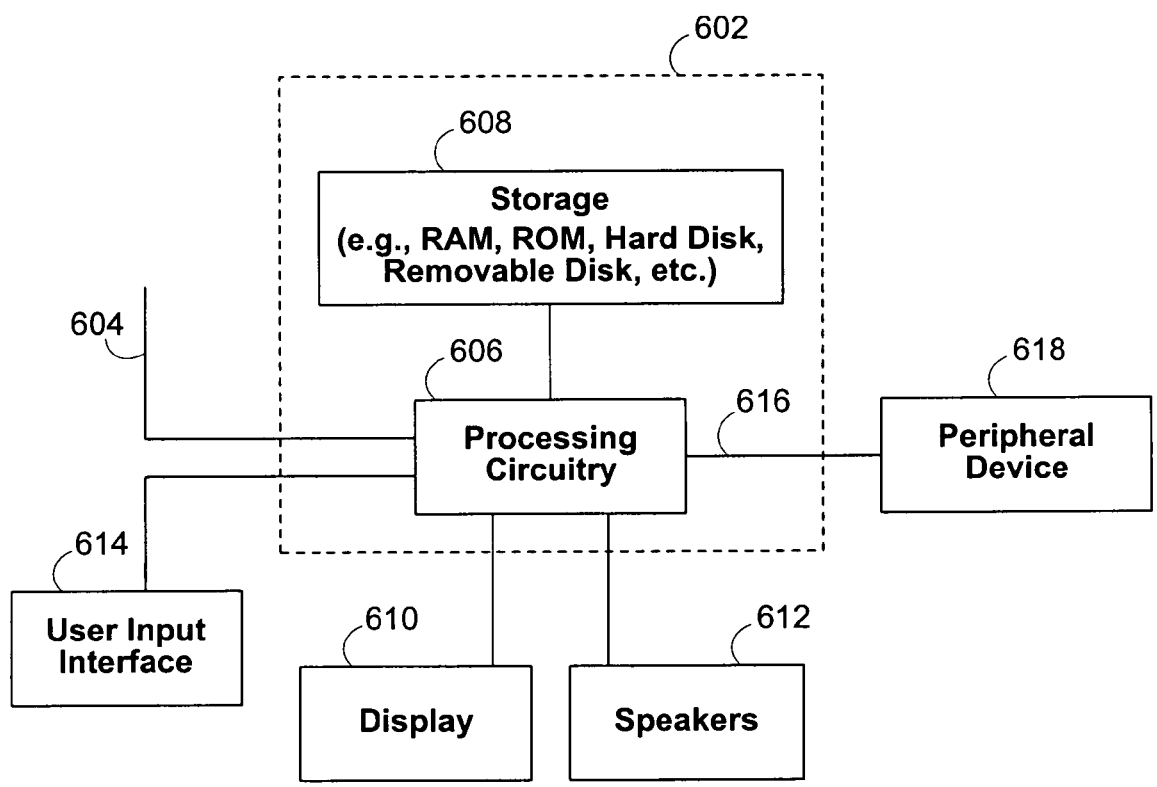
FIG. 6 is a generalized diagram of illustrative user equipment in accordance with the present invention.

The user television equipment and user computer equipment arrangements described above are merely illustrative. A more generalized embodiment of illustrative user equipment 108, 110, and 112 (FIG. 1) and user equipment located on home network 113 (FIG. 1) is shown in FIG. 6. Control circuitry 602 is connected to input/output 604. Input/output 604 may be connected to one or more communications paths such as paths 114, 116, 118, 128, 136, and 138 of FIG. 1. Media (e.g., television programming, music programming, other video and audio, and web pages) may be received via input/output 604 (e.g., from programming sources 102, servers or other equipment, such as server 130, service providers such as service provider 142, distribution facility 104, etc.). Interactive media guidance application data, such as program schedule information for an interactive television program guide, may be received from data source 120 via input/output 604. Input/output 604 may also be used to receive data from data source 120 for other interactive television applications. The user may use control circuitry 602 to send and receive commands, requests, and other suitable data using input/output 604.

Control circuitry 602 may be based on any suitable processing circuitry 606 such as processing circuitry based on one or more microprocessors, microcontrollers, digital signal processors, programmable logic devices, etc. In some embodiments, control circuitry 602 executes instructions for an interactive media guidance application or other interactive application (e.g., web browser) from memory. Memory (e.g., random-access memory and read-only memory), hard drives, optical drives, or any other suitable memory or storage devices may be provided as storage 608 that is part of control circuitry 602. Tuning circuitry such as one or more analog tuners, one or more MPEG-2 decoders or other digital video circuitry, high-definition tuners, or any other suitable tuning or video circuits or combinations of such circuits may also be included as part of circuitry 602. Encoding circuitry (e.g., for converting over-the-air, analog, or digital signals to MPEG signals for storage) may also be provided. The tuning and encoding circuitry may be used by the user equipment to receive and display, play, or record a particular television or music channel or other desired audio and video content (e.g., video-on-demand content or requested network-based or local video recorder playback). Television programming and other video and on-screen options and information may be displayed on display 610. Display 610 may be a monitor, a television, or any other suitable equipment for displaying visual images. In some embodiments, display 610 may be HDTV-capable. Speakers 612 may be provided as part of a television or may be stand-alone units. Digital music and the audio component of videos displayed on display 610 may be played through speakers 612. In some embodiments, the audio may be distributed to a receiver (not shown), which processes and outputs the audio via speakers 612.

A user may control the control circuitry 602 using user input interface 614. User input interface 614 may be any suitable user interface, such as a mouse, trackball, keypad, keyboard, touch screen, touch pad, voice recognition interface, or a remote control.

Figure 7:
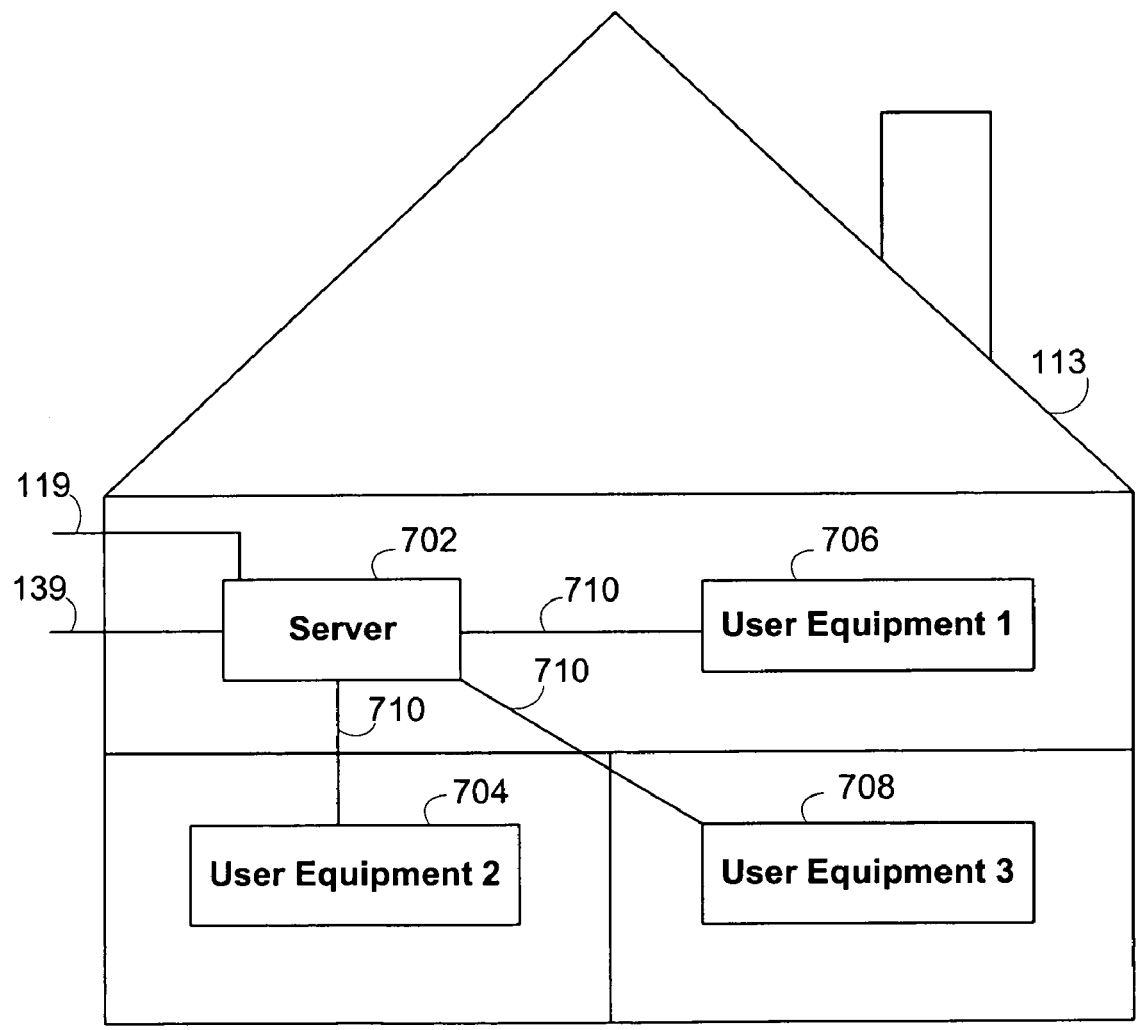
FIG. 7 is a diagram of an illustrative home network in which a plurality of user equipment and a server are implemented in a client-server configuration in accordance with the present invention.

FIG. 7 shows an illustrative home network 113. The user equipment devices located on home network 113 may be able to share program data (such as program listings and program information), recorded content, program guide settings, and any other suitable data with other user equipment devices located on home network 113. Interactive television applications implemented on or accessible from user equipment devices located on home network 113 may be able to adjust program guide settings for interactive television applications implemented on or accessible from other user equipment devices located on home network 113.

FIG. 7 shows an illustrative home network 113 based on a client-server architecture. Home network 113 may include server 702 and user equipment 704, 706, and 708. Server 702 may be connected to user equipment 704, 706, and 708 via communication paths 710. In some embodiments, server 702 may be embedded within one of the user equipment devices. Communications paths 119 and 139 may connect home network 113 to television distribution facility 104 (FIG. 1) and communications network 126 (FIG. 1), respectively, via server 702. User equipment 704, 706, and 708 may each be any of user equipment 108, 110, and 112 (FIG. 1). User equipment 704, 706, and 708 and server 702 may be placed in various rooms within a home. For example, server 702 may be placed in a den, user equipment 704 may be placed in a children's room, user equipment 706 may be placed in a living room, user equipment 708 may be placed in a parents' room. Communication paths 710 may be any suitable communications path for in-home networks, such as wired paths, cable paths, fiber-optic paths, wireless paths, or a combination of such paths.

It should be understood by one skilled in the art that user equipment devices in home network 113 may be arranged in any suitable configuration (e.g., a peer-to-peer configuration). Additional home network configurations are shown in U.S. patent application Ser. No. 09/356,161, filed Jul. 16, 1999, which is being incorporated by reference herein in its entirety.

A user may select a television program for recording using a user equipment device located in a home network. Any of the user equipment devices located in the home network may be configured to retrieve the recording of the selected content. The user may configure the delivery of the recorded content and associated data and interactive applications to each of the user equipment devices in the home network. Associated data may include any suitable data, such as, for example, schedule information, program descriptions, program information (e.g., actors, directors, release date, ratings, genre, etc.), related articles, interviews, reviews, metadata having links to related content, descriptive metadata, and other similar content or data relating to the recorded content that may be provided by data source 120 (FIG. 1) or any other suitable device in system 100 (FIG. 1). Associated interactive applications may include any suitable interactive application, such as, for example, a navigation application, a commerce application, a voting application, a trivia application, a wagering application, a user behavior monitoring application, a preference setting application, an interactive advertising application, and any other suitable application that may be provided by any suitable device in system 100 (FIG. 1).

An example of a navigation application is an application that allows users to navigate among content and associated data and interactive applications. An example of a commerce application is an application that allows users to purchase products related to the associated content. An example of a voting application is an application that allows users to participate in polls conducted in connection with the associated content. An example of a trivia application is an application that allows users to answer trivia questions during playback of the associated content. An example of a wagering application is an application that allows users to create and place wagers on events related to the associated content. An example of a user behavior monitoring application is an application that tracks user behavior while the associated content is being played back. An example of a preference setting application is an application that allows users to select preferences relevant to associated content. An example of an interactive advertising application is an application that displays advertisements and allows users to interact with the displayed advertisements.

For example, an episode of "Desperate Housewives" may be recorded on a home network (e.g., home network 113 (FIG. 1)) that includes a high-definition user equipment device, a standard-definition user equipment device, and a cellular phone. In some embodiments, the user may select the formats of the content to record. The user may select to record the high definition, standard definition, and H.264 formats of "Desperate Housewives" on a home network server (e.g., server 702 (FIG. 7)). The user may select the formats of "Desperate Housewives" to deliver to the user equipment devices in the home network.

In some embodiment, a server or user equipment device in the home network may determine the available formats of "Desperate Housewives" and compare the requirements of the available formats of "Desperate Housewives" and the capabilities of the user equipment devices in the home network to determine the most suitable formats of "Desperate Housewives" to record. A user equipment device in the home network that requests the recording of "Desperate Housewives" may be provided with the format of "Desperate Housewives" in the most suitable format to be displayed on the user equipment device. For example, a high-definition user equipment device may be provided with the recording of "Desperate Housewives" in high definition and a cellular phone may be provided with the recording of "Desperate Housewives" in H.264 format.

In some embodiments, the highest-quality format of "Desperate Housewives" may be recorded and later translated into the formats suitable for display by the user equipment devices in the home network. The recording of "Desperate Housewives" may be translated into the formats suitable to be displayed by the user equipment devices in the home network. For example, a standard-definition user equipment devices may be provided with the recording of "Desperate Housewives" translated into standard definition.

In some embodiments, an alternate version of "Desperate Housewives" may be provided to any of the user equipment devices in the home network. The alternate version may be a condensed version of "Desperate Housewives" or an extended version of "Desperate Housewives". For example, the alternate version of "Desperate Housewives" may be stored on a server (e.g., server 140 (FIG. 1)) and provided to one of the user equipment devices in the home network. In another example, the alternate version of "Desperate Housewives" may be locally generated.

Also, the user may configure the delivery of data associated with "Desperate Housewives" to the user equipment devices in the home network. For example, title information and a program summary may be data that is associated with "Desperate Housewives". The user may select to deliver both the title information and the program summary to the standard-definition and high-definition user equipment devices in the home network. However, the user may only select to deliver the title information to the cellular phone because of the limited display capabilities of the cellular phone.

Furthermore, the user may configure the delivery of applications associated with "Desperate Housewives" to the user equipment devices in the home network. For example, a shopping application may be an application that is associated with "Desperate Housewives". The user may select to deliver the shopping application to the standard-definition and high-definition user equipment devices. However, the user may opt not to deliver the shopping application to the cellular phone because of the limited display capabilities of the cellular phone.

In some embodiments, the associated applications may be stored in multiple formats and the most suitable format of the associated applications may be provided to each of the user equipment devices. For example, if the user selects to deliver one of the associated applications to the cellular phone, the cellular phone may be provided with a WML version of the associated application. In some embodiments, the associated applications may be modified or adapted for display by each of the user equipment devices. For example, if the user selected to deliver one of the associated applications to the cellular phone, the associated application may be modified for display by the cellular phone. In another example, the associated application may be implemented in a platform-independent language and may be adapted to be displayed by the cellular phone.

Figure 8A:
FIG. 8a shows an illustrative display screen of an interactive media guidance application for allowing a user to record content and store associated data and applications on a home network for later delivery to user equipment devices in the home network in accordance with the present invention.
Figure 8A:
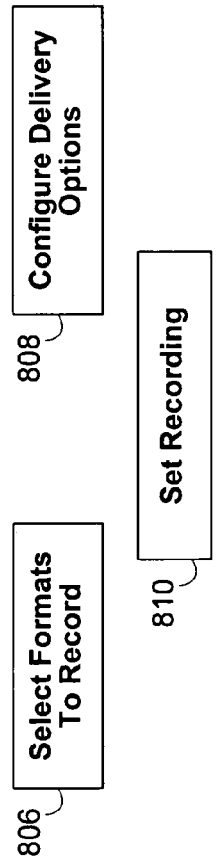

FIG. 8a shows an illustrative display screen 800 of an interactive media guidance application for allowing a user to record content and store associated data and applications on a home network for later delivery to user equipment devices in the home network in accordance with the present invention. For example, the interactive media guidance application may display screen 800 in response to the user selecting to record content from, for example, a program listings screen. In another example, the interactive media guidance application may display screen 800 in response to the user selecting to record content by selecting a related promotion or commercial. The promotion or commercial may be displayed in, for example, a program guide screen. Screen 800 may include program information area 802, recording options 804, format selection button 806, delivery options button 808, and set recording button 810.

It should be understood by one skilled in the art that screen 800 is one type of screen that may be displayed by the interactive media guidance application for allowing users to record content. Other screens may be displayed by the interactive media guidance application without departing from the scope of the invention. Using interactive media guidance applications to set recordings of television programs is discussed in greater detail in Ellis U.S. Patent Publication No. 2003/0149980, which is incorporated by reference herein in its entirety.

In some embodiments, software implemented on a server (e.g., server 130 or 140 (FIG. 1) or home network server 702 (FIG. 7)) or user equipment device may implement a feedback loop for recommending content for users to record. The server or user equipment device may receive information from user equipment devices in the home network regarding the manner in which content previously recommended by the software was viewed. The software may identify content to recommend to the user and the manner in which to provide the content to the user based on the received information. For example, if the user views a recommended program for a few minutes and then deletes the program, the software may not recommend similar programs in the future. In another example, if the user views a recommended program in its entirety, but fast forwards through a large portion of the program, the software may provide a summary clip of similar content in the future.

The software may provide the content to different user equipment devices in the home network in different manners because users are likely to view content on different devices differently. For example, if the user equipment device is a portable device, the software may provide short clips of the content to the portable device because the user has historically viewed content on the portable device for short periods of time due to the limited battery life of the portable device.

Program information area 802 may include any of text, graphics, and video information that relate to the selected program. For example, as shown in FIG. 8a, program information area 802 includes the title, channel, time, and release year for the selected program. Program information area 802 also includes a summary and a representative graphic of the selected program.

The interactive media guidance application may allow the user to select any of program recording settings 804 for the selected program. One of program recording settings 804 may allow the user to select to record the upcoming episode of the selected program. Another one of program recording settings 804 may allow the user to select to record all upcoming episodes of the selected program (e.g., a series recording). Series recordings are discussed in greater detail in Knudson et al. U.S. Patent Publication No. 2005/0204388, which is hereby incorporated by reference herein in its entirety. Another one of program guide settings 804 may allow the user to select to share the recording of the selected program with the other user equipment devices in the home network. It should be understood by one skilled in the art that program recording options 804 are merely illustrative and program recording options 804 may include additional suitable options without departing from the scope of the present invention.

Screen 800 may include a format selection button 806. In response to the user selecting format selection button 806, the interactive media guidance application may display screen 820 (FIG. 8b) for allowing the user to select formats of the selected program to record, which will be described in greater detail below. The interactive media guidance application may allow the user to select individual formats of the selected program or an option to automatically record the most suitable formats of the selected program for all of the user equipment devices in the home network.

Screen 800 may include a delivery options button 808. In response to the user selecting delivery options button 808, the interactive media guidance application may display screen 840 (FIG. 8c) for allowing the user to select options for delivering the recorded content and associated data and applications to each of the user equipment devices in the home network. Screen 840 will be described in greater detail below.

Screen 800 may include a set recording button 810. In response to the user selecting set recording button 810, the interactive media guidance application may set a recording of the selected program in the formats selected by the user. In some embodiments, the interactive media guidance application may record the selected formats of the selected program on a server. For example, the interactive media guidance application may record the selected formats of the selected program on network server 140 (FIG. 1). In another example, the interactive media guidance application may record the selected formats of the selected program on a home network server (e.g., server 702 (FIG. 7)). In some embodiments, the interactive media guidance application may record all of the selected formats of the selected program on the user equipment device on which the interactive media guidance application is implemented. In some embodiments, the interactive media guidance application may record each selected format of the selected content on the user equipment device that is most suitable to display the format of the selected content. In some embodiments, the interactive media guidance application may allow the user to specify the server or user equipment device on which to store each selected format of the selected-content.

The associated data and interactive applications selected for delivery to user equipment devices in the home network may be retrieved and stored on any suitable server accessible by the home network or user equipment device in the home network (e.g., server 130 (FIG. 1), server 140 (FIG. 1), server 702 (FIG. 7)). The associated data and interactive applications may be retrieved at any time from when the associated data and applications are selected until just before the associated data and applications are delivered.

FIG. 8b shows an illustrative display screen 820 of an interactive media guidance application for allowing a user to select formats of a selected program to record in accordance with the present invention. Screen 820 may be accessed by selecting format selection button 806 (FIG. 8a).

The interactive media guidance application may determine the available formats of the selected program and display an option (e.g., a checkbox) corresponding to each available format of the selected program on screen 820. The user may wish to select multiple formats to allow user equipment devices having different capabilities to display the selected program. In some embodiments, the interactive media guidance application may determine which formats of the selected program are available by searching program listings. For example, major television networks and certain cable channels, such as, for example, ABC, CBS, NBC, FOX, and HBO may simultaneously broadcast television programs in a high-definition format (e.g., 720p) and a standard-definition format (e.g., 480i). In some embodiments, the interactive media guidance application may access a website or database to determine which formats of the selected program are available on a server. The selected program may have been uploaded to a server in various formats after the selected program has been broadcast (e.g., server 130 (FIG. 1), server 140 (FIG. 1)). For example, the server may store the selected program in different media formats (e.g., MPEG-4 format, Windows Media Video format, Universal Media Disc format, H.264). In another example, the server may store the selected program in a streaming media format encoded at various bit rates (e.g., 50 Kbps, 100 Kbps, 300 Kbps) to accommodate user equipment devices having different bandwidth capabilities.

As shown in FIG. 8b, the interactive media guidance application has determined that the selected program "Desperate Housewives" is available in high definition, standard definition, MPEG-4, and H.264 formats. As a result, the interactive media guidance application may display checkboxes 822, 824, 826, and 828 in screen 820. The user may select any of checkboxes 822, 824, 826, and 828 to instruct the interactive media guidance application to record the formats of the selected program corresponding to checkboxes 822, 824, 826, and 828. For example, the user may consider the capabilities of the user equipment devices in the home network and select formats of the selected program that are supported by the user equipment devices.

The interactive media guidance application may also display checkbox 830 to allow the user to select to record the formats that are the most suitable for display by all of the user equipment devices in the home network. For example, if the home network includes a cellular phone and a high-definition capable user equipment device, the interactive media guidance application may automatically select to record the selected program in H.264 and high-definition formats. In this approach, the interactive media guidance application may guarantee that all of the user equipment devices in the home network are capable of displaying at least one format of the selected content without requiring any user interaction. Recording the most suitable formats of content for display by the user equipment devices in the home network is described in greater detail below in connection with FIG. 10*a*.

In response to the user pressing save button 832, the interactive media guidance application may exit screen 820 and display screen 800 (FIG. 8*a*).

It should be understood by one skilled in the art that the interactive media guidance application may not allow the user to select the formats of the selected program to record. Instead the interactive media guidance application may automatically record the formats of the selected program that are suitable for display by the user equipment devices in the home network. Alternatively, the interactive media guidance application may automatically record the highest quality format of the selected program, which may be translated at a later time to the formats of the content that are suitable for display by the user equipment devices in the home network.

FIG. 8*c* shows an illustrative display screen 840 of an interactive media guidance application for allowing a user to select delivery options for a selected program and associated data and applications to user equipment devices in a home network. The interactive media guidance application may display screen 840 in response to the user selecting delivery options button 808 (FIG. 82*a*). Screen 840 may include delivery options buttons 842, 844, and 846 and return button 848.

The interactive media guidance application may generate delivery options buttons 842, 844, and 846 to correspond to the user equipment devices in the home network. As shown in FIG. 8*c*, the interactive media guidance application has generated delivery options button 842 for a cellular phone in the home network, delivery options button 844 for a living room home theatre in the home network, and delivery options button 846 for a bedroom television system in the home network.

In some embodiments, the interactive media guidance application may generate delivery options buttons that correspond to user equipment devices that may be added to the home network in the future. For example, the interactive media guidance application may display delivery options for user equipment devices that the interactive media guidance application predicts will be added to the home network. In another example, the interactive media guidance application may display delivery options for user equipment devices that a service provider is planning to introduce as upgrades to existing user equipment devices.

In some embodiments, the cellular phone may be a user equipment device in the home network (e.g., user equipment 704 (FIG. 7)). In some embodiments, the cellular phone may be considered to be a part of the home network because it is configured to remotely access the home network (e.g., over communications network 126 and communications path 139 (FIG. 1)). Other user equipment devices that may remotely access the home network using communications network 126 may also be considered to be part of the home network (e.g., a personal computer connected to the Internet).

In response to the user selecting any of delivery options 842, 844, or 846, the interactive media guidance application may display a screen that allows the user to select options for delivering the selected program and associated data and applications to the corresponding user equipment device.

Figure 8D:
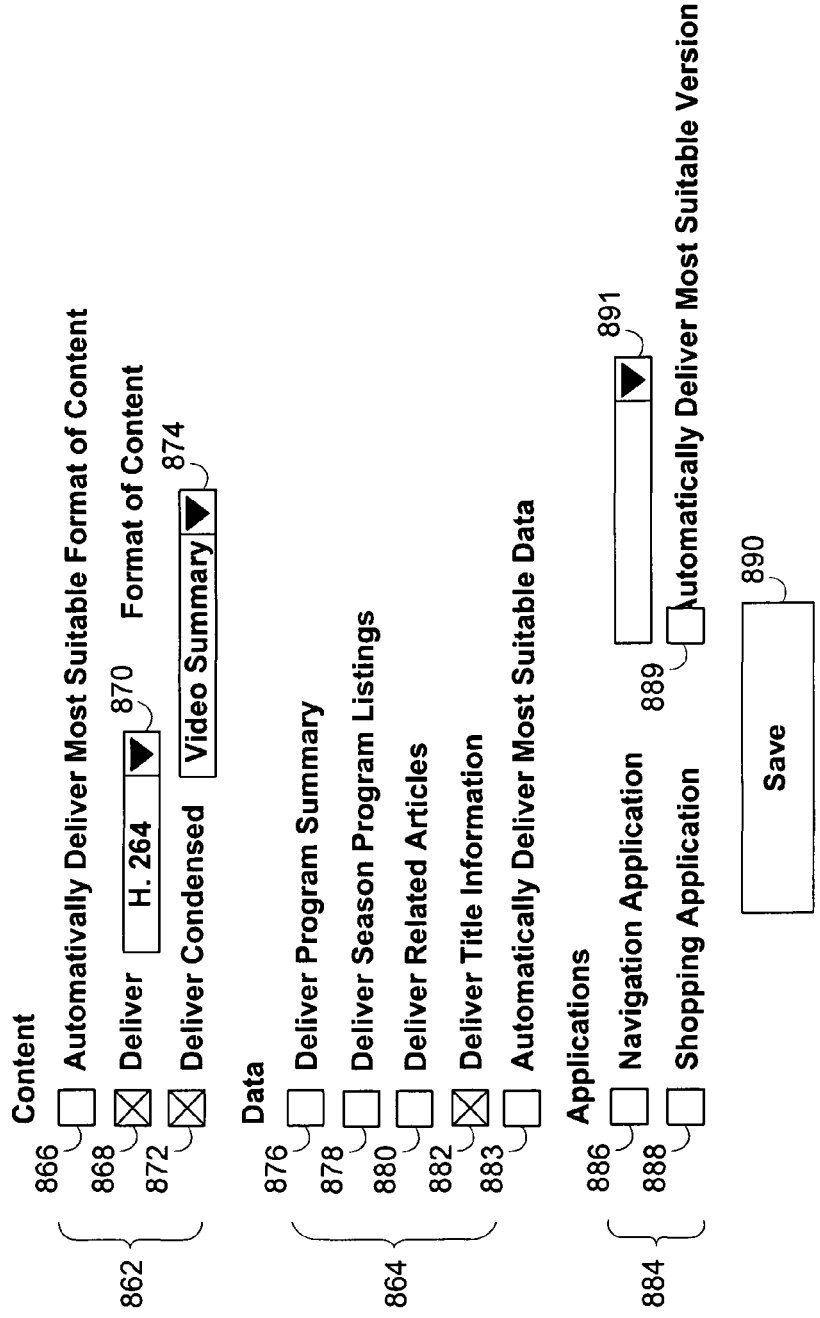
Figure 8E:
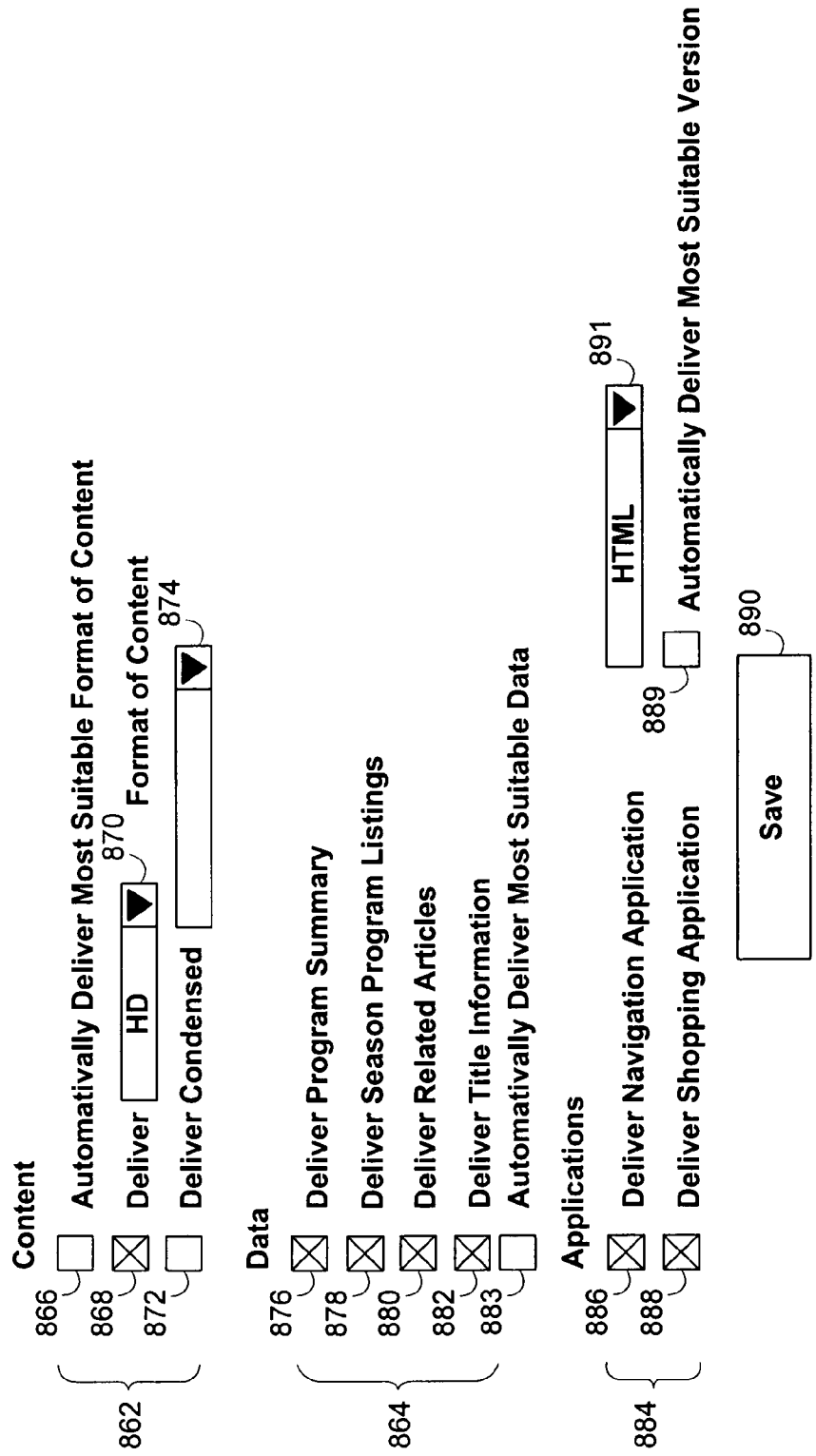

FIGS. 8*d-f* show an illustrative screen 860 of an interactive media guidance application for allowing a user to select delivery options of a selected program and associated data and applications for various user equipment devices in a home network in accordance with the present invention. The interactive media guidance application may display screen 860 in response to the user selecting any of delivery options buttons 842, 844, or 846. Screen 860 may include content delivery options area 862, data delivery options 864, application delivery area 884, and save button 890.

It should be understood that the delivery options and delivery options screens are merely illustrative and that any suitable approach to allowing users to select delivery options of content and associated data and applications to user equipment devices in the home network may be used without departing from the scope of the present invention. For example, screens 840 (FIG. 8*c*) and 860 (FIGS. 8*d-f*) may be combined into a single screen on which the user may select delivery options for all of the user equipment devices in the home network. In another example, delivery options for a user equipment device may be selected immediately prior to the delivery of content to the user equipment device.

In some embodiments, the interactive media guidance application may allow the user to configure delivery options for a selected program and associated data and applications for each of the user equipment devices in the home network. As shown in FIGS. 8*d-f*, the user may set delivery options for "Desperate Housewives" for the user equipment devices in the home network. In this approach, the interactive media guidance application may allow the user to set different delivery options for other programs that the user may wish to record.

In some embodiments, the interactive media guidance application may allow the user to configure delivery options for all content and associated data and applications for each of the user equipment devices in the home network. In this approach, the interactive media guidance application may allow the user to set delivery options for the user equipment devices in the home network that are effective for all content delivered to the user equipment devices.

Content delivery options area 862 may include checkboxes 866, 868, and 872 for allowing the user to select content listing options for the selected program. The user may select checkbox 866 if the user wishes to automatically deliver the most suitable format of the selected program to the user equipment device for which delivery options are being selected. The interactive media guidance application may compare the requirements of the formats of the selected program and the capabilities of the user equipment device for which delivery options are being selected to determine the most suitable format of the selected program for the user equipment device. For example, if the user selects to record a television program in high-definition and H.264, the television program may be delivered in high-definition format to a high-definition user equipment device in the home network and in H.264 format to a cellular phone in the home network. This approach is described in greater detail below in connection with FIG. 10*a*.

In some embodiments, the user may not have selected to record the most suitable format of the selected program for the user equipment device or the most suitable format of the selected program may not have been available for recording or storage. The interactive media guidance application may allow the user to select checkbox 866, even though the selected program has not been recorded in the most suitable format for the user equipment device for which delivery options are being selected. For example, the selected program may be recorded in high-definition format and one of the user equipment devices in the home network may only be configured to display standard-definition content. In this approach, when the selected program is requested by the user equipment device, one of the formats of the selected program may be translated into a format that is suitable for display by the user equipment device. The translation of the selected program may be provided to the user equipment device. This approach is described in greater detail below in connection with FIG. 10*b*.

Content delivery options area 862 may include checkbox 868 for allowing the user to select a format of the selected program to deliver to the user equipment device for which delivery options are being selected. The interactive media guidance application may display format selection drop down menu 870. The menu items in format selection drop down menu 870 may correspond to the formats of the selected program that were selected for recording in screen 820 (FIG. 8*b*). The user may select a format that the user knows is compatible with the user equipment device for which delivery settings are being selected. As shown in FIG. 8*d*, if the user equipment device for which delivery options are being selected is a cellular phone, the user may select to deliver the H.264 format of the selected program. Other suitable formats of the selected program that are suitable for display by the cellular phone may include, for example, MPEG-4, Universal Media Disc™ format, Windows Media Video™, Quicktime™, and any other suitable media format. As shown in FIG. 8*e*, if the user equipment device for which delivery options are being selected is a high-definition user equipment device, the user may select to deliver the high-definition format of the selected program. As shown in FIG. 8*f*, if the user equipment device for which delivery options are being selected is a standard-definition user equipment device, the user may select to deliver the standard-definition format of the selected program.

Content delivery options area 862 may include checkbox 872 for allowing the user to select whether to deliver an alternate version of the selected program to the user equipment device for which delivery options are being selected. The interactive media guidance application may display drop down menu 874 to allow the user to select to deliver an alternate version of the selected program to the user equipment device for which delivery options are being selected. The user may select menu items in drop down menu 874 that correspond to different alternate versions of the selected program. Drop down menu 874 may include listings for delivering summaries or clips of the selected program in video, audio, and text and listings for delivering the selected program in audio and text. For example, if the selected program is a sports program, the user may select to deliver a highlights reel to a cellular phone. In another example, if the selected program is a drama, the user may select to deliver a summary of the drama to a handheld video player. In another example, the user may select to deliver a segment of the selected program to a handheld computer (e.g., the Top 10 List for the Late Show with David Letterman or Weekend Update for Saturday Night Live). In addition, drop down menu 874 may also include listings for delivering extended versions of the selected program to include, for example, outtakes, commentary, and other extra material in addition to the selected program itself. For example, the user may select to deliver the selected program to a high-definition user equipment device along with director commentary.

In some embodiments, the alternate version of the selected program may be locally generated by a server or user equipment device associated with the home network on which the selected program is stored. For example, the selected program may be split into segments and a subset of the segments may be combined to create a condensed version of the selected program. In another example, the selected program may be converted into audio by stripping out the video portion of the content. In another example, the selected program may be converted into text by referring to closed-captioning data. Generating an alternate version by condensing content is described in greater detail below in connection with FIG. 11*a-c*.

Extended versions of the selected program may also be generated by appending material to the selected program. For example, additional material may be joined at any location during the selected program (e.g., at the beginning, middle, or end of the selected program).

In some embodiments, the alternate version of the selected program may be provided by broadcasters or program providers for retrieval on a server. For example, a producer may produce a video summary of the selected program by identifying and joining together the most relevant video clips. In another example, a writer may write a text summary of the selected program. A website may link to the video or text summary of the selected program. This type of condensed content may be more accurate than locally-generated alternate versions because they are generated by people, instead of by artificial intelligence.

The service provider may charge users to access alternate versions of the selected program. For example, a user may record an episode of "Desperate Housewives" without incurring any fees. However, if the user selects to retrieve an alternate version of "Desperate Housewives", then the service provider may charge the user a fee depending which alternate version the user selects. The service provider may charge different fees for different versions of the selected program. For example, the service provider may charge more for an extended version of the selected program than a condensed version of the selected program.

The selected alternate version of the selected program may also be formatted in accordance with the format options in content delivery options area 862. For example, a highlight video clip of the selected program may be retrieved from a website in MPEG-4 format. If the content delivery options for the selected program specifies that the content should be delivered in H.264 format, the highlight video may be retrieved from the website and transcoded to H.264 format.

Data delivery options area 864 may include checkboxes 876, 878, 880, and 882. The interactive media guidance application may generate the checkboxes in data delivery options area 864 by determining which associated content is available to be provided to user equipment devices in addition to the selected program.

In some embodiments, the interactive media guidance application may search program listings for the selected program to determine if any associated data is available. For example, a program listings screen for "Desperate Housewives" may include schedule information, program descriptions, and program information (e.g., actors, directors, release date, ratings, genre, etc.). The program listings screen for "Desperate Housewives" may also include links to additional data associated with "Desperate Housewives", such as, related articles, interviews, reviews, and other similar content or data.

The interactive media guidance application may generate options (e.g., checkboxes) that correspond to the data associated with the selected program. As shown in FIG. 8*d-f*, the interactive media guidance application has generated illustrative checkboxes 876, 878, 880, and 882 that correspond to data associated with "Desperate Housewives".

The user may select any one or more of checkboxes 876, 878, 880, or 882 to deliver data corresponding to the selected checkboxes to the user equipment device for which delivery options are being selected. As shown in FIG. 8*d*, the user has selected to deliver title information for "Desperate Housewives" to the cellular phone in the home network. As shown in FIGS. 8*e-f*, the user has selected to deliver an episode guide, season program listings, related articles, and title information for "Desperate Housewives" to the high-definition and standard-definition user equipment devices in the home network.

Alternatively, the user may select checkbox 883 to select to deliver the most suitable data to the user equipment device for which delivery options are being selected. If the user selects checkbox 883, the interactive media guidance application may determine a selection of the associated data that the user equipment device is capable of receiving and displaying. For example, if one particular type of associated data requires a large amount of storage space, the interactive media guidance application may not select to deliver the associated data to a user equipment device that has a limited bandwidth. In another example, if another particular type of associated data requires a large amount of display area, the interactive media guidance application may not select to deliver the associated data to a user equipment device that has a low native resolution or screen size.

Accordingly, the interactive media guidance application may select to deliver all available associated data to the high-definition user equipment devices because the high-definition user equipment devices has a bandwidth large enough to receive the associated data and a sufficient resolution to display the associated data simultaneously with the selected content. On the other hand, the interactive media guidance application may select to deliver a limited amount of data (e.g., title information) to a cellular phone because of the bandwidth and display limitations of the cellular phone.

The data may be displayed by the user equipment devices in any suitable format. For example, the high-definition user equipment device may display the recording of "Desperate Housewives" and the associated data simultaneously in adjacent panels. In another example, the cellular phone may allow the user to select a menu option for displaying associated data for "Desperate Housewives".

Application delivery options area 884 may include checkboxes 886 and 888. The interactive media guidance application may generate the checkboxes in application delivery options area 884 by determining which associated interactive applications are available to be provided to the user equipment devices in addition to the selected program. Area 884 may also include a version selection drop down menu 891 and checkbox 889.

In some embodiments, the interactive media guidance application may search program listings for the selected program to determine if any associated interactive applications are available. For example, a program listings screen for "Desperate Housewives" may include links to interactive applications associated with "Desperate Housewives". In another example, the interactive media guidance application may search a database of interactive applications to determine if any of the interactive applications are associated with the selected program. As shown in screen 860, "Desperate Housewives" may be associated with a content navigation application for allowing the user to view the recorded program and associated data, a commerce application for allowing the user to view and/or purchase products featured in the recorded program. A cross-platform interactive commerce application is described in greater detail in U.S. patent application Ser. No. 11/323,539, filed concurrently herewith, which is hereby incorporated by reference herein in its entirety.

The interactive media guidance application may generate options (e.g., checkboxes) that correspond to the interactive applications associated with the selected program. As shown in FIG. 8*d-f*, the interactive media guidance application has generated illustrative checkboxes 886 and 888 that correspond to interactive applications associated with "Desperate Housewives".

In response to the user selecting checkboxes 886 and/or 888, the interactive media guidance application may configure the interactive applications corresponding to the selected checkboxes to be delivered to the user equipment device for which delivery options are being selected.

In some embodiments, the interactive applications may be available in multiple versions. The most suitable version of the selected interactive application may be delivered to the user equipment device for which delivery options are being selected. Delivering the most suitable version of an interactive application to a user equipment device is described below in greater detail in connection with FIG. 12*a*.

In some embodiments, the selected interactive application may be modified for display by the user equipment device for which delivery options are being selected. The modified version of the selected interactive application may be delivered to the user equipment device for which delivery options are being selected. Modifying an interactive application for execution by a user equipment device is described in greater detail below in connection with FIG. 12*b*.

In some embodiments, the selected interactive application may be implemented in a platform-independent programming language and may be configured to adapt its display screens to the user equipment device on which it is being run. The selected interactive application may be delivered to the user equipment device for which delivery options are being selected. Implementing interactive applications in platform-independent programming languages is described below in greater detail in connection with FIG. 12*c*.

In some embodiments, the interactive media guidance application may only display checkboxes for associated interactive applications that may be run by the user equipment device for which delivery options are being selected. For example, if a cellular phone in the home network cannot display an interactive application, a checkbox for the interactive application may not be displayed in the application delivery options for the cellular phone.

The user may select checkbox 889 to select to deliver the most suitable versions of the selected interactive applications to the user equipment device for which settings are being selected. If the user selects checkbox 889, the interactive media guidance application may determine which versions of the selected interactive media guidance applications may be run by the user equipment device for which delivery options are being selected. The interactive media guidance application may select to deliver one of the versions of the selected interactive applications that may be run by the user equipment device. For example, the interactive media guidance application may automatically select to deliver a WML version of an interactive application to a cellular phone and a HTML version of an interactive application to a personal computer. The WML and HTML versions of the interactive application may be made available using any suitable technique (e.g., modifying an XML version of the interactive application or storing WML and HTML versions of the interactive application).

In some embodiments, if checkbox 889 is selected, the interactive media guidance application may override the user's selections due to the display limitations of the user equipment device. The interactive media guidance application may consider whether the user equipment device may display the interactive application and the selected program simultaneously. For example, the interactive media guidance application may not select to deliver any interactive applications to a cellular phone because the cellular phone cannot display any of the interactive applications and the selected program simultaneously.

In some embodiments, if checkbox 889 is selected, the interactive media guidance application may override the user's selections due to the bandwidth limitations of the user equipment device. The interactive media guidance application may also consider whether the user equipment device has sufficient bandwidth to retrieve the interactive application in addition to the selected program. For example, the interactive media guidance application may not select to deliver any interactive applications to a cellular phone even though the cellular phone may be able to run some of the interactive applications because the cellular phone does not have the sufficient bandwidth to retrieve the interactive application and the selected program.

Alternatively, the interactive media guidance application may allow the user to select the versions of interactive applications to deliver to the user equipment device from version selection drop down menu 891. The interactive media guidance application may determine which versions of the interactive applications are available and include options to select the available versions in version selection drop down menu 891. In some embodiments, the interactive media guidance application may display a separate version selection drop down menu 891 for each listed interactive application. The interactive media guidance application may allow the user to select a version of interactive application for delivery to the user equipment device for which delivery options are being selected.

In response to the user selecting save button 890, the interactive media guidance application may save the user's selection of delivery options. The interactive media guidance application may return to screen 840 (FIG. 8*c*).

In some embodiments, the user may configure the interactive media guidance application to automatically transfer one or more of the selected versions of content to the corresponding user equipment devices or peripheral devices (e.g., the user does not have to request delivery of the content to a user equipment device). For example, the user may indicate that the selected content (e.g., an episode of "Desperate Housewives") should automatically be delivered to a handheld video player when the handheld video player is connected to a user equipment device in the home network (or otherwise enabled to access the episode of "Desperate Housewives"). In this example, the handheld video player (or any other user equipment device) may be implemented in, for example, a vehicle and selected content may be automatically transferred to the handheld video player when the vehicle is enters, for example, a garage or another location from which the handheld video player may communicate with the home network.

In another example, the user may indicate that selected content (e.g., an episode of "Desperate Housewives") should automatically be delivered to the high-definition user equipment device when the high-definition version of "Desperate Housewives" becomes available. In this example, the high-definition version of "Desperate Housewives" may be available after a recording of the high-definition version of "Desperate Housewives" is complete. Alternatively, the high-definition version of "Desperate Housewives" may be available after a recording of a standard-definition version of "Desperate Housewives" is complete and after the standard-definition has been translated into high-definition. Alternatively, the high-definition version of "Desperate Housewives" may be available after the high-definition version of "Desperate Housewives" has been uploaded to a server and is available for retrieval.

In another example, the user may indicate that selected content (e.g., the weather report or sports highlights) should automatically be delivered to a cellular phone on a predetermined schedule (e.g., every weekday morning). In this approach, the user may view the selected content away from the home network on a regular basis (e.g., on the user's commute to work) without the hassle of reconfiguring the transfer of the content on a regular basis.

The content selected for automatic transfer may be delivered to the selected user equipment device or peripheral device in accordance with the delivery options for the selected user equipment device or peripheral device (e.g., content delivery options, data delivery options, application delivery options). For example, if content is selected for automatic transfer to two different user equipment devices, the format of the content delivered to the user equipment devices may differ because the capabilities of the user equipment devices are different.

Automatic transfer of content is discussed in greater detail in U.S. patent application Ser. No. 10/942,070, filed Sep. 15, 2004, which is hereby incorporated by reference herein in its entirety.

In some embodiments, the content and associated data and applications may be delivered to a user equipment device in a format that is consistent with the way a user has interacted with and consumed similar content, data, and applications in the past using the user equipment device. In this approach, the interactive media guidance application may monitor the user's interaction with content, data, and applications using the user equipment device and feed back the monitoring information to the source of the content, data, and applications (e.g., home network server 702 (FIG. 7)). The source of the content, data, and applications may analyze the monitoring information and deliver content, data, and applications to the user equipment device in the future in accordance with the monitoring information. In this approach, the delivery options selected by the user in screen 860 (FIGS. 8*d-f*) may be dynamically modified based on the user's behavior.

In particular, content may be delivered to the user based on the capabilities of the user equipment device and the manner in which the user has consumed content in the past. First, a suitable format of the content may be selected such that the user equipment device is configured to play back the format of the content. Next, the source of the content may consider the user's previous viewing patterns to determine the manner in which to present the content to the user. For example, the source may select to deliver a condensed version of the content if the user has a short average viewing time or if the user frequently fast forwards through the content using the user equipment device. In another example, an extended version of the content may be displayed to the user if the user seems interested not only in viewing content, but learning more about the background of the content, for example, by re-watching certain scenes or by perusing related articles.

Associated program data may be delivered to the user based on the capabilities of the user equipment device and the manner in which the user has consumed data in the past. The source of the program data may determine a selection of interactive applications that may be displayed by the user equipment device. The source may deliver a subset of that selection of program data based on the manner in which the user has previously consumed program data using the user equipment device. For example, the source may deliver a minimal amount of program data if the user has repeatedly minimized data displays or has not accessed associated program data. In another example, the source may select to deliver a particular type of program data from the selection of program data if the user interacts frequently with that type of program data.

Associated interactive applications may be delivered to the user based on whether the user equipment device is capable of executing the interactive applications and the manner in which the user has previously consumed interactive applications. The source of the interactive applications may determine a selection of interactive applications that may be executed by the user equipment device. The source may deliver a subset of that selection of interactive applications based on the manner in which the user previously consumed interactive applications using the user equipment device. For example, if the user has not accessed associated interactive applications using the user equipment device, the source may not deliver any associated interactive applications. In another example, if the user frequently accesses a certain type of interactive application using the user equipment device, the source may select that type of interactive application from the selection of interactive applications to deliver to the user equipment device.

This type of feedback loop regarding the usage of content, data, and applications is particularly useful when a user is consistent in his or her usage of the content, data and applications. For example, a user equipment device located in a vehicle may be used primarily to allow children to view content and associated program data and applications while the parent is driving the children to school. The source of the content, data, and application may deliver suitable content, data, and/or applications to the user equipment device prior to the departure of the vehicle or as the vehicle is departing the garage. If the children historically view children's programming for twenty minutes and interact with an associated interactive game, the source may deliver twenty-minute long segments of children's programming that were recorded or are accessible for download from a database. The segments may also be formatted based on the display capabilities of the user equipment device. If the children do not usually interact with associated program data, the source may not deliver any program data associated with the selected content to the user equipment device. The source may deliver a suitable format of the interactive game to the user equipment device in a format that may be executed by the user equipment device. Once the vehicle has disconnected from the source and the children begin to consume the customized content, program data, and applications, the user equipment device may track the children's interactions with the customized content, program data, and applications. When the vehicle reconnects with the source (e.g., after the parent has returned from sending the children to school), the user equipment device may communicate the manner in which the children consumed the customized content, program data, and applications to the source to allow the source to refine the manner in which content, program data, and applications are delivered to the user equipment device in the future.

In some embodiments, the source may send a test instances of associated program data or interactive application to see how the user consumes that data or application and determine whether or not to deliver that type of data or interactive application in the future.

Figure 9B:
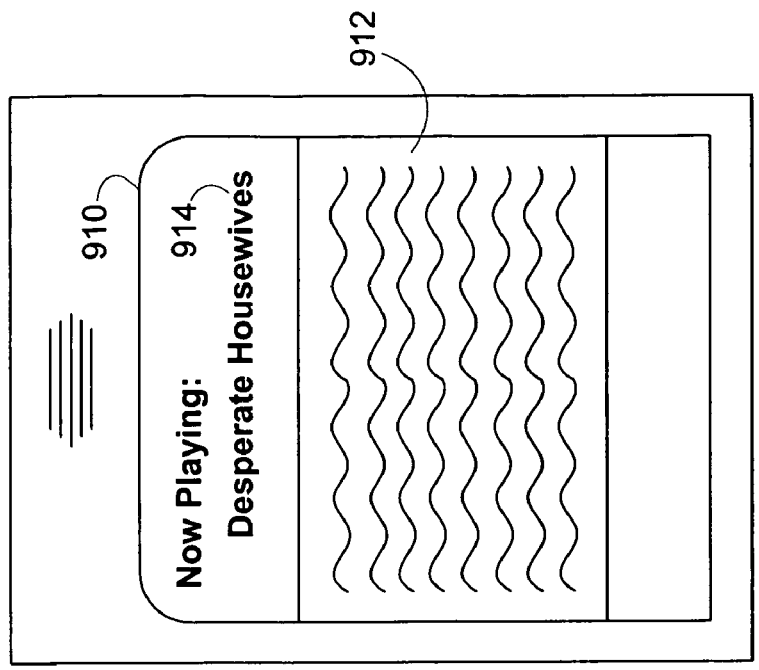
FIGS. 9a-b show illustrative display screens of an interactive media guidance application implemented on a cellular phone in a home network for retrieving and displaying recorded content and associated data and applications in accordance with the present invention.
Figure 9A:
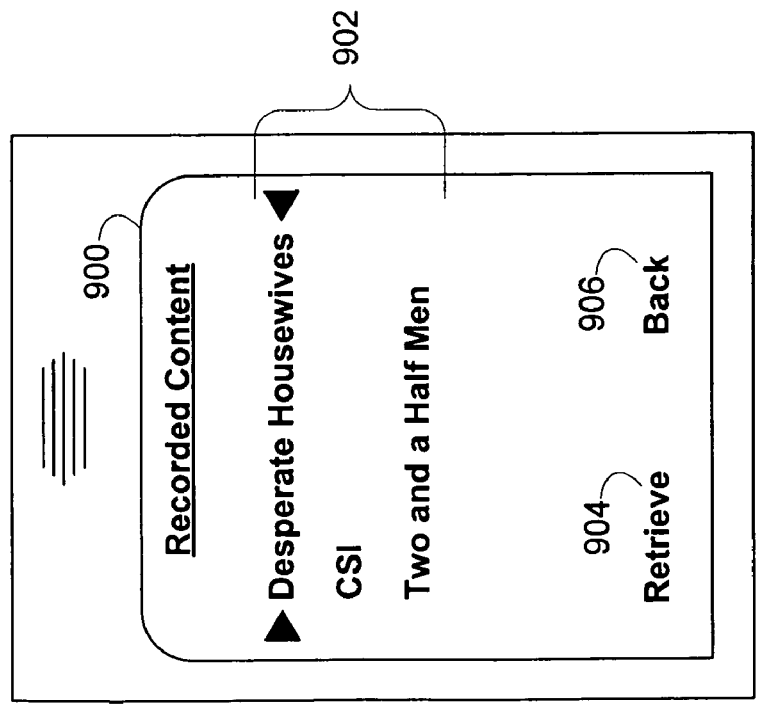

FIGS. 9*a-b* show illustrative display screens 900 and 910 of an interactive media guidance application implemented on a cellular phone in a home network for retrieving and displaying recorded content and associated data and applications in accordance with the present invention. The cellular phone may be configured to communicate directly with user equipment devices in the home network or indirectly with the user equipment devices in the home network via a communications network (e.g., communications network 126 (FIG. 1)).

The interactive media guidance application may display screen 900 in response to a user selecting to view recorded content. As shown in FIG. 9*a*, screen 900 may include a listing of recorded content 902. The listing of recorded content may include content shared among the user equipment devices in the home network. As shown in FIG. 9*a*, the user has selected a listing for a recording of "Desperate Housewives". For the purposes of illustration and not limitation, the recorded content shared among the user equipment devices in the home network will be described as being stored on a home network server (e.g., server 702 (FIG. 7)).

Screen 900 may also include retrieve option 904 and back button 906. In response to the user selecting retrieve option 904, the interactive media guidance application may retrieve the recorded content and any selected associated data and applications in accordance with the delivery options selected from screen 860 (FIG. 8*d*). In response to the user selecting back button 906, the interactive media guidance application may display the screen from which screen 900 was accessed.

Referring to FIG. 9*b*, the interactive media guidance application may display screen 910 in response to the user selecting a recorded content listing and retrieve button 904 from screen 900 (FIG. 9*a*). As shown in FIG. 9*b*, screen 910 includes a video 912 and associated data 914 for the content selected by the user in screen 900 (FIG. 9*a*). In accordance with content delivery options 862 (FIG. 8*d*) for the cellular phone, video 912 may be a summary clip of "Desperate Housewives" in H.264 format. In some embodiments, the summary clip may be retrieved from a server (e.g., server 130 or server 140 (FIG. 1)). In some embodiments, the summary clip may be generated by the home network server by condensing the recording of "Desperate Housewives", as described below in connection with FIG. 11*a*. If necessary, the home network server may transcode the summary clip of "Desperate Housewives" into H.264 format.

In accordance with data delivery options 864 (FIG. 12*d*), data 914 may be title information for "Desperate Housewives". As shown in FIG. 9*b*, data 914 is displayed in a scrolling message in screen 910 above video 912. It should be understood by one skilled in the art that video 912 and data 914 may be displayed by the interactive media guidance application implemented on the cellular phone in any suitable arrangement. In accordance with delivery options area 884 (FIG. 8*d*), none of the interactive applications associated with "Desperate Housewives" are delivered to or accessible by the cellular phone.

Figure 9C:
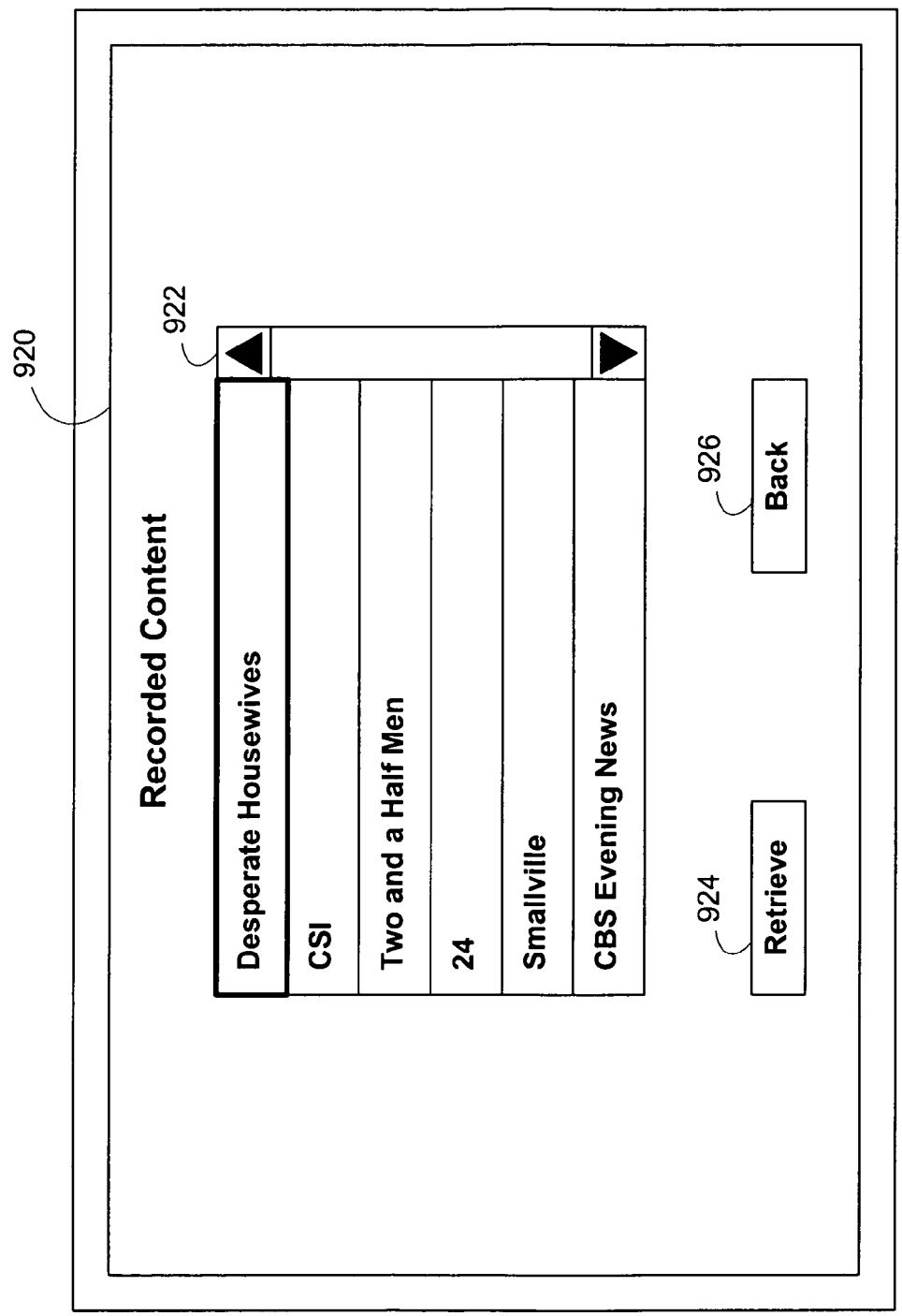
FIGS. 9c-d show illustrative display screens of an interactive media guidance application implemented on a high-definition user equipment device in a home network for retrieving and displaying recorded content and associated data and applications in accordance with the present invention.
Figure 9D:
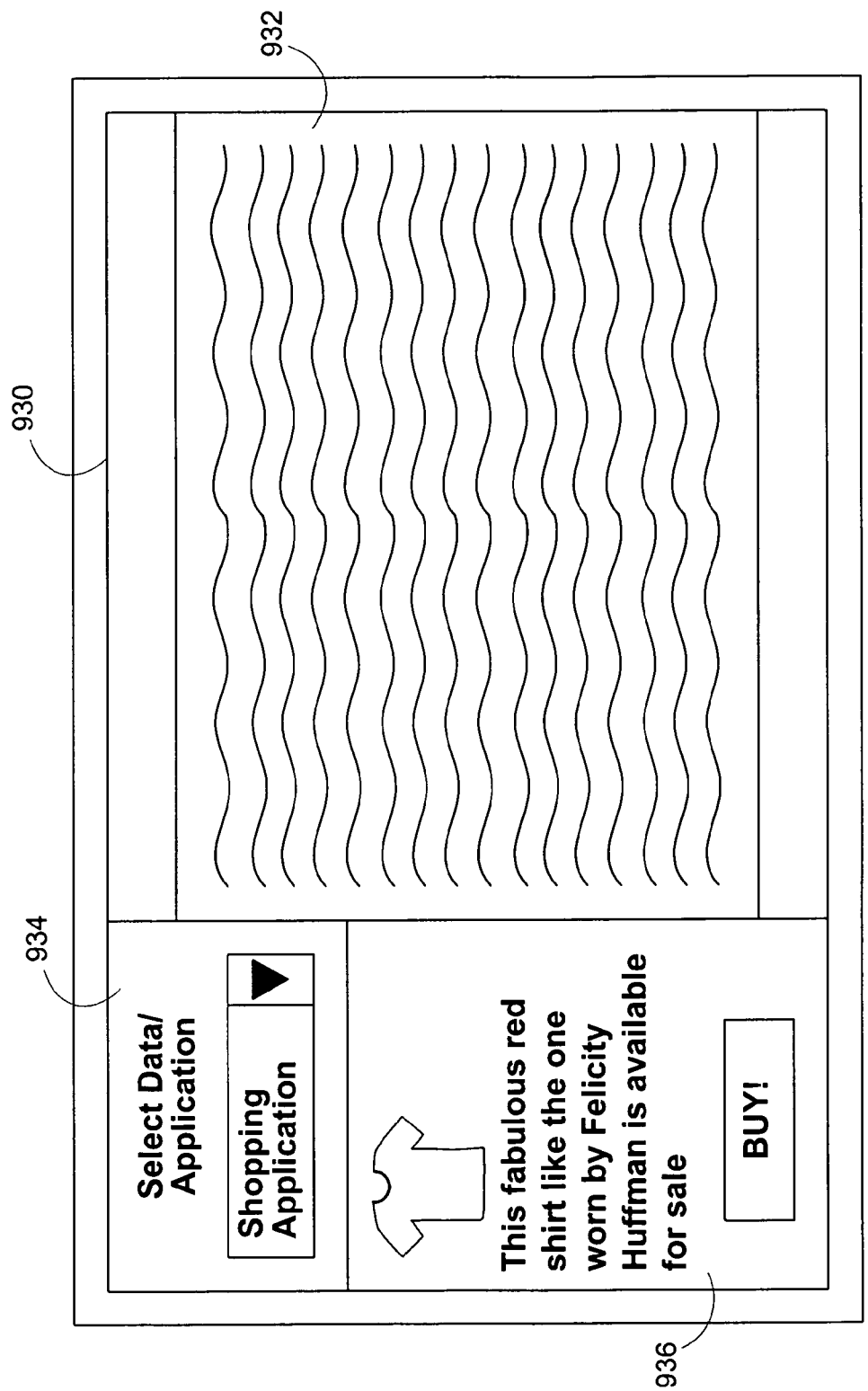

FIGS. 9*c-d* show illustrative display screens 920 and 930 of an interactive media guidance application implemented on a high-definition user equipment device in a home network for retrieving and displaying recorded content and associated data and applications in accordance with the present invention.

The interactive media guidance application may display screen 920 in response to the user selecting to view recorded content. As shown in FIG. 9c, screen 920 may include a listing of recorded content 922. The listing of recorded content may include content shared among the user equipment devices in the home network. As shown in FIG. 9c, the user has selected a listing for a recording of "Desperate Housewives". For the purposes of illustration and not limitation, the recorded content shared among the user equipment devices in the home network will be described as being stored on a home network server (e.g., server 702 (FIG. 7).

Screen 920 may also include retrieve option 924 and back button 926. In response to the user selecting retrieve option 924, the interactive media guidance application may retrieve the recorded content and any selected associated data and applications in accordance with the delivery options selected from screen 960 (FIG. 8e). In response to the user selecting back button 926, the interactive media guidance application may display the screen from which screen 920 was accessed.

Referring to FIG. 9d, the interactive media guidance application may display screen 930 in response to the user selecting a recorded content listing and retrieve button 924 from screen 920 (FIG. 9c). As shown in FIG. 9d, screen 930 includes a video 932 and panels 934 and 936 for selecting and displaying data and applications associated with "Desperate Housewives". In accordance with content delivery options 862 (FIG. 8e) for the high-definition user equipment device, video 932 may be the complete recording of "Desperate Housewives" in high-definition format.

In accordance with data delivery options 864 and application delivery options 884 (FIG. 8e), the interactive media guidance application may deliver a program summary, season program listings, related articles, title information, shopping and navigation applications associated with "Desperate Housewives" to the high-definition user equipment device. The user may select one of the associated data or applications from panel 934. The selected associated data or application may be displayed in panel 936. As shown in FIG. 9d, panel 936 includes a shopping application associated with "Desperate Housewives". Associated interactive applications may be delivered to the high-definition user equipment device using any of the approaches described below in connection with FIGS. 12a-c. It should be understood by one skilled in the art that the content and associated data and applications may be displayed by the interactive media guidance application implemented on the high-definition user equipment device in any suitable arrangement. In some embodiments, the recording, associated data, and associated applications may be displayed in separate screens.

Figure 9E:
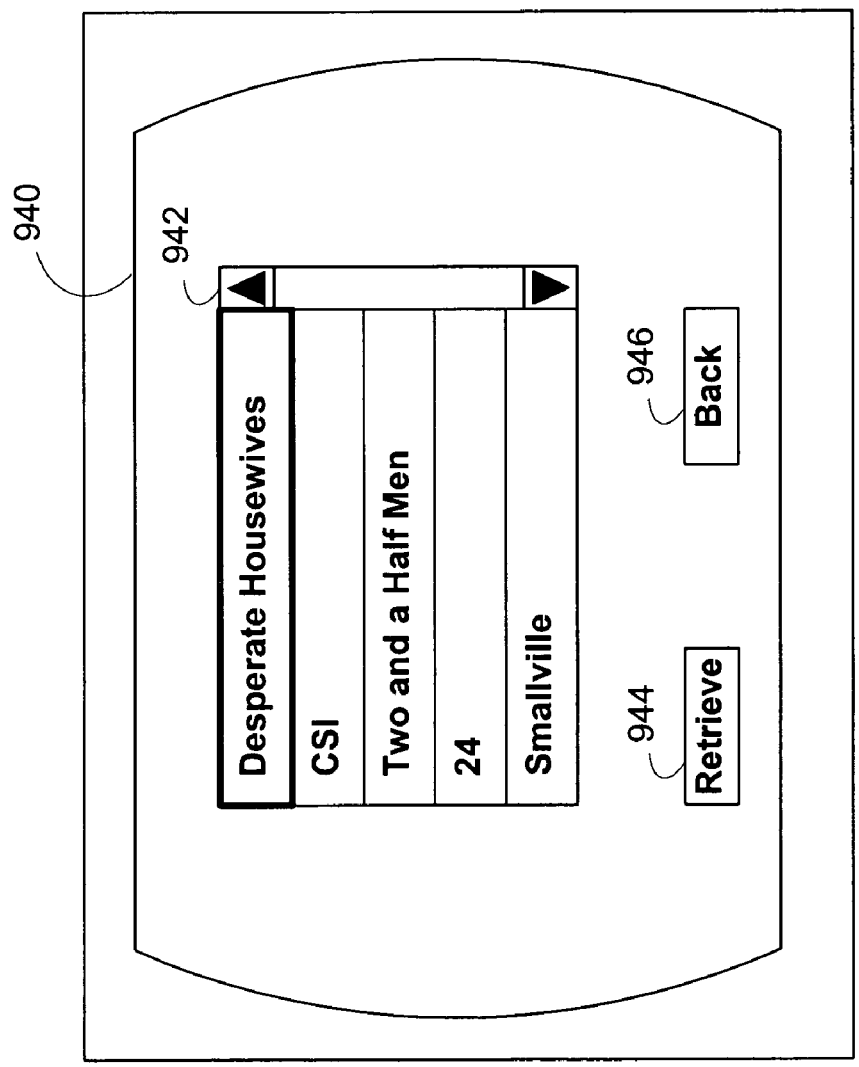
FIGS. 9e-f show illustrative display screens of an interactive media guidance application implemented on a standard-definition user equipment device in a home network for retrieving and displaying recorded content and associated data and applications in accordance with the present invention.
Figure 9F:
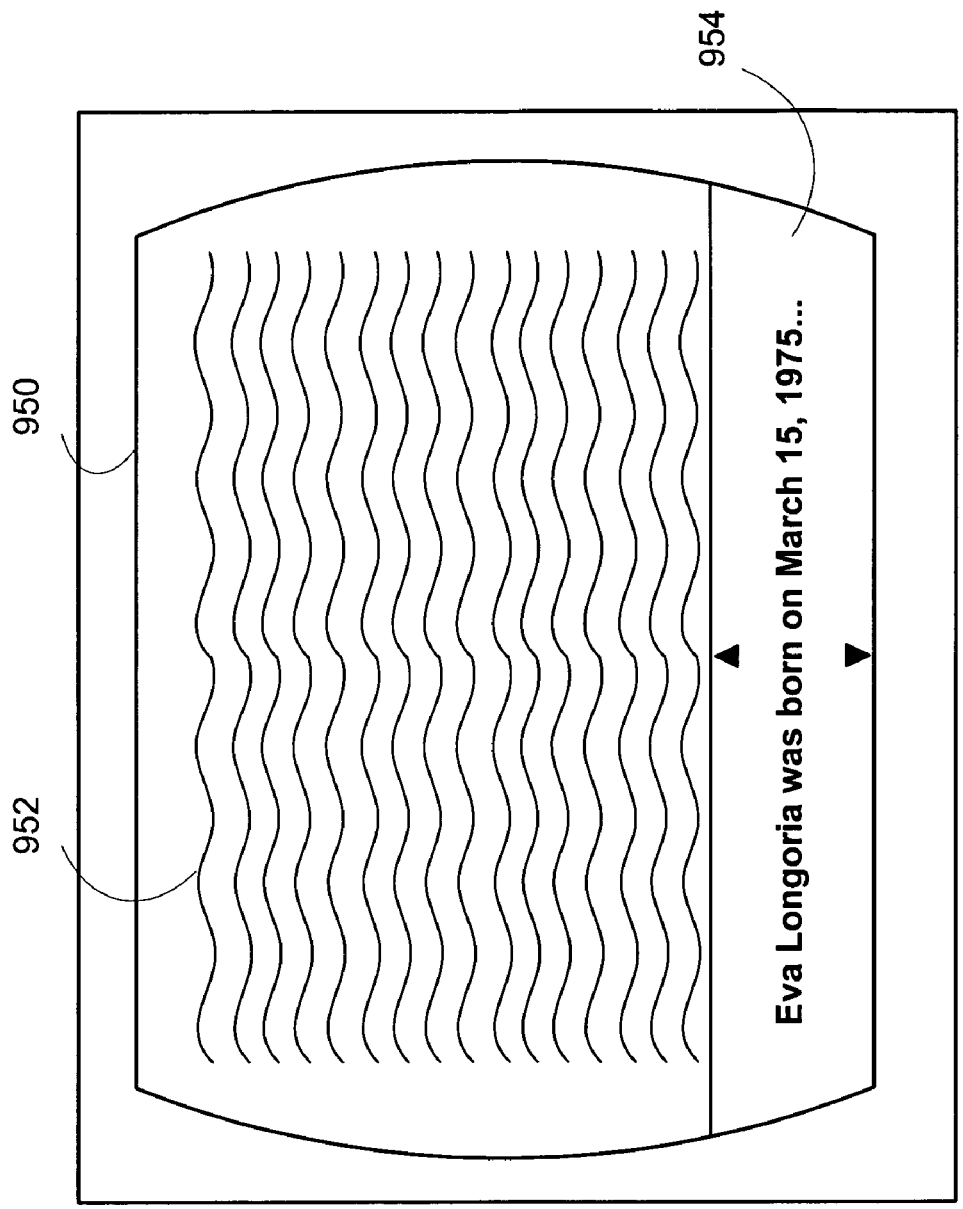

FIGS. 9e-f show illustrative display screens 940 and 950 of an interactive media guidance application implemented on a standard-definition user equipment device in a home network for retrieving and displaying recorded content and associated data and applications in accordance with the present invention.

The interactive media guidance application may display screen 940 in response to the user selecting to view recorded content. As shown in FIG. 9e, screen 940 may include a listing of recorded content 942. The listing of recorded content may include content shared among the user equipment devices in the home network. As shown in FIG. 9e, the user has selected a listing for a recording of "Desperate Housewives". For the purposes of illustration and not limitation, the recorded content shared among the user equipment devices in the home network will be described as being stored on a home network server (e.g., server 702 (FIG. 7)).

Screen 940 may also include retrieve option 944 and back button 946. In response to the user selecting retrieve option 944, the interactive media guidance application may retrieve the recorded content and any selected associated data and applications in accordance with the delivery options selected from screen 860 (FIG. 8f). In response to the user selecting back button 946, the interactive media guidance application may display the screen from which screen 940 was accessed.

Referring to FIG. 9f, the interactive media guidance application may display screen 950 in response to the user selecting a recorded content listing and retrieve button 944 from screen 940 (FIG. 9e). As shown in FIG. 9f, screen 950 includes a video 952 and associated data and applications area 954 for selecting and displaying data and applications associated with "Desperate Housewives". In accordance with content delivery options 862 (FIG. 8f) for the standard-definition user equipment device, video 932 may be the complete recording of "Desperate Housewives" in standard-definition format. If necessary, the home network server may translate one of the recorded formats of "Desperate Housewives" into standard definition and deliver "Desperate Housewives" to the standard-definition user equipment device in the translated standard-definition format.

In accordance with data delivery options 864 and application delivery options 884 (FIG. 8e), the interactive media guidance application may deliver a program summary, season program listings, related articles, title information, and shopping and navigation applications associated with "Desperate Housewives" to the standard-definition user equipment device. As shown in FIG. 9f, the user has selected to display cast information in a scrolling ticker message. The user may select other associated data and applications by scrolling using the arrows in associated data and applications area 954. Associated interactive applications may be delivered to the standard-definition user equipment device using any of the approaches described below in connection with FIGS. 12a-c. It should be understood by one skilled in the art that the content and associated data and applications may be displayed by the interactive media guidance application implemented on the standard-definition user equipment device in any suitable arrangement.

The user interfaces of the interactive media guidance application as shown in FIGS. 8 and 9, use commonly-used application objects such as buttons, lists, and checkboxes. It will be understood that these objects are only illustrative, and other objects can be used by those skilled in the art without departing from the scope and spirit of the present invention.

An interactive media guidance application may allow a user to record a selected television program in formats that are most suitable for display by the user equipment devices in a home network and configure the interactive media guidance application system to deliver the most suitable formats of the selected television program to the user equipment devices in the home network. For example, screen 820 (FIG. 8b) includes an option for allowing the user to select to record and deliver selected television programs in formats that are most suitable for display by the user equipment devices in a home network. Screen 860 (FIGS. 8d-f) includes an option for allowing the user to select to deliver the most suitable format of a selected television program to a user equipment device.

Figure 10A:
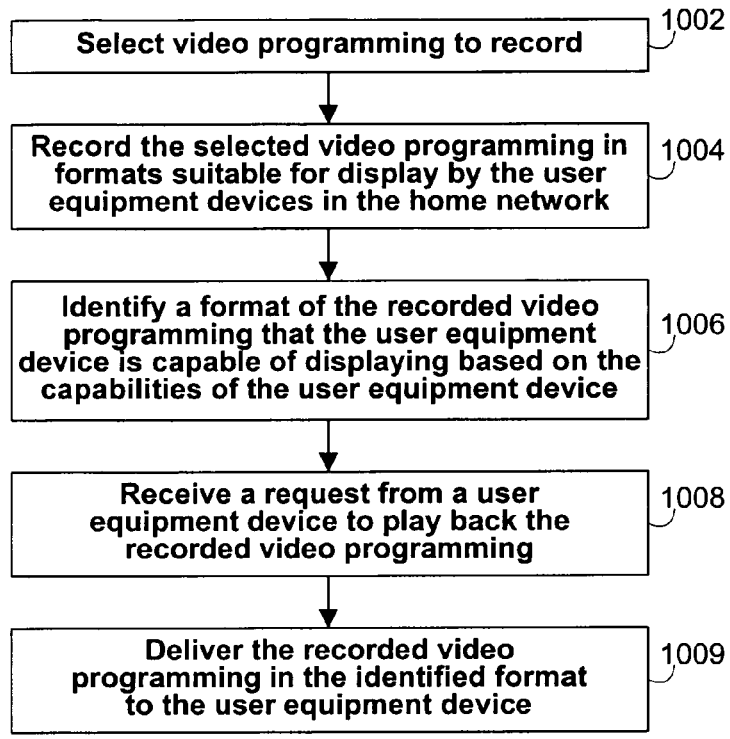
FIG. 10a shows an illustrative flow diagram for allowing user equipment devices in a home network having various capabilities to access the most suitable format of content stored on the home network in accordance with the present invention.

FIG. 10a shows an illustrative flow diagram 1000 for allowing user equipment devices in a home network having various capabilities to access the most suitable format of content stored on the home network in accordance with the present invention.

At step 1002, video programming (sometimes referred to as content) may be selected for recording. Screens 800 (FIG. 8*a*) and 810 (FIG. 8*b*) are illustrative screens of an interactive media guidance application for allowing users to select content for recording. It should be understood by one skilled in the art that the interactive media guidance application may display any suitable screen for allowing the user to select content for recording. In another example, the interactive media guidance application may select a program for recording based on the preferences or the previous selections of the user.

At step 1004, the interactive media guidance application may record the selected content in the formats suitable for display by the user equipment devices in the home network. For example, screen 820 (FIG. 8*b*) may allow the user to select an option to record the formats of the selected content suitable to be displayed by the user equipment devices in the home network. The interactive media guidance application may compare the requirements of the available formats of the content with the capabilities of the user equipment devices in the home network.

In some embodiments, the interactive media guidance application may determine which formats of the content are available by searching program listings. For example, major television networks and certain cable channels, such as, for example, ABC, CBS, NBC, FOX, and HBO may simultaneously broadcast television programs in a high-definition format (e.g., 720p) and a standard-definition format (e.g., 480i). In some embodiments, the interactive media guidance application may access a website or database to determine which formats of the content are available on a server. For example, the server may store the content in three formats encoded at bit rates of 50 Kbps, 100 Kbps, and 300 Kbps. In another example, the server may store the content in different video formats (e.g., MPEG-4, Windows Media Video, H.264, and Universal Media Disc formats).

The interactive media guidance application may determine the requirements of the available formats of the content, which may include, for example, the media type of the format, the resolution of the format, the storage space required by the format, the bit rate used to encode the format, the audio/video encoding of the format (e.g., Dolby Digital™), and any other suitable requirements.

In some embodiments, if the content has not yet been broadcast, the interactive media guidance application may determine the requirements of the available formats of the content by referring to program listings information corresponding to each of the available formats.

In some embodiments, if the available formats of the content are stored on a server, the requirements of the available formats of the content may be encoded in the file headers for the formats. The interactive media guidance application may determine the requirements of the available formats of the content by analyzing the file headers.

In some embodiments, the server may indicate to the interactive media guidance application which formats of the content are scheduled for storage on the server. For example, the server may store episodes of "Desperate Housewives" the day after the episodes are broadcast on television.

The interactive media guidance application may also determine the capabilities of the user equipment devices in the home network. In some embodiments, the user equipment devices in the home network may maintain a record of the capabilities of the user equipment devices in the home network. For example, whenever a user equipment devices is added to the home network, a user may update the record to include the capabilities of the added user equipment device. In another example, the added user equipment device may automatically modify the record to indicate its capabilities.

In some embodiments, some or all of the user equipment devices in the home network may advertise their capabilities to the interactive media guidance application. For example, in response to the user selecting content to record, each of the active user equipment devices in the home network may send their capabilities to the user equipment device on which the interactive media guidance application is implemented. The capabilities may be encoded in a digital string, in which one or more bits may be used to indicate one or more capabilities. For example, the bandwidth of user equipment devices may be encoded in the five most significant bits of the string.

In some embodiments, the interactive media guidance application may poll the user equipment devices in the home network to determine their capabilities. For example, the interactive media guidance application may request that each user equipment device send an access request to the user equipment device on which the interactive media guidance application is implemented. The access request may contain a listing of the capabilities of the user equipment device.

The interactive media guidance application may compare the requirements of the formats of the content with the capabilities of each of the user equipment devices in the home network. The interactive media guidance application may record the format of content that is most suitable to be displayed by each of the user equipment devices. For example, the interactive media guidance application may record the content in a high-definition format if one of the user equipment devices is high-definition capable. In this example, the interactive media guidance application may also record the content in a standard-definition format if one of the user equipment devices in the home network cannot display the content in the high-definition format. In another example, the interactive media guidance application may store streaming content encoded at a bit rate of 300 Kbps if the bandwidth of one of the user equipment devices is 350 Kbps. In another example, the interactive media guidance application may download content in Universal Media Disc (UMD) format if one of the user equipment devices is configured to play UMD files.

The content may be stored in all of the suitable formats on any server accessible by the user equipment devices in the home network or on any of the user equipment devices in the home network. In some embodiments, the interactive media guidance application may store the suitable formats of the content on a network server (e.g., server 130 or 140 (FIG. 1)). In some embodiments, the interactive media guidance application may allow the user to select the server or user equipment device on which to record each of the suitable formats of the selected content. In some embodiments, the interactive media guidance application may record the suitable formats of the selected content on the user equipment device on which the interactive media guidance application is implemented. In some embodiments, the interactive media guidance application may identify the servers and the user equipment devices on the home network capable of recording the suitable formats of the selected content and select one or more of the identified servers and user equipment devices to record the suitable formats of the content. For example, the interactive media guidance application may select a server or user equipment device if it has sufficient resources to record any of the suitable formats of the selected content.

In some embodiments, the interactive media guidance application may record formats of the content on the user equipment devices on which the formats were intended to be displayed. For example, the interactive media guidance application may record the high-definition format of content on a high-definition capable user equipment device and the standard-definition format of the content on a standard-definition user equipment device.

The interactive media guidance application may create associations between the user equipment devices and the recorded formats most suitable to be displayed by the user equipment devices. Because the formats of the content may be stored on different servers and user equipment devices, associating user equipment devices and formats of the content may facilitate the user equipment devices in accessing the recorded format that they are most suited to display.

At step 1006, the interactive media guidance applications implemented on a user equipment device in the home network may identify a format of the recorded content that the user equipment device is capable of displaying based on the capabilities of the user equipment device. The interactive media guidance application may refer to the association between user equipment devices and formats of content and provide a link to the format of the listed content that is the most suitable for the user equipment device on which it is implemented to display.

The interactive media guidance application may allow the user to select a listing corresponding to the recorded content and at step 1008, the server or user equipment device on which the identified format of the recorded content is stored may receive a request from the user equipment device to play back the recorded content. For example, screens 900 (FIG. 9*a*), 920 (FIG. 9*c*), and 940 (FIG. 9*e*) allow the user to select content for play back using interactive media guidance applications implemented on a cellular phone, a high-definition user equipment device, and a standard-definition user equipment device, respectively.

At step 1009, the server or user equipment device on which the identified format of the recorded content is stored may deliver the identified format of the recorded content to the user equipment device. As stated above, the identified format of the recorded content is the format of the content that is most suitable to be displayed by the user equipment device. For example, an interactive media guidance application associated with a standard-definition user equipment device may access the selected content in a standard-definition format. In another example, an interactive media guidance application implemented on a user equipment device having a bandwidth of 5 Mbps may access the selected content encoded at a bit rate of 4 Mbps. In another example, an interactive media guidance application implemented on a user equipment device that is configured to display MPEG-4 files may receive the content in a MPEG-4 format.

It should be understood by one skilled in the art that interactive media guidance applications may also record the content in formats that are suitable for display by peripheral devices connected to user equipment devices in the home network without departing from the scope of the present invention. The user equipment devices may transfer the suitable formats of the content to the peripheral devices to which they are connected.

As described above in connection with FIGS. 8*d-f*, the user may configure content delivery options for a user equipment device in the home network to provide the user equipment device with the most suitable format of the content. However, the most suitable format of the content may not be available or it may not have been selected for recording.

Figure 10B:
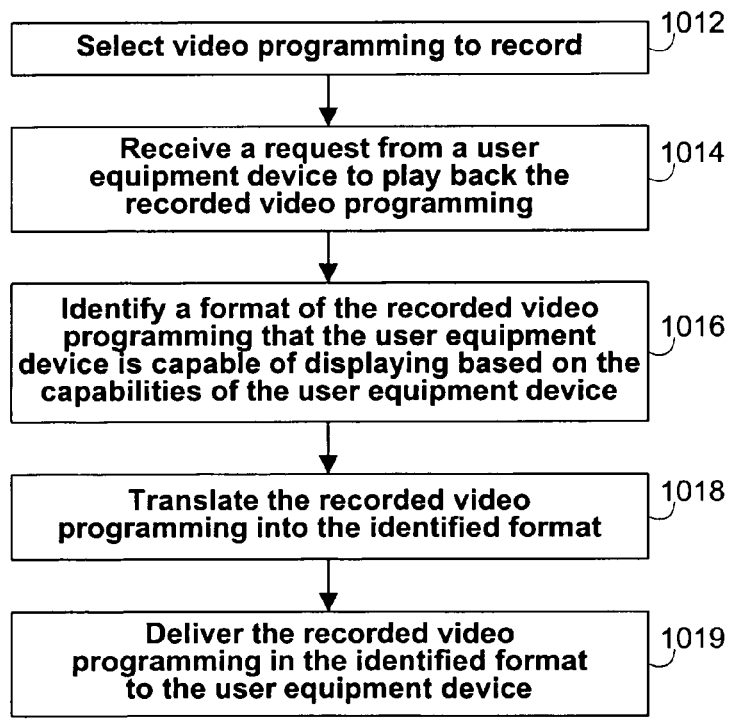
FIG. 10b shows an illustrative flow diagram for translating content into formats suitable to be displayed by user equipment devices in accordance with the present invention.

FIG. 10*b* shows an illustrative flow diagram 1010 for translating content into formats suitable to be displayed by user equipment devices in accordance with the present invention. The process set forth in flow diagram 1010 may be followed as an alternative to the process set forth in flow diagram 1000. For example, a user may select to record content that is not available to be recorded in formats suitable for display by each of the user equipment devices and peripheral devices in the home network. In another example, a user may not wish to store content in multiple formats because it requires an excessive amount of storage space.

At step 1012, video programming (sometimes referred to as content) may be selected for recording. Screens 800 (FIG. 8*a*) and 810 (FIG. 8*b*) are illustrative screens of an interactive media guidance application for allowing users to select content for recording. It should be understood by one skilled in the art that the interactive media guidance application may display any suitable screen for allowing the user to select content for recording. In another example, the interactive media guidance application may select a program for recording based on the preferences or the previous selections of the user.

The content may be recorded on any server accessible by the user equipment devices in the home network or on any user equipment device in the home network. In some embodiments, the interactive media guidance application may record the selected content on the user equipment device on which the interactive media guidance application is implemented. In some embodiments, the interactive media guidance application may identify the servers and user equipment devices capable of recording the selected content. The interactive media guidance application may select to record the content on one of the servers or user equipment devices if the server or user equipment device has sufficient resources to record the content. In some embodiments, the interactive media guidance application may allow the user to select a server or user equipment device on which to store the selected content.

For the purpose of illustration and not limitation, the content will be described herein as being stored on a network server (e.g., server 130 or 140 (FIG. 1)).

In some embodiments, the interactive media guidance application may record the content in the highest quality format available. For example, if the user selects to record a standard-definition television program, the interactive media guidance application may search the program listings to determine if the selected television program may be recorded in high definition. In another example, if the user selects to retrieve a selected television program from a server in H.264 format, the interactive media guidance application may determine if the selected television program may be recorded in high-definition or standard-definition.

At step 1014, the network server may receive a request from the user equipment device on which the interactive media guidance application is implemented to play back the recorded content. For example, screens 900 (FIG. 9*a*), 920 (FIG. 9*c*), and 940 (FIG. 9*e*) allow the user to access content using interactive media guidance applications implemented on a cellular phone, a high-definition user equipment device, and a standard-definition user equipment device, respectively.

At step 1016, the network server on which the recorded content is stored may identify a format of the recorded content that is suitable for display by the user equipment device that is requesting access to the content. The network server may determine the capabilities of the user equipment device that is accessing the recorded content. As described above, the user equipment devices may advertise their capabilities to the network server or the network server may poll the user equipment devices to determine their capabilities. The network server may identify a format of the recorded content that may be displayed by the user equipment device based on the capabilities of the user equipment device. For example, if the user equipment device is a standard-definition user equipment device, the format identified by the network server may be a standard-definition format.

In some embodiments, the network server may allow a user to identify a format of the recorded content that may be displayed by the user equipment device. For example, as shown in FIGS. 8d-f, the interactive media guidance application may allow the user to specify the formats of the selected program to be delivered to each of the user equipment devices in the home network.

At step 1018, the network server may translate the recorded content into the format identified as suitable for display by the user equipment device. If the user equipment device is capable of displaying the content in its native format, the network server may provide the user equipment device with access to the content without translating the content.

The network server may contain any suitable combination of circuitry and software for translating the recorded content into different formats. For example, the network server may include a scaler for upconverting and downconverting the content into different resolutions. In another example, the network server may have the ability to transcode the content into different audio and video formats. In another example, the network server may have interlacing and deinterlacing capabilities for converting content from an interlaced format to a progressive format (and vice versa). In another example, the network server may be able decode streaming content and re-encode the streaming content at a higher or lower bit rate.

The network server may determine how to translate the content into a format that may be displayed by the user equipment device. For example, if the content is a recording of a high-definition program and the user equipment device is standard-definition user equipment, the network server may determine the best way to convert the high-definition program into a format suitable for display by the standard-definition user equipment.

In particular, the network server may determine if the user equipment device is capable of playing the media format of the content. If not, the network server may convert the media format of the content into one that may be displayed by the user equipment device. The network server may determine if the user equipment device is capable of displaying the resolution of the content. If the user equipment device has a different native resolution than the resolution of the content and the user equipment device does not include a suitable scaler for converting the resolution of the content, the network server may upconvert or downconvert the resolution of the content into a resolution that may be displayed by the user equipment device. The network server may determine whether the user equipment device has sufficient bandwidth to display the content. If not, and if the content is intended to be streamed, the network server may decrease the bit rate at which the content is encoded. If not, and if the content is intended to be downloaded and played locally, the network server may reduce the storage space required by the content (e.g., by compressing the content, decreasing the resolution of the content, etc.).

At step 1019, the network server may deliver the recorded content in the identified format to the user equipment device. The network server may stream or transfer the translation of the recorded content to the user equipment device.

It should be understood by one skilled in the art that content stored on a home network may also be translated into formats suitable for display by peripheral devices without departing from the scope of the present invention. The network server may determine the capabilities of the peripheral devices and translate the content to formats that may be displayed by the peripheral devices. In some embodiments, the user equipment devices to which the peripheral devices are connected may transfer the translated content to the peripheral devices.

Figures 10C, 10D:
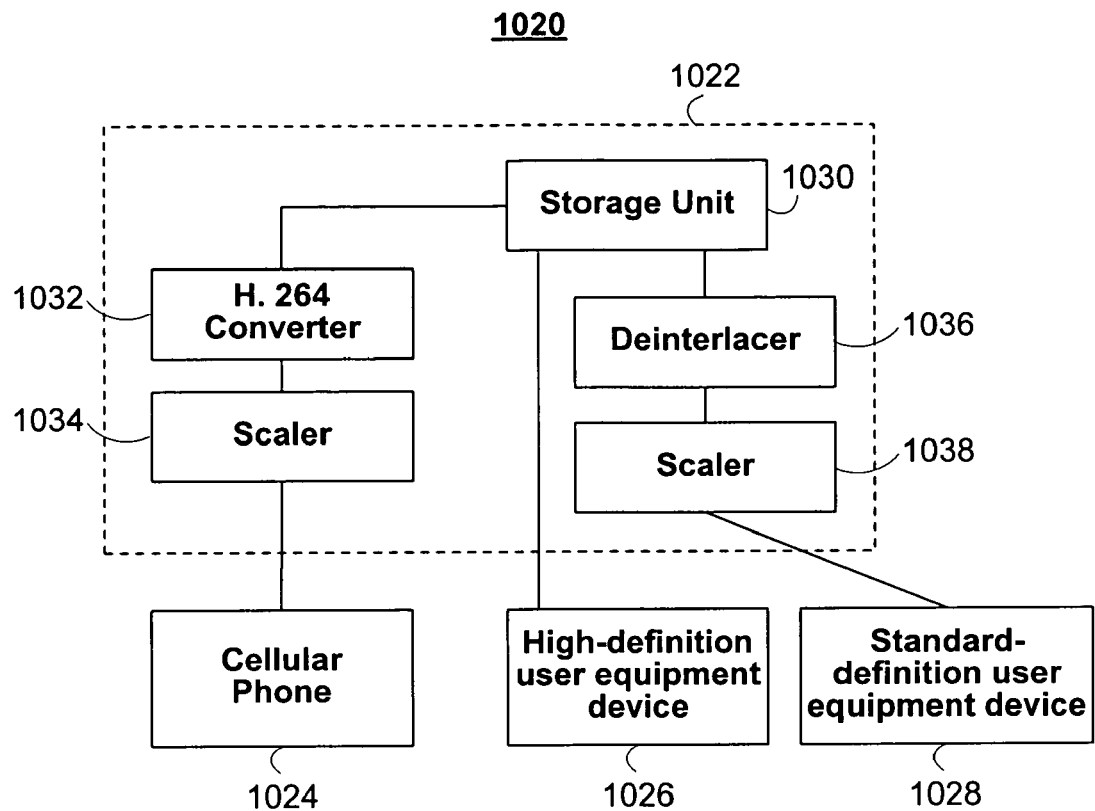
FIG. 10c shows an illustrative system diagram for translating and delivering content to user equipment devices in a home network.
FIG. 10d shows an illustrative data structure for storing the capabilities of a user equipment devices in a home network.

FIG. 10c shows an illustrative system diagram 1020 for translating and delivering content to user equipment devices in a home network. Diagram 1020 may include a home network server 1022, a cellular phone 1024, high-definition user equipment device 1026, and standard-definition user equipment device 1028. As discussed above, the home network server may translate recorded content into formats suitable for display by the user equipment devices in the home network.

Home network server 1022 may include software and hardware for translating recorded content stored on storage unit 1030, such as, for example, media transcoders, scalers, interlacers, deinterlacers and any other suitable software and hardware for translating recorded content. For the purposes of illustration and not limitation, the recorded content stored on storage unit 1030 is a high-definition recording of "Desperate Housewives" in MPEG-4 format.

As shown in FIG. 10c, home network server 1022 may process the recording of "Desperate Housewives" for cellular phone 1024 by transcoding the recording into H.264 format using converter 1032 and scaling the resolution of the recording of "Desperate Housewives" into a resolution that is supported by cellular phone 1024 using scaler 1034.

Home network server 1022 may deliver the recording of "Desperate Housewives" from storage unit 1030 to high-definition user equipment device 1026 without performing any translation because high-definition user equipment device 1026 is configured to display the recording of "Desperate Housewives".

Home network server 1022 may process the recording of "Desperate Housewives" by deinterlacing the recording using deinterlacer 1036 (e.g., to convert 720p content to 720i) and scaling the recording to standard definition (e.g., 480i) using scaler 1028.

It should be understood by one skilled in the art that the components of home network server 1022 are merely illustrative and that any components and approaches may be used to translate content into formats suitable for display by user equipment devices in a home network.

FIG. 10d shows an illustrative data structure 1040 for storing the capabilities of a user equipment devices in a home network.

Instances of data structure 1040 may be created for each user equipment device in the home network. The instances of data structure 1040 may be stored on a network server (e.g., server 130 or 140 (FIG. 1)), a home network server (e.g., server 902 (FIG. 9)), or on one of the user equipment devices in the home network.

Data structure 1040 may include a plurality of fields that correspond to different types of capabilities for a user equipment device, such as, for example, native resolution of the user equipment device, application types that may be executed by the user equipment device, media types that may be received by the user equipment device, the character sets and languages that may be displayed by the user equipment device, and the bandwidth of the user equipment device.

As shown in FIG. 10d, data structure 1040 includes field 1042 for storing the vertical and horizontal resolution of the user equipment device, field 1044 for storing the media types supported by the user equipment device, field 1046 for storing the bandwidth of the user equipment device, and field 1048 for storing the application types supported by the user equipment device.

The fields for the instances of data structure 1040 may by populated in response to determining the capabilities of the user equipment devices. For example, a server may poll user equipment devices for their capabilities. In another example, the capabilities of the user equipment devices may be included in the headers of access requests transmitted by the user equipment devices. A server on which content is stored may refer to the instances of data structure 1040 to determine the formats in which to deliver content to user equipment devices.

Figure 10E:
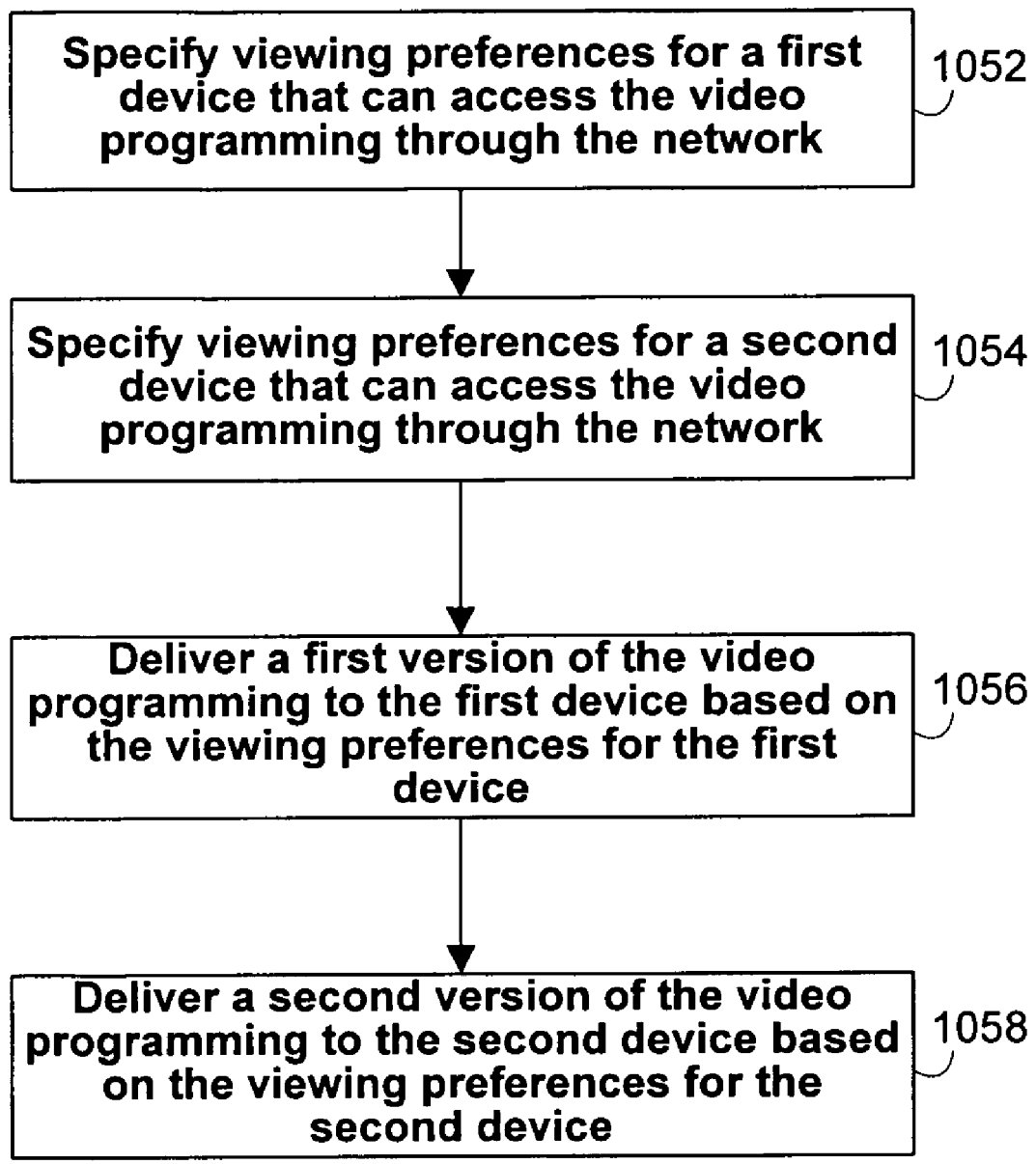
FIG. 10e shows an illustrative flow diagram for distributing video programming to two user equipment devices based on the viewing preferences for the user equipment devices.

FIG. 10e shows an illustrative flow diagram 1050 for distributing video programming to two user equipment devices based on the viewing preferences for the user equipment devices.

At steps 1052 and 1054, viewing preferences may be specified for first and second devices that may access the video programming through a network. The first and second devices may be any suitable user equipment devices, such as, for example, a high-definition user equipment device, computer, cellular phone, and standard-definition user equipment device.

The viewing preferences may include selections of display formats in which to display the video programming. Display formats may include, for example, formats having different resolutions (e.g., high definition, standard definition, low resolution, etc.), different media formats (e.g., MPEG, H.264, etc.), streaming media encoded at different bit rates, and any other suitable display formats. The selection of display formats is discussed in greater detail above in connection with FIGS. 8d-f and 10a-d.

Viewing preferences may include more than the preferred display format of the video programming. In some cases, video programming may be available in alternative versions. For example, an alternative version of the video programming may be a condensed version (e.g., summary, highlights, text, audio, etc.) or an extended version that includes extra material than the original version (e.g., interview, commentary, outtakes, etc.). Accordingly, specifying the viewing preferences for either the first or second device may also include specifying that an alternate version of the video programming should be provided to the device. Selecting and generating alternate versions of video programming is discussed in greater detail above in connection with FIGS. 8d-f and below in connection with FIGS. 11a-c.

In some embodiments, the viewing preferences may be selected based on the capabilities of the first and second devices. The server on which the video programming is stored may determine the capabilities of the first and second devices to specify the viewing preferences of the first and second devices. This approach is described in greater detail above in connection with FIGS. 10a-b and 11a. For example, a high-definition user equipment device may have different capabilities than a cellular phone. As a result, the server may generate different viewing preferences for the first and second devices.

In some embodiments, the viewing preferences may be selected by one or more users. For example, as shown in FIGS. 8d-f, a user may select viewing preferences for "Desperate Housewives" for several user equipment devices in a home network. The users may use interactive media guidance applications to select the viewing preferences.

At steps 1056 and 1058, a first version of the video programming may be delivered to the first device and a second version of the video programming may be delivered to the second device. The versions of the video programming that are delivered to the devices are based on the viewing preferences specified for the devices.

In some embodiments, the first and second versions of the video programming may be recorded and the recordings of the first and second versions may be delivered to the first and second devices. For example, the first and second versions of the video programming may be recorded on a network server (e.g., server 130 or 140 (FIG. 1)), home network server (e.g., server 702 (FIG. 7)), or user equipment device. Recording the versions of video programming suitable for display be user equipment devices is discussed above in greater detail in connection with FIG. 10a.

In some embodiments, one of the formats of the video programming may be recorded and a search may be conducted at a later time for the other format of the video programming. For example, as described above in connection with FIG. 8b, some of the formats of the video programming may be available after another one of the formats has been broadcast. In some embodiments, the service provider may require the user to pay a fee to retrieve or record the formats of the video programming that are available at a later time.

In some embodiments, one or both of the versions of the video programming may be generated by a server. In particular, the server or user equipment device on which the video programming is stored may translate the video programming into a format that the devices may display based on the capabilities of the devices. This approach is discussed in greater detail in connection with FIG. 10b.

In some embodiments, the first or second version of the video programming may be an alternate version of the video programming, such as, a condensed version or an extended version. In some embodiments, the alternate version of the video programming may be generated by a server and delivered to the appropriate device. In some embodiments, the device may retrieve the alternate version of the video programming from a server. In some embodiments, a server may retrieve the alternate version of the video programming and translate the alternate version of the video programming into a display format that is appropriate for the device.

The first and second versions of the video programming may be delivered to the first and second devices in response to a user selecting to playback the first and second versions of the video programming using, for example, and interactive media guidance application. In some embodiments, the first and second versions of the video programming may automatically be delivered to the first and second user equipment devices based on the viewing preferences. For example, as shown in screens 910 (FIG. 9b), 930 (FIG. 9d), and 950 (FIG. 9f), a recording of "Desperate Housewives" may be delivered to user equipment devices in different versions based on the viewing preferences of the user equipment devices.

As shown in FIGS. 8d-f, content delivery options may also include an option to deliver an alternate version of the content (e.g., a condensed or extended version of the content) to any one or more of the user equipment devices in the home network. For example, the user may select to deliver a video summary of a recording to a cellular phone.

Figure 11A:
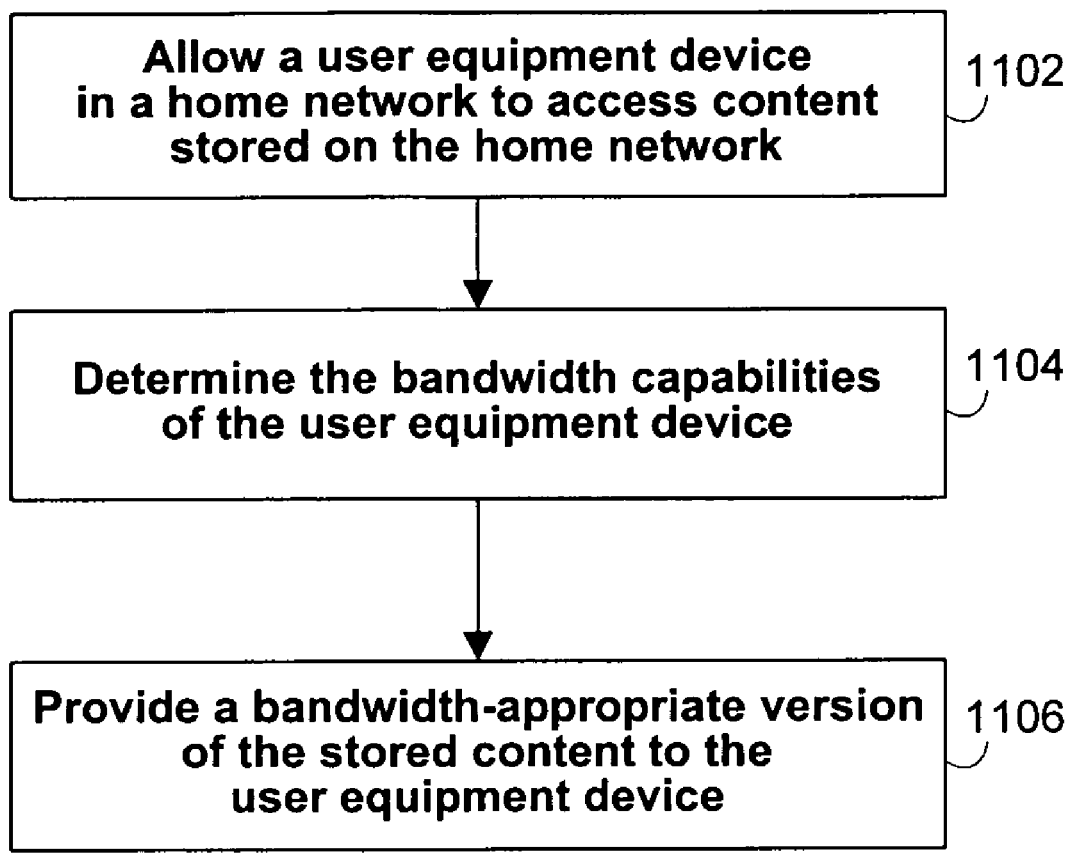
FIG. 11a shows an illustrative flow diagram for condensing recorded content for user equipment devices in accordance with the present invention.

FIG. 11a shows an illustrative flow diagram 1100 for condensing recorded content for user equipment devices in accordance with the present invention. In some embodiments, the user may select to deliver a condensed version of the content to the user equipment device. In some embodiments, the interactive media guidance application may determine that a condensed version of the content should be delivered to the user equipment device based on the bandwidth of the user equipment device.

At step 1102, a user equipment device located in a home network may access content stored on the home network. Content stored on the home network may include content recorded from any of the user equipment devices in the home network and may be stored on a network server, home server, or user equipment device. Such content may include, for example, recorded television programs, downloaded video-on-demand content, video/audio content decoded from optical media, video/audio content uploaded from peripheral devices, and any other suitable content.

At step 1104, the server or user equipment device on which the content is stored may determine the bandwidth capabilities of the user equipment device that is accessing the content. For the purposes of illustration and not limitation, the content will be discussed herein as being stored on a network server (e.g., server 130 or 140 (FIG. 1)). If the bandwidth capability of the user equipment device is not already known (e.g., stored in a data file on the network server), the network server may test the bandwidth capability of the user equipment device that is accessing the content. For example, the network server may send a series of test packets to the user equipment device that is accessing the content. The network server may measure the amount of time it takes the user equipment device that is accessing the content to receive the test packets. The network server may then calculate the bandwidth of the user equipment device that is accessing the content. It should be understood that other techniques to determine the bandwidth of a user equipment device may be utilized without departing from the scope of the present invention.

At step 1106, the network server may provide a condensed version of the content to the user equipment device that is accessing the content based on the determination of the bandwidth capability of the user equipment device. For the purposes of illustration and not limitation, it will be assumed that the display capabilities of user equipment devices in a home network are identical.

Unlike the approach illustrated in FIG. 10*b*, this approach does not involve adjusting the resolution, bit rate, or format of the content. Instead, the content may be condensed (e.g., extracting information from the content, splitting and joining segments of the content, etc.), which will be discussed in greater detail below.

If the bandwidth of the user equipment is large enough to download the content in a reasonable amount of time, then the network server may provide the content to the user equipment device without condensing the content. If the bandwidth of the user equipment device is not large enough to download the content in a reasonable amount of time, the network server may determine the extent to which the content should be condensed. For example, a cellular phone may lack the bandwidth to download standard or high-definition content of any length.

In some embodiments, the network server may define a size limit for content to be transferred to the user equipment device based on the bandwidth capabilities of the user equipment device. Defining the size limit for content to be transferred to the user equipment device ensures that the user equipment device is able to download content in a reasonable amount of time, which promotes network efficiency. In some embodiments, the size limit may vary depending on the current load for the network server (i.e., the size limit of the content may be reduced if the network server is experiencing a high load). The network server may condense the content such that the size of the content is reduced to below the size limit permitted for the user equipment device.

In some embodiments, the network server may allow the user at the user equipment to specify the amount of time in which the content should be transmitted to the user equipment device. For example, the user may indicate that they only wish to wait a certain amount of time to download content. The network server may condense the content such that the user equipment device may receive the content within the time specified by the user.

The network server may condense the content using any of several techniques. One technique involves splitting the content into segments and joining one or more of the segments to form a condensed version of the content. For example, if the network server determines that the content should be condensed by 25%, the network server may split the content into segments and select to join a subset of segments to form a condensed version of the content that is 75% of the size of the original content.

The network server may determine the locations at which to split the content based on external data such as, for example, closed-captioning data, audience information, embedded metadata, and any other suitable external data. For example, closed-captioning data may provide the network server with information regarding the dialog of the program. If there is a portion of the content with little or no dialog, the network server may split the content before and after that portion and join the segments before and after the segment that lacks dialog. In some embodiments, in accordance with the parental control settings of the user equipment device that is accessing the content and/or in order to condense the content, the network server may identify and remove segments of the content that contain foul language, sexual dialog, and any other offensive material.

Audience information may indicate the portions of the content that were interesting to audiences. For example, if the audience levels fall at a certain point during the content and rise shortly thereafter, the network server may remove the portion of the content that was unpopular with the audience by splitting the content into segments (e.g., at the locations where the audience levels fell and where the audience levels rose) and not joining the segment with low audience levels with the remaining segments. Audience information is discussed in greater detail in U.S. patent application Ser. No. 09/823,705, filed Mar. 30, 2001, which is hereby incorporated by reference herein in its entirety.

Metadata may also indicate locations of the content where it would be suitable to split the content into segments. For example, the metadata may have been transmitted with the content in the vertical blanking interval for the express purpose of indicating locations at which to split the content. The network server may use any of the techniques described herein to determine the segments of greatest interest and join those segments together to form a condensed version of the content. Metadata may also provide information relating to the content such as, for example, the current score if the content is a sporting event. In this example, the network server may split the content based on changes in the score (e.g., join segments together that each span thirty seconds before and after the change of the score). Using metadata to carry real-time information is discussed in greater detail in Knee et al. U.S. Pat. No. 6,014,184, which is hereby incorporated by reference herein in its entirety.

In addition, the network server may also traverse the content to detect cues that may indicate a location at which to split the content. Cues may include, for example, commercial breaks, audio cues, scene changes, and any other suitable cues. Commercial breaks may be detected and spliced out to condense the content. Audio cues may be used to determine interesting portions of the program. For example, in sporting events, the volume tends to be the greatest when a play of importance occurs (e.g., the audience cheers or boos). Another type of audio cue is the change of background music. Such changes in music typically indicate the end of a scene or the occurrence of a dramatic event. Scene changes may indicate a suitable location at which to split the content. The network server may also detect scene changes, for example, by determining differences in color levels between frames.

In some embodiments, the content may be split into main segments. Each main segment may be condensed and afterwards the condensed main segments may be rejoined. Any of the approaches discussed herein may be applied to condense the main segments of the content.

In some embodiments, the content may include collateral content, such as, for example, interviews, behind-the-scenes specials, bonus materials, etc. In order to condense the content for the user equipment device, the network server may take off the collateral content. This may be performed in lieu of or in addition to any of the approaches to condensing the content discussed herein.

The network server may also provide audio or text versions of the content to the user equipment device. For example, if the user equipment device does not have enough bandwidth to receive the content, the network server may separate the audio portion of the content and provide the user equipment device with the audio portion of the content. In another example, if the user equipment device does not have enough bandwidth to receive the content, the network server may create a text of the content based on closed-captioning data. The audio or text versions of the content may be further condensed by splitting and joining segments of the audio or text versions of the content using any of the approaches described above. For example, the network server may condense the closed-captioning data for the content into a summary of the content, which may be provided to a cellular phone. Alternatively, the network server may first condense the content using any of the approaches discussed above and convert the condensed version of the content into audio or text versions.

It should be understood by one skilled in the art that the condensed version of the content may be formatted using the approaches shown in and described in connection with FIG. 10b to provide a formatted and condensed version of the content to the user equipment device. For example, the content may be condensed further by reducing the bit rate at which the content is encoded or reducing the resolution of the content. In another example, the network server may transcode the condensed version of the content into a format that may be played by the user equipment device.

Figure 11B:
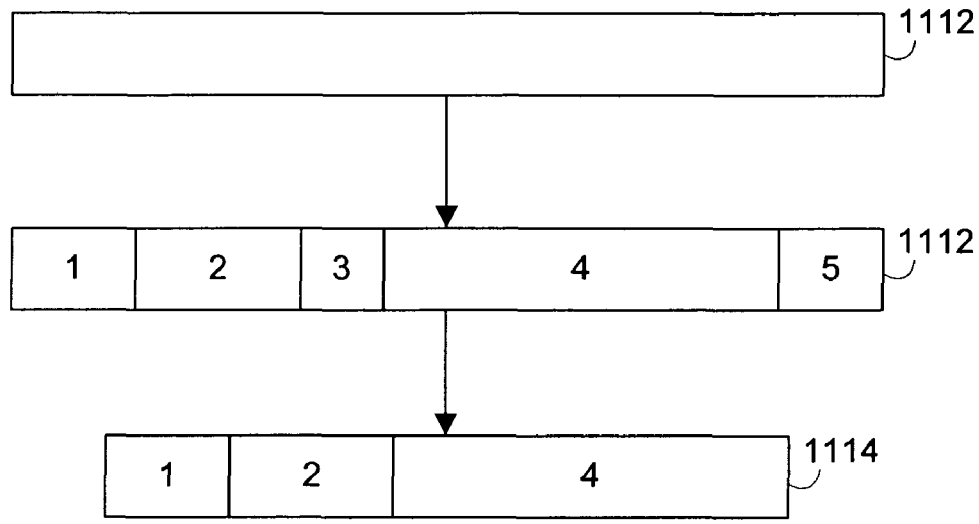
FIGS. 11b-c show two illustrative approaches for condensing recorded content in accordance with the present invention.
Figure 11C:
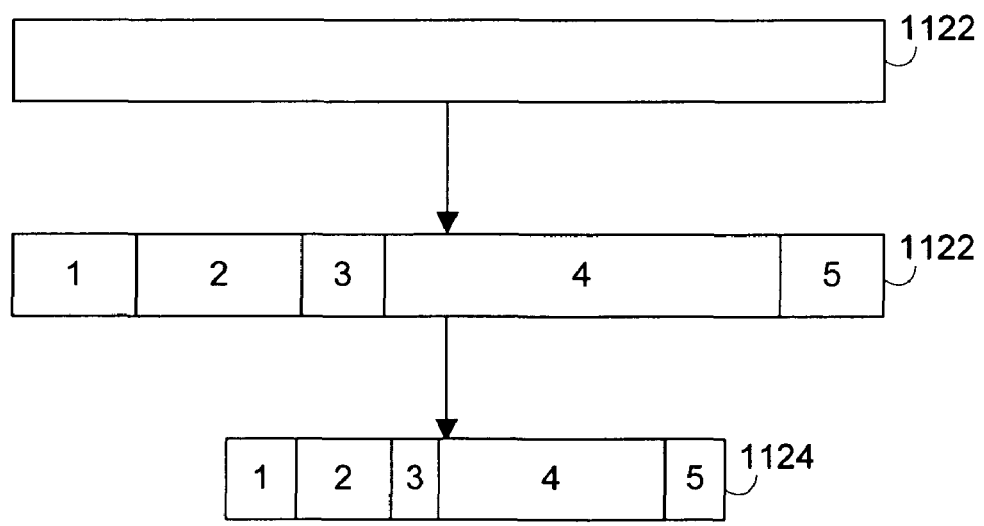

FIGS. 11b-c show two illustrative approaches 1110 and 1120 for condensing recorded content in accordance with the present invention. As shown in FIG. 11b, recorded content 1112 may be split into several segments. A condensed version 1114 of the recorded content may be created by joining a subset of the segments. As shown in FIG. 11c, recorded content 1122 may be split into several segments. Each segment may be condensed using any suitable approach and a condensed version of the recorded content 1124 may be created by joining the condensed segments. The locations at which the content is split may be selected based on any suitable external data (e.g., closed-captioning information, audience information, metadata) or by detecting any suitable cues (e.g., audio cues, scene changes, commercial breaks). In some embodiments, condensed versions of the recorded content may be converted into audio or text versions. The conversion into text or audio may occur before or after the content is split into segments.

Figure 12A:
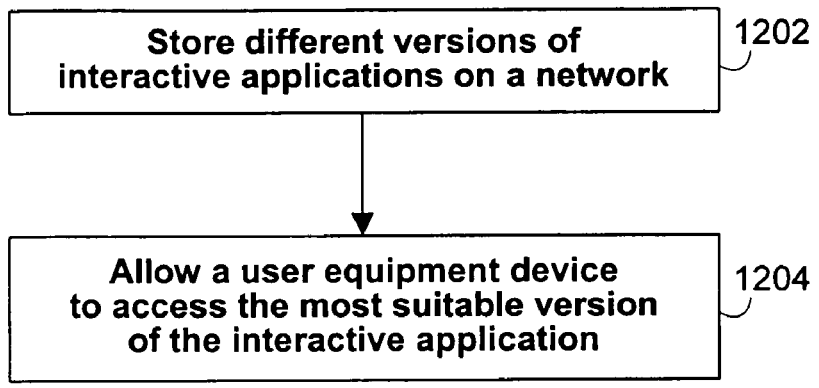
FIG. 12a shows an illustrative flow diagram for distributing different versions of interactive applications to user equipment devices in accordance with the present invention.
Figure 12B:
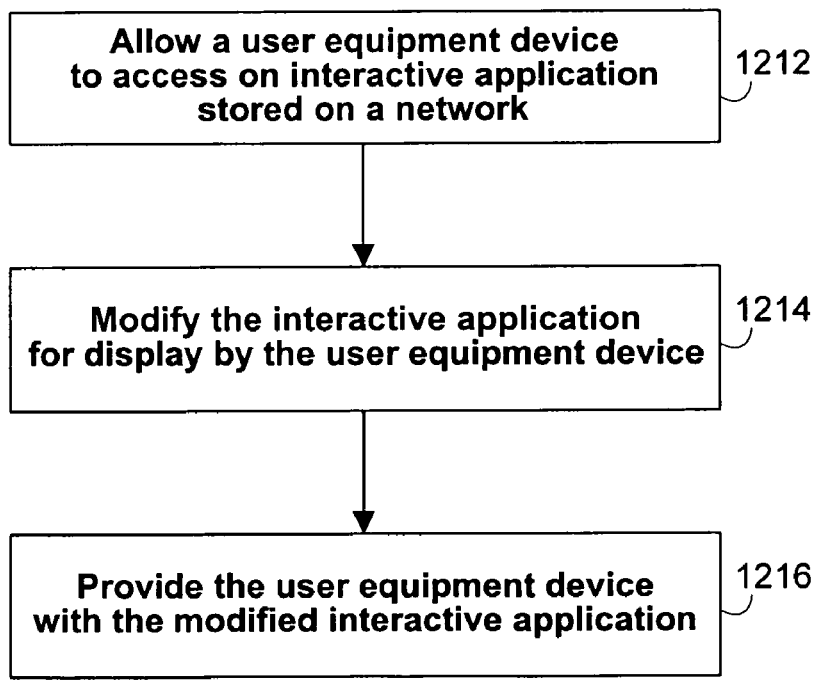
FIG. 12b shows an illustrative flow diagram for modifying interactive applications for use by different user equipment devices in accordance with the present invention.
Figure 12C:
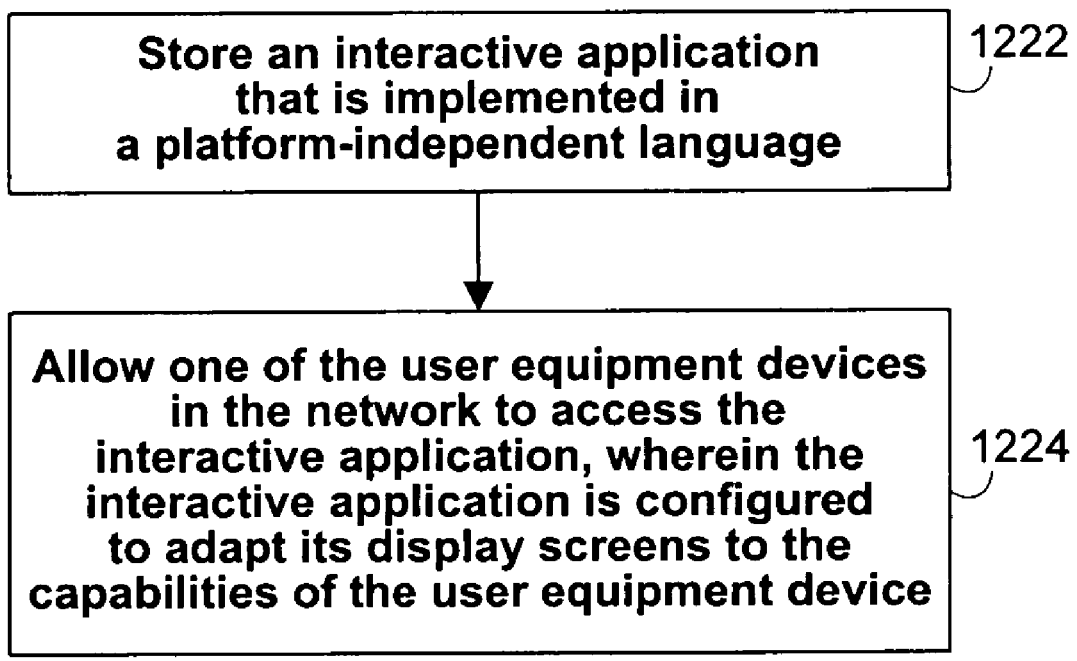
FIG. 12c shows an illustrative flow diagram for allowing a user equipment device to access an adaptive interactive application implemented in a platform-independent language in accordance with the present invention.

As described above in connection with FIGS. 8d-f, applications associated with recorded television programs may also be distributed to user equipment devices in the home network. Due to different software and display capabilities, user equipment devices in a home network may not be able to run certain types of interactive applications. For example, an interactive application that is run on a personal computer may not be run on a cellular phone. Furthermore, even if the interactive application could be run on both the personal computer and the cellular phone, the interactive application may not be displayed in a format suitable for the cellular phone. In some cases, even among personal computers, hardware differences may prevent an interactive application from being run on different computers. In another example, an interactive application that is implemented as an HTML webpage may be displayed by a computer, but not a cellular phone. FIGS. 12a-c show different approaches for distributing interactive applications to user equipment devices in the home network.

Interactive applications may be written in any suitable programming language including standard programming languages (e.g., ANSI C, Pascal, etc.), object oriented programming languages (e.g., C++, Java, etc.), web-based programming languages (e.g., hyper-text markup language (HTML), extensible markup language (XML), wireless markup language (WML), Javascript, PERL), and any other suitable programming languages.

Interactive applications may be stored on any suitable location in a network including, for example, a network server (e.g., server 130 or 140 (FIG. 1)), a home server (e.g., server 702 (FIG. 7)), or any user equipment devices or peripheral devices in users' homes. For the purpose of illustration and not limitation, interactive applications will be discussed as being stored on network servers. One skilled in the art should understand that interactive applications may be stored at any location on a network without departing from the scope of the present invention.

For the purposes of illustration and not limitation, interactive applications will be discussed as being accessed by user equipment devices. One skilled in the art should understand that interactive applications may also be accessed by peripheral devices connected to user equipment devices. The user equipment devices to which the peripheral devices are connected may provide the peripheral devices with access to the interactive applications.

FIG. 12a shows an illustrative flow diagram 1200 for distributing different versions of interactive applications to user equipment devices in accordance with the present invention.

At step 1202, different versions of interactive applications may be stored on a network. In some embodiments, all available versions of the interactive applications may be stored on the network. For example, if a software developer produces five versions of an interactive application that may be run on different types of user equipment devices, all five versions of the interactive application may be stored on the network. In some embodiments, the versions of the interactive application that are most suitable for operating on the user equipment devices in the user's home may be stored on the network. For example, if the user equipment devices in a user's home include a personal computer and a set-top box, the versions of interactive applications suitable for operating on the personal computer and the set-top box may be stored on the network.

At step 1204, one of the user equipment devices in the user's home may access the version of the interactive application that is best suited to run on the user equipment device. For example, the interactive application may be associated with a television program and the user may have selected to deliver a recording of the television program to the user equipment device along with the associated interactive application.

The network server on which the interactive application is stored may identify the most suitable version of the interactive application for the user equipment device. In some embodiments, a request to access the interactive application sent by the user equipment device to the network server may include a header that identifies the user equipment device and advertises the capabilities of the user equipment device. For example, the capabilities may include the native resolution of the user equipment device, application types that may be executed by the user equipment device, media types that may be received by the user equipment device, the character sets and languages that may be displayed by the user equipment device, and the bandwidth of the user equipment device. In some embodiments, the network server may poll the user equipment device to determine its capabilities.

The network server may compare the capabilities of the user equipment device with the requirements of the different versions of the interactive application to determine which version of the interactive application is most suitable to be run by the user equipment device. For example, if the interactive application is programmed in HTML, the network server may determine if the user equipment device is configured to display HTML. In another example, if the interactive application produces an output screen having 640×480 pixels, the network server may determine if the user equipment devices has a native resolution of at least 640×480.

In some embodiments, the interactive application may be retrieved and executed by the user equipment device. In some embodiments, the interactive application may be executed on the network server and the network server may transfer an application-specific display-screen to the user equipment device.

FIG. 12b shows an illustrative flow diagram 1210 for modifying interactive applications for use by different user equipment devices in accordance with the present invention.

At step 1212, the network server may allow a user equipment device to access an interactive application stored on the network server. For example, the interactive application may be associated with a television program and the user may have selected to deliver a recording of the television program to the user equipment device along with the associated interactive application.

At step 1214, the interactive application may be modified by the network server for display by the user equipment device. The network server on which the interactive application is stored may identify and determine the capabilities of the user equipment device. In some embodiments, the request to access the interactive application sent by the user equipment device to the network server may include a header that identifies the user equipment device and advertises the capabilities of the user equipment device. For example, the capabilities may include the native resolution of the user equipment device, application types that may be executed by the user equipment device, media types that may be received by the user equipment device, the character sets and languages that may be displayed by the user equipment device, and the bandwidth of the user equipment device. In some embodiments, the network server may poll the user equipment device to determine its capabilities.

If the user equipment device has the capability to display and operate the interactive application without any modifications, the network server may transmit the interactive application in an unaltered state to the user equipment device. However, if the user equipment device is limited in its ability to display or execute the interactive application, the network server may modify the interactive application to allow the user equipment device to display and execute the interactive application.

In some embodiments, the interactive application may be written in a markup language, such as, for example, XML. The markup language may define the substance of the interactive application. The formatting aspects of the interactive application may be defined in one or more style sheets. The network server may apply a selected style sheet to the interactive application to transform the interactive application to a format suitable for display on the user equipment device.

The style sheet may be selected based on a comparison of the capabilities of the user equipment device and the requirements of the style sheet. For example, if the user equipment device is only configured to display the interactive application in a wireless markup language (WML) format, the network server may select a style sheet for converting the interactive application into WML. If the user equipment device is a set-top box, the network server may select a style sheet for converting the interactive application into a format that the set-top box is able to display. If the user equipment device is a personal computer, the network server may select a style sheet for converting the interactive application into an HTML format. If the user equipment device is only configured to display Chinese characters, the style sheet may cause the interactive application to be displayed in Chinese. In some embodiments, the network server may provide the suitable style sheet to the user equipment device, which performs the transformation of the interactive application into a suitable format.

In some embodiments, the network server may generate custom style sheets based on the capabilities of the user equipment device. In some embodiments, the network server may create hybrid style sheets by combining existing style sheets. If two existing style sheets contain conflicting tags, the network server may allow one style sheet to override tags from other style sheets. For example, if the user equipment device is not well suited to display any of the formats defined by the style sheets, the network server may generate and/or modify existing style sheets to suit the user equipment device.

In some embodiments, the network server may process video, graphics, and audio to create reduced-size versions of the video, graphics, and audio. The network server may cause, for example, a WML transformation style sheet to display the reduced-size versions of the graphics and audio in the WML-version of the interactive application.

In some embodiments, the interactive application may be written in an object-oriented language (e.g., C++). The network server may store a plurality of objects, each of which is configured to optimize the display of the interactive application for a user equipment device. For example, the object corresponding to a handheld video player may include subroutines for displaying the interactive application in a format that is suitable for the handheld video player. The network server may modify the source code for the interactive application to call the object corresponding to the user equipment device that is accessing the interactive application. The network server may recompile the modified interactive application.

In some embodiments, the interactive application may be written in a non-object-oriented language (e.g., ANSI C). The interactive application may contain a plurality of methods, each of which is configured to optimize the display of the interactive application for one of the user equipment devices. The network server may modify the interactive application to call the method corresponding to the user equipment device. The network server may recompile the modified interactive application.

At step 1216, the network server may provide the modified interactive application to the user equipment device. For example, the modified interactive application may be associated with a television program and the user may have selected to deliver a recording of the television program to the user equipment device along with the modified interactive application.

FIG. 12c shows an illustrative flow diagram 1220 for allowing a user equipment device to access an adaptive interactive application implemented in a platform-independent language in accordance with the present invention.

At step 1222, an adaptive interactive application implemented in a platform-independent programming language may be stored on a network. The interactive application may be implemented in any suitable platform-independent language, such as, for example, Java. In this approach, the interactive application may be run on any user equipment device, as long as the user equipment device includes an interpreter that converts the platform-independent language to machine instructions for the user equipment device.

At step 1224, one of the user equipment devices in the network may access the interactive application. For example, the interactive application may be associated with a television program and the user may have selected to deliver a recording of the television program to the user equipment device along with the associated interactive application.

The interactive application may be programmed to identify the user equipment device on which it is being run and to determine the capabilities of the user equipment device. In some embodiments, the interactive application may analyze the system configuration of the user equipment device. In some embodiments, the interactive application may cause the user equipment device to send a request to a server (e.g., an HTTP request) and capture the header information that identifies the user equipment device and its capabilities. Capabilities of the user equipment device may include, for example the native resolution of the user equipment device, application types that may be executed by the user equipment device, media types that may be received by the user equipment device, the character sets and languages that may be displayed by the user equipment device, and the bandwidth of the user equipment device.

The interactive application may adjust its display format to best suit the capabilities of the user equipment device. The interactive application may execute subroutines configured to optimize the display of the interactive application based on the capabilities of the user equipment device. In some embodiments, the interactive application may select one of several modes in which to operate. The modes may have different requirements and the interactive application may select the mode that best suits the capabilities of the user equipment device. For example, the interactive application may be run in a first mode offering a high-resolution, high-bandwidth format or a second mode offering a low-resolution, low-bandwidth format. In this example, the interactive application may be run in the first mode on a high-definition user equipment device and in the second mode on a cellular phone.

Figure 12D:
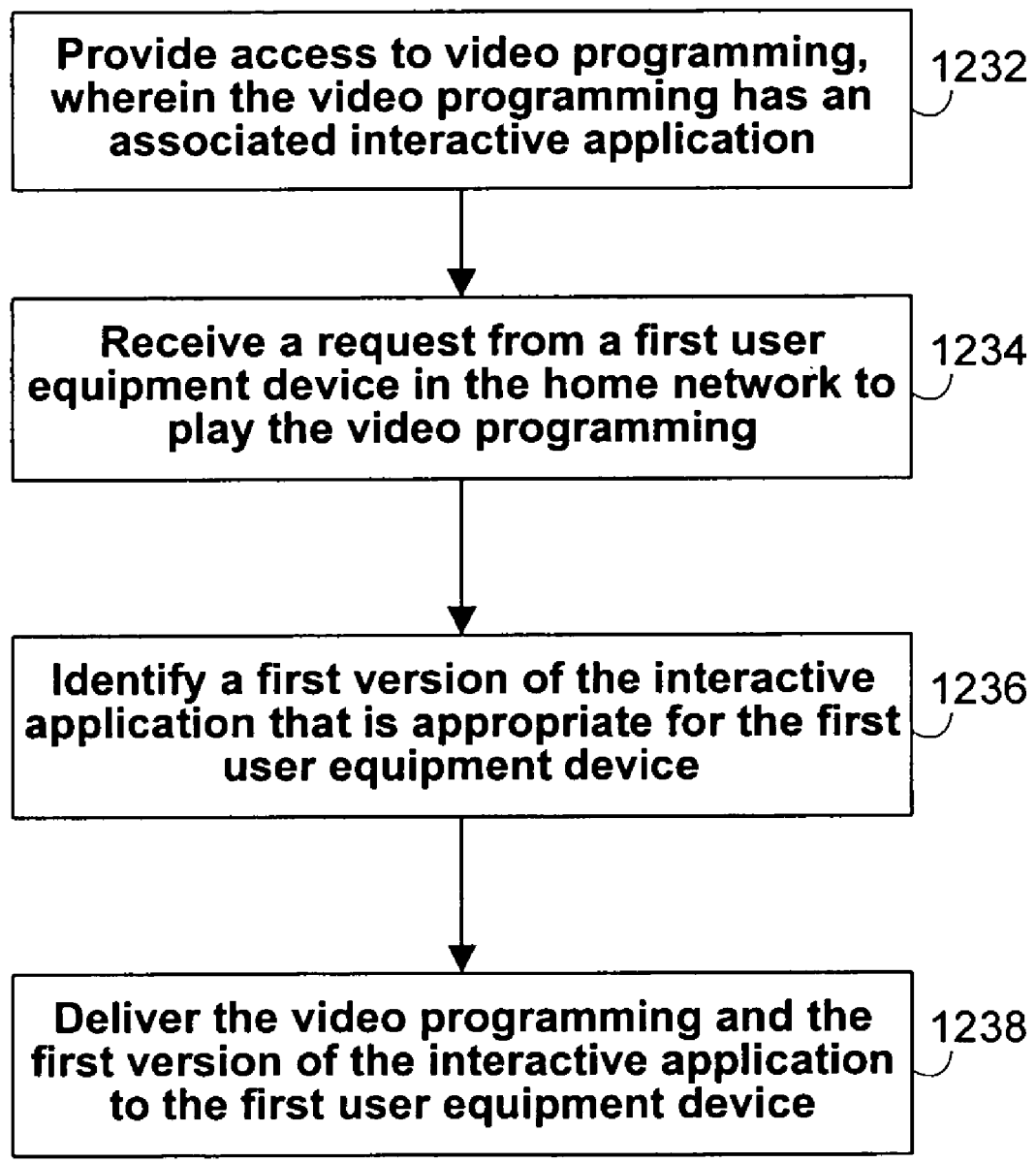
FIG. 12d shows an illustrative flow diagram for delivering video programming and associated interactive applications to user equipment devices in a home network.

FIG. 12d shows an illustrative flow diagram 1230 for delivering video programming and associated interactive applications to user equipment devices in a home network.

At step 1232, a user may access video programming using an interactive media guidance application implemented on a user equipment device in the home network. Access to the video programming may be provided by a server or user equipment device on which the video programming is stored. In some embodiments, the video programming may be provided as a result of the user having selected to record the video programming. For example, as shown in FIG. 8a, the user may select to record an episode of "Desperate Housewives" on a server for retrieval at a later time. In some embodiments, a service provider may provide access to the video programming. For example, a service provider may allow the user to view an episode of "Desperate Housewives" stored on an on-demand server.

The video programming may have one or more associated interactive applications. For example, the associated interactive applications may include a content navigation application and a commerce application (e.g., a shopping application) relating to the recorded content. The associated interactive applications may be stored on any suitable network server (e.g., server 130 or 140 (FIG. 1)) or home server (e.g., server 702 (FIG. 7)).

At step 1234, the server or user equipment device on which the video programming is stored may receive a request from a user equipment device in the home network to play the video programming. For example, as shown in FIGS. 9a, 9c, and 9e, the user may use an interactive media guidance application to request access to the video programming.

At step 1236, a version of the interactive application that is appropriate for the user equipment device may be identified. In some embodiments, the server or user equipment device on which the video programming is stored may identify the appropriate version of the associated interactive application. In some embodiments, the server or user equipment device on which the associated interactive application is stored may identify the appropriate version of the interactive application. In some embodiments, the interactive media guidance application from which the user requests the video programming may identify the appropriate version of the associated interactive application. For the purposes of illustration and not limitation, it will be assumed that the server or user equipment devices on which the video programming is stored will identify the appropriate version of the associated interactive application for the user equipment device.

In some embodiments, if the interactive application is stored on a server in multiple versions (as described above in connection with FIG. 12a), the server or user equipment device on which the video programming is stored may identify one of the versions of the interactive application as the appropriate version of the interactive application for the user equipment device.

In some embodiments, if the interactive application may be modified (as described above in connection with FIG. 12b), the server on which the interactive application is stored may create a modified version of the interactive application that is appropriate for the user equipment device. The server or user equipment device on which the video programming is stored may identify the modified version of the interactive application as the appropriate version for the user equipment device.

In some embodiments, the interactive application may be implemented in a platform-independent language that is configured to adapt to the display capabilities of the user equipment device (as described above in connection with FIG. 12c). The server on which the video programming is stored may identify the interactive application as being the appropriate version for the user equipment device.

Alternatively, at step 1236, the user may identify a version of the interactive application that is appropriate for the user equipment device. For example, the interactive media guidance application implemented on the user equipment device may display a screen that includes a listing of the versions of the interactive application. The user may identify one of the versions of the interactive application that is suitable for the interactive application.

At step 1238, the server on which the video programming is stored may deliver the video programming to the user equipment device. The server or user equipment device on which the video programming is stored may also cause the appropriate version of the associated interactive application to be delivered to the user equipment device. For example, the server or user equipment device on which the video programming is stored may retrieve the appropriate version of the associated interactive application and deliver the appropriate version of the associated interactive application to the user equipment device. In another example, the server or user equipment device on which the video programming is stored may deliver the video programming to the user equipment device. The interactive media guidance application implemented on the user equipment device may retrieve the appropriate version of the associated interactive application. The video programming and the interactive application may be displayed in any suitable arrangement. For example, screen 930 (FIG. 9*d*) shows delivering video programming and an associated interactive application to a user equipment device.

Steps 1232, 1234, 1236, and 1238 may be repeated as necessary to allow the user equipment device to request other video programming and associated interactive applications and other user equipment devices to request other video programming and associated interactive applications. For example, a second user equipment device may request the video programming and a second version of the interactive application may be identified and delivered to the second user equipment device.

Figure 13:
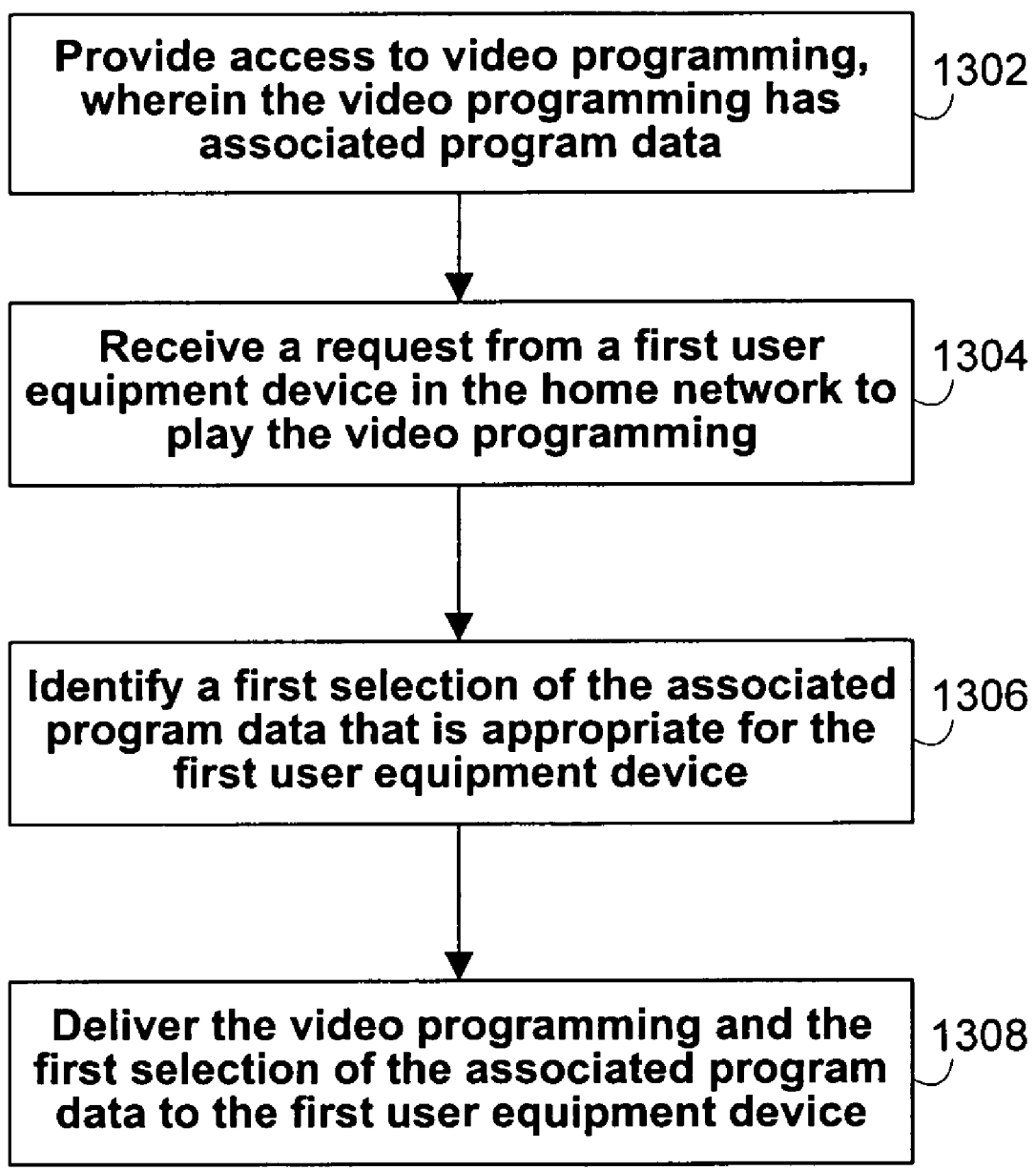
FIG. 13 shows an illustrative flow diagram for delivering video programming and associated program data to user equipment devices in a home network.

FIG. 13 shows an illustrative flow diagram 1300 for delivering video programming and associated program data to user equipment devices in a home network.

At step 1302, a user may access video programming using an interactive media guidance application implemented on a user equipment device in the home network. Access to the video programming may be provided by a server or user equipment device on which the video programming is stored. In some embodiments, the video programming may be provided as a result of the user having selected to record the video programming. For example, as shown in FIG. 8*a*, the user may select to record an episode of "Desperate Housewives" on a server for retrieval at a later time. In some embodiments, the video programming may be provided by a service provider. For example, a service provider may allow the user to view an episode of "Desperate Housewives" stored on an on-demand server.

The video programming may have associated program data, such as, for example, schedule information and program descriptions, program information (e.g., actors, directors, release date, ratings, genre, etc.), related articles, interviews, reviews, and other similar content or data. The associated program data may be stored on any suitable network server (e.g., server 130 or 140 (FIG. 1)) or home server (e.g., server 702 (FIG. 7).

At step 1304, the server or user equipment device on which the video programming is stored may receive a request from a user equipment device in the home network to play the video programming. For example, as shown in FIGS. 9*a*, 9*c*, and 9*e*, the user may use an interactive media guidance application to request access to the video programming.

At step 1306, a selection of associated data that is appropriate for the user equipment device may be identified. In some embodiments, the server or user equipment device on which the video programming is stored may identify the appropriate associated data. In some embodiments, the server or user equipment device on which the associated data is stored may identify the appropriate associated data. In some embodiments, the interactive media guidance application from which the user requests the video programming may identify the appropriate associated data. For the purposes of illustration and not limitation, it will be assumed that the server or user equipment devices on which the video programming is stored will identify the selection of appropriate associated program data for the user equipment device.

The server or user equipment device on which the video programming is stored may determine the associated data that the user equipment device is capable of receiving and displaying. For example, if one particular type of associated data requires a large amount of storage space, the server or user equipment device may not select to deliver the associated data to a user equipment device that has a limited bandwidth. In another example, if another particular type of associated data requires a large amount of display area, the server or user equipment device may not select to deliver the associated data to a user equipment device that has a low native resolution or screen size.

For example, the server or user equipment device on which the video programming is stored may select to deliver all available associated data to the high-definition user equipment device because the high-definition user equipment device has a bandwidth large enough to receive the associated data and a sufficient resolution to display the associated data simultaneously with the selected content. On the other hand, the server or user equipment device may select to deliver a limited amount of data (e.g., title information) to a cellular phone because of the bandwidth and display limitations of the cellular phone.

Alternatively, the user may identify to the server or user equipment device on which the video programming is stored the associated data that is appropriate to the user equipment device. For example, the user may select delivery options for associated data by selecting types of associated data to deliver to each of the user equipment devices in the home network, as shown in FIGS. 8*d-f*.

At step 1308, the server or user equipment device on which the video programming is stored may deliver the video programming to the user equipment device. The server or user equipment device on which the video programming is stored may also cause the selection of the associated program data to the user equipment device. For example, the server or user equipment device on which the video programming is stored may retrieve the selection of the associated program data and deliver the selection of the associated program data to the user equipment device. In another example, the server or user equipment device on which the video programming is stored may deliver the video programming to the user equipment device. The interactive media guidance application implemented on the user equipment device may retrieve the selection of the associated program data. For example, screens 910 and 950 (FIGS. 9*b* and 9*f*) show delivering video programming and a selection of associated program data to a user equipment device.

Steps 1302, 1304, 1306, and 1308 may be repeated as necessary to allow the user equipment device to request other video programming and associated program data and other user equipment devices to request other video programming and associated program data. For example, a second user equipment device may request that the video programming and a second selection of program data may be identified and delivered to the second user equipment device.

The foregoing is merely illustrative of the principles of this invention and various modifications can be made by those skilled in the art without departing from the scope and spirit of the invention.

What is claimed is:

1. A method for recording high-definition television programs comprising:
    allowing a user to select a high-definition television program for recording from a first user equipment device;
    determining if the selected television program is available in standard definition;
    recording the high-definition and standard-definition versions of the selected television program, wherein the standard-definition version is recorded if determined to be available;
    allowing a user to request to view the recorded program from a second user equipment device, wherein the first user equipment and the second user equipment are connected via a communications path; and
    receiving the standard-definition version of the recorded program at the second user equipment device if the second user equipment device is not configured to display high-definition television programs.

2. The method of claim 1 further comprising in response to determining that the standard definition version is not available, causing the high-definition version of the recorded television program to be converted into standard definition.

3. The method of claim 2 wherein the converting is performed by a scaler and interlacer.

4. The method of claim 1 wherein the high-definition version of the recorded program is provided to the second user equipment device if the second user equipment device is capable of displaying high-definition television programs.

5. The method of claim 1 wherein the high-definition version is recorded on the first user equipment device.

6. The method of claim 1 wherein an interactive program guide is implemented on the first user equipment device and a user selects to record the high-definition television program using the interactive program guide.

7. The method of claim 1 wherein an interactive program guide is implemented on the second user equipment device and a user requests to view the recorded program using the interactive program guide.

8. A system for recording high-definition television programs comprising:
    a first user equipment device configured to:
        allow a user to select a high-definition television program for recording;
        determine if the selected television program is available in standard definition; and
        cause the high-definition and standard-definition versions of the selected television program to be recorded, wherein the standard-definition version is recorded if determined to be available; and
    a second user equipment device that is connected to the first user equipment device via a communications path and is configured to:
        allow a user to request to view the recorded program; and
        receive the standard-definition version of the recorded program if the second user equipment device is not configured to display high-definition television programs.

9. The system of claim 8 wherein the first user equipment device is further configured to cause the high-definition version of the recorded television program to be converted into standard definition in response to determining that the standard definition version is not available.

10. The system of claim 9 wherein the converting is performed by a scaler and interlacer.

11. The system of claim 8 wherein the high-definition version of the recorded program is provided to the second user equipment device if the second user equipment device is capable of displaying high-definition television programs.

12. The system of claim 8 wherein the high-definition version is recorded on the first user equipment device.

13. The system of claim 8 wherein an interactive program guide is implemented on the first user equipment device and a user selects to record the high-definition television program using the interactive program guide.

14. The system of claim 8 wherein an interactive program guide is implemented on the second user equipment device and a user requests to view the recorded program using the interactive program guide.

* * * * *